US012681946B2

(12) United States Patent
Nhan et al.

(10) Patent No.: US 12,681,946 B2
(45) Date of Patent: Jul. 14, 2026

(54) SYSTEMS AND METHODS FOR FEDERATED QUERY ABSTRACTION

(71) Applicant: Salesforce, Inc., San Francisco, CA (US)

(72) Inventors: Thomas Nhan, Seattle, WA (US); Hung Dang, Snoqualmie, WA (US); Jeffrey Mark Booth, Jr., Seattle, WA (US); Antonio Marcos Da Silva, Jr., Woodinville, WA (US); BongKyum Chung, Kirkland, WA (US); Russell Steven Paul-Jones, Duvall, WA (US); Dhiren Kiran Ved, Cupertino, CA (US); Zoltan Foley-Fisher, Campbell, CA (US); Alethea Scattergood Bair-Sutherland, Belmont, CA (US); Catherine McCauley Guyman, Seattle, WA (US); Mahsa Olsen, Redmond, WA (US); Vladimir Gumennyy, Dublin, CA (US); Akhilesh Jonnavittula, San Jose, CA (US); Lucia Schmidt, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/012,774

(22) Filed: Jan. 7, 2025

(65) Prior Publication Data

US 2025/0139112 A1 May 1, 2025

Related U.S. Application Data

(63) Continuation of application No. 18/751,126, filed on Jun. 21, 2024.

(Continued)

(51) Int. Cl.
*G06F 16/00* (2019.01)
*G06F 16/242* (2019.01)
(Continued)

(52) U.S. Cl.
CPC ........ *G06F 16/248* (2019.01); *G06F 16/2428* (2019.01); *G06F 16/24534* (2019.01);
(Continued)

(58) Field of Classification Search
CPC combination set(s) only.
See application file for complete search history.

(56) References Cited

U.S. PATENT DOCUMENTS 6,366,299 B1 * 4/2002 Lanning ................. G06F 16/26
                                                        345/663
7,761,451 B2 * 7/2010 Cunningham .......... G06F 16/20
                                                        707/741

(Continued)

OTHER PUBLICATIONS

Czajkowski, Karl, Carl Kesselman, Robert E. Schuler, and Hongsuda Tangmunarunkit. "Ermrest: a web service for collaborative data management." In Proceedings of the 30th International Conference on Scientific and Statistical Database Management, pp. 1-12. 2018. (Year: 2018).*

(Continued)

*Primary Examiner* — Farhan M Syed
(74) *Attorney, Agent, or Firm* — Morgan, Lewis & Bockius LLP

(57) ABSTRACT

A server system is communicatively connected to a plurality of computing devices and one or more databases. The server system receives one or more queries from a computing device. The one or more queries specify a data source. The server system determines a level of security applicable to a user of the computing device. The server system translates the one or more queries into one or more logical queries according to semantics of the data source, and transmits the (Continued)

logical queries to a query pipeline of the server system. The server system executes the one or more queries against a first database of the one or more databases to retrieve query results from the data source. The server system applies the determined level of security to the query results to obtain one or more data sets, and returns the one or more data sets to the computing device.

20 Claims, 67 Drawing Sheets

Related U.S. Application Data

(60) Provisional application No. 63/639,650, filed on Apr. 28, 2024, provisional application No. 63/639,652, filed on Apr. 28, 2024, provisional application No. 63/523,011, filed on Jun. 23, 2023.

(51) Int. Cl.

| | |
|---|---|
| *G06F 16/2453* | (2019.01) |
| *G06F 16/248* | (2019.01) |
| *G06F 16/25* | (2019.01) |
| *G06F 16/26* | (2019.01) |
| *G06T 11/26* | (2026.01) |

(52) U.S. Cl.
CPC ............ *G06F 16/252* (2019.01); *G06F 16/26* (2019.01); *G06T 11/26* (2026.01); *G06T 2200/16* (2013.01); *G06T 2200/24* (2013.01)

(56) References Cited

U.S. PATENT DOCUMENTS

| | | | | |
|---|---|---|---|---|
| 9,779,150 | B1 | 10/2017 | Sherman et al. | |
| 10,402,061 | B2 | 9/2019 | Kohlmeier | |
| 10,795,902 | B1 | 10/2020 | Setlur | |
| 10,997,217 | B1* | 5/2021 | Nielsen | G06F 16/2308 |
| 11,216,450 | B1* | 1/2022 | Nhan | G06F 3/04812 |
| 11,580,127 | B1* | 2/2023 | Newman | G06F 40/30 |
| 2002/0069193 | A1 | 6/2002 | Beavin et al. | |
| 2004/0243593 | A1 | 12/2004 | Stolte | |
| 2006/0287978 | A1* | 12/2006 | Cunningham | G06F 16/20 |
| 2012/0054226 | A1 | 3/2012 | Cao et al. | |
| 2015/0120698 | A1 | 4/2015 | Plattner et al. | |
| 2015/0134598 | A1 | 5/2015 | Banerjee et al. | |
| 2015/0134599 | A1 | 5/2015 | Banerjee et al. | |
| 2016/0225271 | A1* | 8/2016 | Robichaud | G06F 3/0484 |
| 2018/0089286 | A1* | 3/2018 | Marquardt | G06F 16/248 |
| 2018/0129374 | A1 | 5/2018 | Kim et al. | |
| 2019/0034484 | A1* | 1/2019 | Das | G06F 16/24522 |
| 2019/0034496 | A1 | 1/2019 | Acosta | |
| 2019/0034498 | A1* | 1/2019 | Das | G06F 16/248 |
| 2019/0034499 | A1* | 1/2019 | Das | G06F 16/248 |
| 2019/0065565 | A1 | 2/2019 | Stolte | |
| 2019/0155803 | A1* | 5/2019 | Miller | G06F 16/2372 |
| 2020/0026532 | A1 | 1/2020 | Bill et al. | |
| 2020/0125239 | A1* | 4/2020 | Talbot | G06F 3/04842 |
| 2020/0401581 | A1* | 12/2020 | Eubank | G06F 16/26 |
| 2021/0149935 | A1 | 5/2021 | De Boer | |
| 2021/0256039 | A1* | 8/2021 | Weir | G06F 16/287 |
| 2022/0318262 | A1 | 10/2022 | Whilden | |
| 2023/0394053 | A1* | 12/2023 | Mahdy | G06F 16/2428 |
| 2024/0265024 | A1* | 8/2024 | Newman | G06F 16/26 |
| 2024/0411787 | A1* | 12/2024 | Portisch | G06F 16/211 |
| 2025/0094707 | A1* | 3/2025 | Portisch | G06F 40/284 |
| 2025/0139112 | A1* | 5/2025 | Nhan | G06F 16/248 |

OTHER PUBLICATIONS

Andreas Grünwald et al., "The semantic model editor," Semantic Systems, Sep. 4, 2014, Copyright 2014, ACM 978-1-4503-2927, pp. 116-123, 8 pgs.

Nhan, Office Action, U.S. Appl. No. 18/424,592, Dec. 4, 2024, 13 pgs.

Nhan, Notice of Allowance, U.S. Appl. No. 18/424,592, May 14, 2025, 13 pgs.

Nhan, Office Action, U.S. Appl. No. 18/424,619, Dec. 4, 2024, 7 pgs.

Nhan, Notice of Allowance, U.S. Appl. No. 18/424,619, Apr. 1, 2025, 12 pgs.

Nhan, Office Action, U.S. Appl. No. 18/424,505, Mar. 7, 2025, 46 pgs.

Nhan, Office Action, U.S. Appl. No. 18/751,126, Jun. 2, 2025 22 pgs.

Nhan, Office Action, U.S. Appl. No. 18/751,131, Jun. 20, 2025 12 pgs.

Salesforce, Inc., International Search Report and Written Opinion, PCT/US2024/028206, Jan. 16, 2025, 16 pgs.

SS-BI Tutorials, (Feb. 2013), 'Erwin Data modeler relationships', https://www.youtube.com/watch?v=UfwyD13jr8Q&t=45s (Year: 2013), 3 pgs.

Nhan, Notice of Allowance, U.S. Appl. No. 18/424,505, Aug. 19, 2025, 27 pgs.

Nhan, Final Office Action, U.S. Appl. No. 18/751,131, Dec. 29, 2025, 19 pgs.

* cited by examiner

Computing Device
600
(Client device 202 or
204)

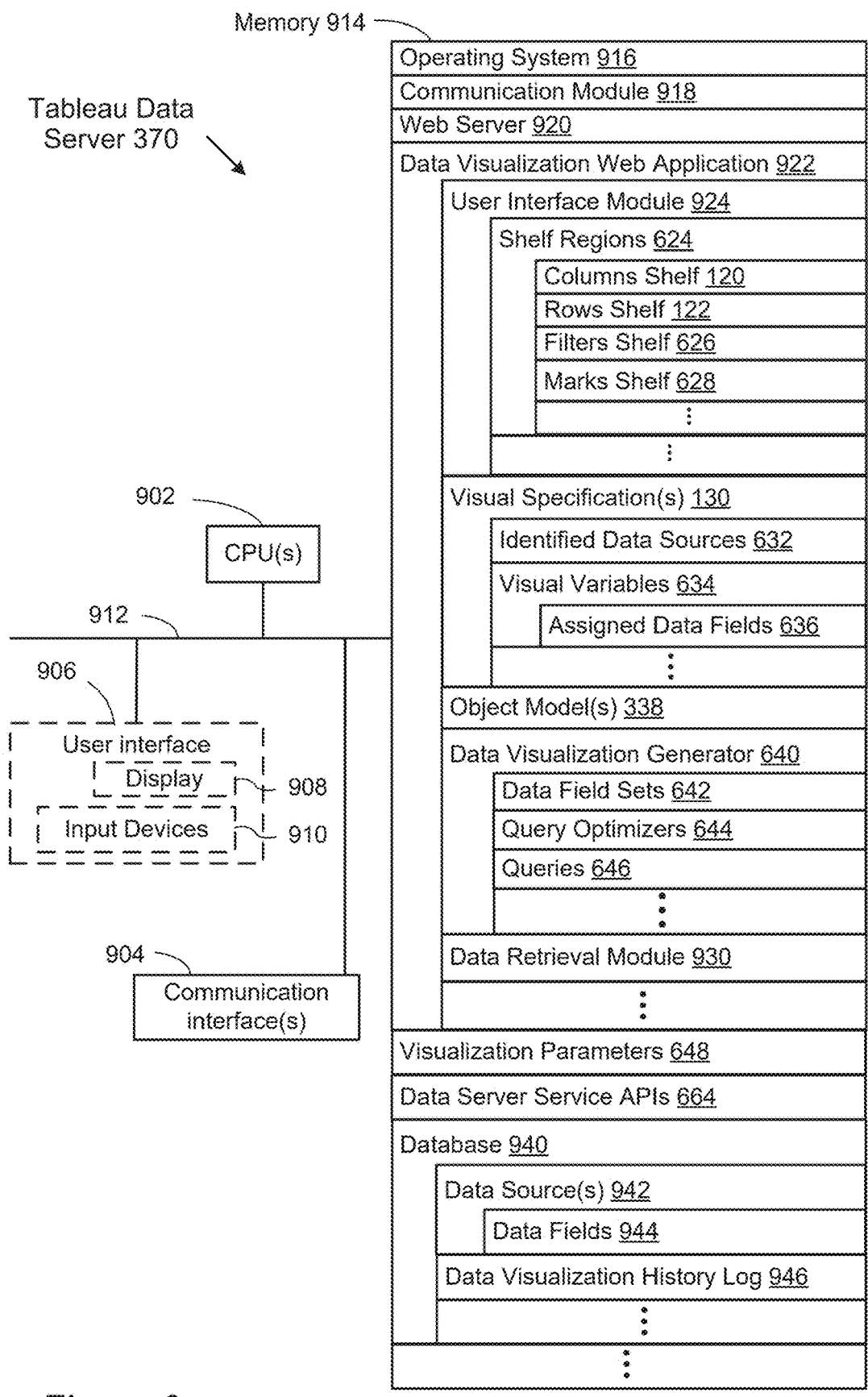

Tableau Data Server 370

Memory 914

Operating System 916

Communication Module 918

Web Server 920

Data Visualization Web Application 922

User Interface Module 924

Shelf Regions 624

Columns Shelf 120

Rows Shelf 122

Filters Shelf 626

Marks Shelf 628

⋮

⋮

Visual Specification(s) 130

Identified Data Sources 632

Visual Variables 634

Assigned Data Fields 636

⋮

Object Model(s) 338

Data Visualization Generator 640

Data Field Sets 642

Query Optimizers 644

Queries 646

⋮

Data Retrieval Module 930

⋮

Visualization Parameters 648

Data Server Service APIs 664

Database 940

Data Source(s) 942

Data Fields 944

Data Visualization History Log 946

⋮

⋮

902

CPU(s)

912

906

User interface

Display ⟶ 908

Input Devices ⟶ 910

904

Communication interface(s)

Figure 9

Higher level

Lower level

100

```
{
  "sessionId": "82F17236F5E7435FA19S3A2C8E55C703",
  "specs": {
    "querySpecifications": [{
      "id": "6483812245328897817",
      "fieldsToQuery": [{
        "component": ["sqlproxy.8844rez1j4zvmsickiqw39rtx2kr", "none:Region:nk"]
      }, {
        "component": ["sqlproxy.8844rez1j4zvmsickiqw39rtx2kr", "none:Segment:nk"]
      }, {
        "component": ["sqlproxy.8844rez1j4zvmsickiqw39rtx2kr", "sum:Profit:qk"]
      }],
      "total": {
        "hierarchicalTotalsSettings": {
          "orderedFieldsForTotals": [{
            "field": [{
              "component": ["sqlproxy.8844rez1j4zvmsickiqw39rtx2kr", "none:Region:nk"]
            }, {
              "component": ["sqlproxy.8844rez1j4zvmsickiqw39rtx2kr", "none:Segment:nk"]
            }]
          }, {
```

Figure 36A

```
                    "field": [{
                      "component": ["sqlproxy.8844rez1j4zvemick1qw38rtx2kr", "sum:Profit:qk"]
                    }]
                  }],
                  "fieldsToNotAggregateWithInvalidProjectionOrDisabledTotals": [{
                    "component": ["sqlproxy.8844rez1j4zvemick1qw38rtx2kr", "none:Region:nk"]
                  }, {
                    "component": ["sqlproxy.8844rez1j4zvemick1qw38rtx2kr", "none:Segment:nk"]
                  }, {
                    "component": ["sqlproxy.8844rez1j4zvemick1qw38rtx2kr", "sum:Profit:qk"]
                  }]
                }
              },
              "blending": {
                "datasourceName": "sqlproxy.8844rez1j4zvemick1qw38rtx2kr"
              },
              "defaultMeasureNameForPivot": {
                "field": {
                  "component": ["sqlproxy.8844rez1j4zvemick1qw38rtx2kr", "sum:Profit:qk"]
                }
              }
            }],
            "dataModel": {
              "dataSource": [{
                "columnsToAdd": [{
                  "name": {
                    "component": ["none:Region:nk"]
                  },
                  "fieldType": "FIELD_TYPE_NOMINAL",
                  "vtagg": "VISUAL_TOTAL_AGGREGATION_VTAGG_DEFAULT",
                  "pivotStrategy": "FIELD_PIVOT_STRATEGY_PIVOT_ON_KEY",
                  "role": "FIELD_ROLE_DIMENSION",
                  "dataType": "DATA_TYPE_STRING_TYPE",
                  "instance": {
                    "baseColumn": {
                      "component": ["Region"]
                    },
                    "agg": "AGG_TYPE_NONE"
                  }
                }, {
                  "name": {
                    "component": ["none:Segment:nk"]
                  },
                  "fieldType": "FIELD_TYPE_NOMINAL",
                  "vtagg": "VISUAL_TOTAL_AGGREGATION_VTAGG_DEFAULT",
                  "pivotStrategy": "FIELD_PIVOT_STRATEGY_PIVOT_ON_KEY",
                  "role": "FIELD_ROLE_DIMENSION",
                  "dataType": "DATA_TYPE_STRING_TYPE",
                  "instance": {
                    "baseColumn": {
```

Figure 36B

```
              "component": ["Segment"]
            },
            "agg": "AGG_TYPE_NONE"
          }
        }, {
          "name": {
            "component": ["sum:Profit:gk"]
          },
          "fieldType": "FIELD_TYPE_CONTINUOUS",
          "vtagg": "VISUAL_TOTAL_AGGREGATION_VTAGG_DEFAULT",
          "pivotStrategy": "FIELD_PIVOT_STRATEGY_PIVOT_ON_KEY",
          "role": "FIELD_ROLE_MEASURE",
          "dataType": "DATA_TYPE_REAL_TYPE",
          "instance": {
            "baseColumn": {
              "component": ["Profit"]
            },
            "agg": "AGG_TYPE_SUM"
          }
        }],
        "contextSpecification": {
          "sampleCount": -1.0,
          "sampleUnits": "SORT_UNITS_RECORDS",
          "normalization": "EXTRACT_NORMALIZATION_DENORMALIZED"
        },
        "name": "sqlproxy.8844res1j4zvwmickigw20rts2kr",
        "displayMemberAliases": true
      }],
      "parameters": [{
        "name": {
          "component": ["Parameter 1"]
        },
        "value": {
          "integer": "5"
        }
      }, {
        "name": {
          "component": ["Parameter 2"]
        },
        "value": {
          "integer": "200"
        }
      }]
    }
  },
  "queryCacheFreshnessSettings": {
    "queryCacheTtlMinutes": "-1",
    "lowestQueryTimeStamp": "2023-08-17 00:59:02.337"
  }
}
```

Figure 36C

```
{
    "tableInformation": {
      "queryId": "6403812245320897817",
      "rowCount": "12",
      "columns": [{
        "name": {
          "component": ["none:Region:nk"]
        },
        "dataType": "DATA_TYPE_STRING_TYPE",
        "collation": {
          "name": "LEN_RUS_S2"
        }
      }, {
        "name": {
          "component": ["none:Segment:nk"]
        },
        "dataType": "DATA_TYPE_STRING_TYPE",
        "collation": {
          "name": "LEN_RUS_S2"
        }
      }, {
        "name": {
          "component": ["sum:Profit:qk"]
        },
        "dataType": "DATA_TYPE_REAL_TYPE",
        "precision": 15,
        "scale": -1
      }]
    }
}
```

Figure 36D

```
{
  "query": {

"columns": [
      {
        "columnName": "Region",
      },
      {
        "columnName": "Segment"
      },
      {
        "columnName": "Profit",
        "function": "SUM"
      }
    ],
  }
}
```

Figure 37

```
specs {
  query_specifications {
    fields_to_query {
      component: "DSInternalName"
      component: "none:Region:nk"
    }
    fields_to_query {
      component: "DSInternalName"
      component: "none:Segment:nk"
    }
    fields_to_query {
      component: "DSInternalName"
      component: "sum:Profit:qk"
    }
  }
  data_model {
    data_source {
      columns_to_add {
```

Figure 38A

```
      name {
        component: "none:Region:nk"
      }
      field_type: FIELD_TYPE_NOMINAL
      role: FIELD_ROLE_DIMENSION
      data_type: DATA_TYPE_STRING_TYPE
      instance {
        base_column {
          component: "Region"
        }
        agg: AGG_TYPE_NONE
      }
    }
    columns_to_add {
      name {
        component: "none:Segment:nk"
      }
      field_type: FIELD_TYPE_NOMINAL
      role: FIELD_ROLE_DIMENSION
      data_type: DATA_TYPE_STRING_TYPE
      instance {
        base_column {
          component: "Segment"
        }
        agg: AGG_TYPE_NONE
      }
    }
    columns_to_add {
      name {
        component: "sum:Profit:qk"
      }
      field_type: FIELD_TYPE_CONTINUOUS
      role: FIELD_ROLE_MEASURE
      data_type: DATA_TYPE_REAL_TYPE
      instance {
        base_column {
          component: "Profit"
        }
        agg: AGG_TYPE_SUM
      }
    }
    name: "DSInternalName"
  }
 }
}
```

Figure 38B

```
{
    "data": [
        {
            "Region": "Central",
            "Segment": "Consumer",
            "SUM(Profit)": 8722.993
        },
        {
            "Region": "Central",
            "Segment": "Corporate",
            "SUM(Profit)": 18703.902
        },
        {
            "Region": "Central",
            "Segment": "Home Office",
            "SUM(Profit)": 12438.412
        },
        {
            "Region": "East",
            "Segment": "Consumer",
            "SUM(Profit)": 43824.983
        },
        {
            "Region": "East",
            "Segment": "Corporate",
            "SUM(Profit)": 24462.001
        },
        {
            "Region": "East",
            "Segment": "Home Office",
            "SUM(Profit)": 27396.277
        },
        {
```

Figure 39A

```
        "Region": "South",
        "Segment": "Consumer",
        "SUM(Profit)": 26913.573
    },
    {

"Region": "South",
        "Segment": "Corporate",
        "SUM(Profit)": 15215.223
    },
    {

"Region": "South",
        "Segment": "Home Office",
        "SUM(Profit)": 4628.634
    },
    {

"Region": "West",
        "Segment": "Consumer",
        "SUM(Profit)": 57789.898
    },
    {

"Region": "West",
        "Segment": "Corporate",
        "SUM(Profit)": 35868.514
    },
    {

"Region": "West",
        "Segment": "Home Office",
        "SUM(Profit)": 17228.485
    }
    )
}
```

Figure 39B

```
// Describes the database columns and analytics that the VizData Service should
// obtain and provide to the user.
message QuerySpecification {
    int64 id = 1;
    repeated FieldName fields_to_query = 2;          *
    bool disaggregate = 3;
    FilterSpecification filters = 4;
    Forecast forecast = 5;
    Total total = 6;
    Blending blending = 7;
    Densification densification = 8;
    TimeSeriesExtension time_series_extension = 9;
    IndexedFieldName default_measure_name_for_pivot = 10;
    TableCalculations table_calculation = 11;
    repeated Sort sort = 12;
    repeated FieldName measures_for_legacy_query_fusion = 13;
}

// A list of queries, along with session context overrides and a data model
// describing the data source to run the queries on.
message QuerySpecificationsWithDataModel {
    repeated QuerySpecification query_specifications = 1;   *
    DataModel data_model = 2;
    QuerySessionContext session_context = 3;
}
```

Figure 40A

```
// Describes a data model to be used with a collection of QuerySpecification
// objects in a VizData API query.
message DataModel {

// One or more data sources.
  repeated DataSource data_source = 1; *

// One or more parameters to share across data sources.
  repeated Parameter parameters = 2;

// Zero or more filters (can be on a datasource, context, or query).
  repeated Filter filters = 3; *

// Zero or more levels and members (for set functions)
  repeated LevelAndMembers levels_and_members = 4; *

// Optional impersonated user identity. When this identity is provided,
  // it only applies to user functions that are not part of the published data
  // source, such as user functions in formulas provided by the API caller.
  // As of this API version, impersonated_user.name must not be the name of the
  // logged-in user (i.e. UserAttributes.session_user).
  IdentityPrincipal impersonated_user = 5;

// Optional list of groups that the impersonated user is considered to be a
  // part of.
  repeated string impersonated_groups = 6;
}
```

Figure 40B

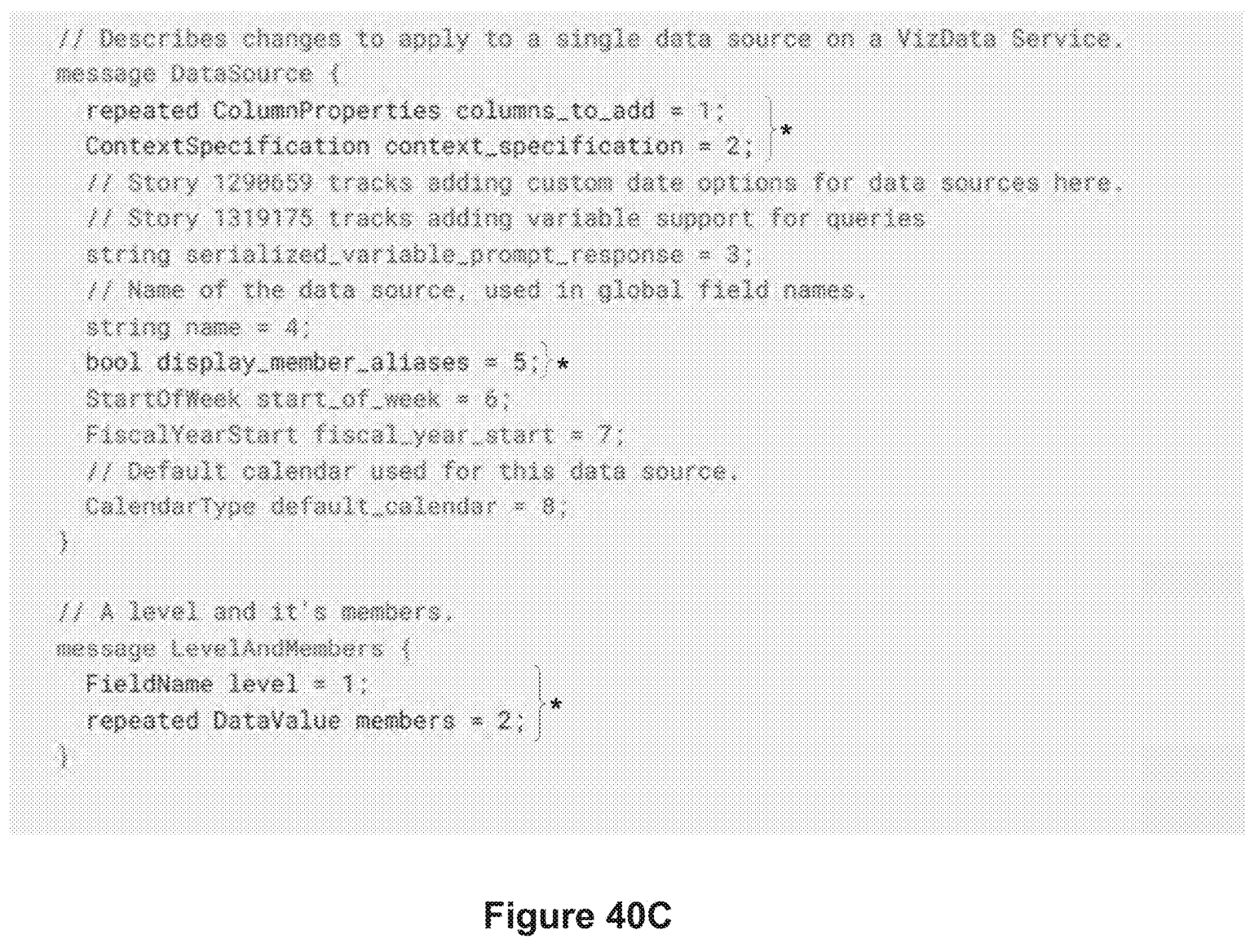

```
// Describes changes to apply to a single data source on a VizData Service.
message DataSource {
  repeated ColumnProperties columns_to_add = 1;
  ContextSpecification context_specification = 2;

// Story 1290659 tracks adding custom date options for date sources here.
  // Story 1310175 tracks adding variable support for queries
  string serialized_variable_prompt_response = 3;

// Name of the data source, used in global field names.
  string name = 4;
  bool display_member_aliases = 5;
  StartOfWeek start_of_week = 6;
  FiscalYearStart fiscal_year_start = 7;

// Default calendar used for this data source.
  CalendarType default_calendar = 8;
}

// A level and it's members.
message LevelAndMembers {
  FieldName level = 1;
  repeated DataValue members = 2;
}
```

Figure 40C

```
// ArbitraryFilter.
message ArbitraryFilter (
    SetFunction set_function = 1;  *
)

// QuantitativeFilter.
message QuantitativeFilter (
    QuantitativeIncludeValues included_values = 1;  *
    DataValue min = 2;
    DataValue max = 3;
)

// RelativeDateFilter.
message RelativeDateFilter (
    DataType column_type = 1;
    DatePeriodType period_type = 2;
    int64 first_period = 3;
    int64 last_period = 4;
    bool include_future = 5;
    bool include_nulls = 6;
    DataValue anchor = 7;
)  *

// Filter.
message Filter (
    FilterType filter_type = 1;
    FieldName field_to_filter = 2;
    bool should_affect_totals_for_table_calc_filter = 3;
    oneof filter (
        ArbitraryFilter arbitrary_filter = 4;  *
```

Figure 40D

```
QuantitativeFilter quantitative_filter = 5;
RelativeDateFilter relative_date_filter = 6;
```

```
{
    "data": [
        {
            "Category": "Furniture",
            "AVG(Sales)": 342.911
        },
        {
            "Category": "Office Supplies",
            "AVG(Sales)": 119.434
        },
        {
            "Category": "Technology",
            "AVG(Sales)": 458.345
        }
    ]
}
```

Figure 41

```
{
    "data": [
        {
            "Furniture",
            342.911
        },
        {
            "Office Supplies",
            119.434
        },
        {
            "Technology",
            450.345
        }
    ]
}
```

Figure 42

```
Unset
{
  "query": {
    "columns": [
      {
        "columnName": "Order Date",
        "sortPriority": 1
      },{
        "columnName": "Sales",
        "function": "SUM"
      },
      {
        "columnName": "Ship Mode"
      }
    ],
    "filters": [
      {
        "column": {
          "columnName": "Sales",
          "function": "SUM"
        },
        "filterType": "QUANTITATIVE",
        "quantitativeFilterType": "RANGE",
        "min": 10,
        "max": 63
      },
      {
        "columnName": "Ship Mode",
        "filterType": "SET",
        "values": [ "First Class"],
        "exclude": false
      }
    ]
  }, "options": {
    "returnFormat": "ARRAYS"
  }
}
```

Figure 43

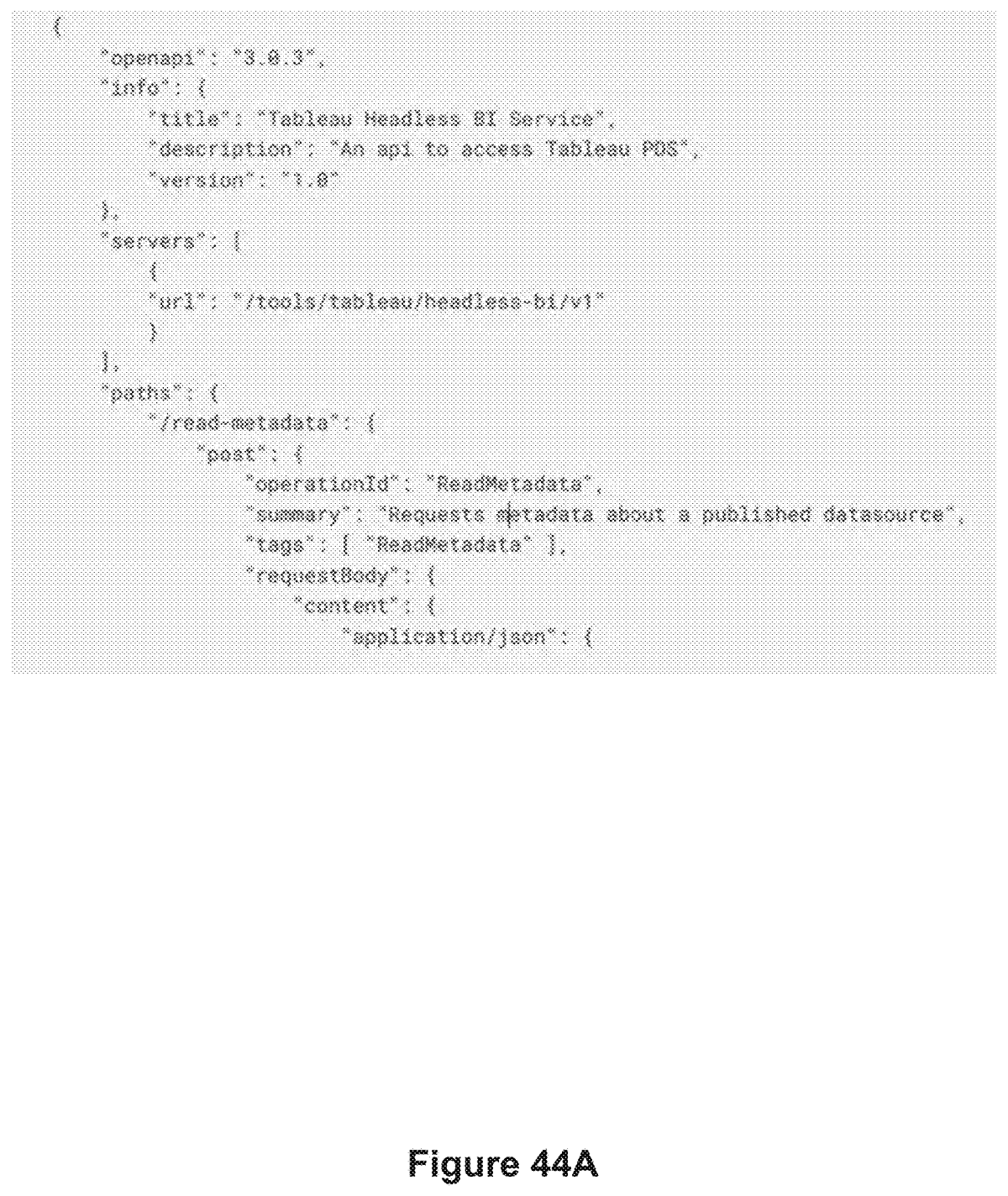

```
{
    "openapi": "3.0.3",
    "info": {
        "title": "Tableau Headless BI Service",
        "description": "An api to access Tableau PGS",
        "version": "1.0"
    },
    "servers": [
        {
        "url": "/tools/tableau/headless-bi/v1"
        }
    ],
    "paths": {
        "/read-metadata": {
            "post": {
                "operationId": "ReadMetadata",
                "summary": "Requests metadata about a published datasource",
                "tags": [ "ReadMetadata" ],
                "requestBody": {
                    "content": {
                        "application/json": {
```

Figure 44A

```
                                "schema": {
                                    "$ref":
"#/components/schemas/ReadMetadataRequest"
                                }
                            }
                        }
                    },
                    "responses": {
                        "200": {
                            "description": "200 response",
                            "content": {
                                "application/json": {
                                    "schema": {
                                        "$ref":
"#/components/schemas/MetadataOutput"
                                    }
                                }
                            }
                        }
                    }
                }
            },
            "/query-datasource": {
                "post": {
                    "operationId": "QueryDatasource",
                    "summary": "Executes a single query against a published
datasource",
                    "tags": [ "QueryDatasource" ],
                    "requestBody": {
                        "content": {
                            "application/json": {
                                "schema": {
                                    "$ref": "#/components/schemas/QueryRequest"
                                }
                            }
                        }
                    },
                    "responses": {
                        "200": {
                            "description": "200 response",
                            "content": {
                                "application/json": {
                                    "schema": {
                                        "$ref": "#/components/schemas/QueryOutput"
```

Figure 44B

```
                    )
                  )
                )
              )
            )
          )
        },
        "/simple-request": {
          "get": {
            "operationId": "SimpleRequest",
            "summary": "A simple request that can be used for testing or
healthcheck",
            "security": [],
            "tags": [ "SimpleRequest" ],
            "responses": {
              "200": {
                "description": "200 response",
                "content": {
                  "application/json": {
                    "schema": {
                      "type": "string"
                    }
                  }
                }
              }
            }
          }
        }
      },
      "components": {
        "schemas": {
          "Column": {
            "type": "object",
            "anyOf": [
              {
                "required": ["columnName"]
              },
              {
                "required": ["columnName", "function"]
              },
              {
                "required": ["columnName", "calculation"]
              }
            ],
```

Figure 44C

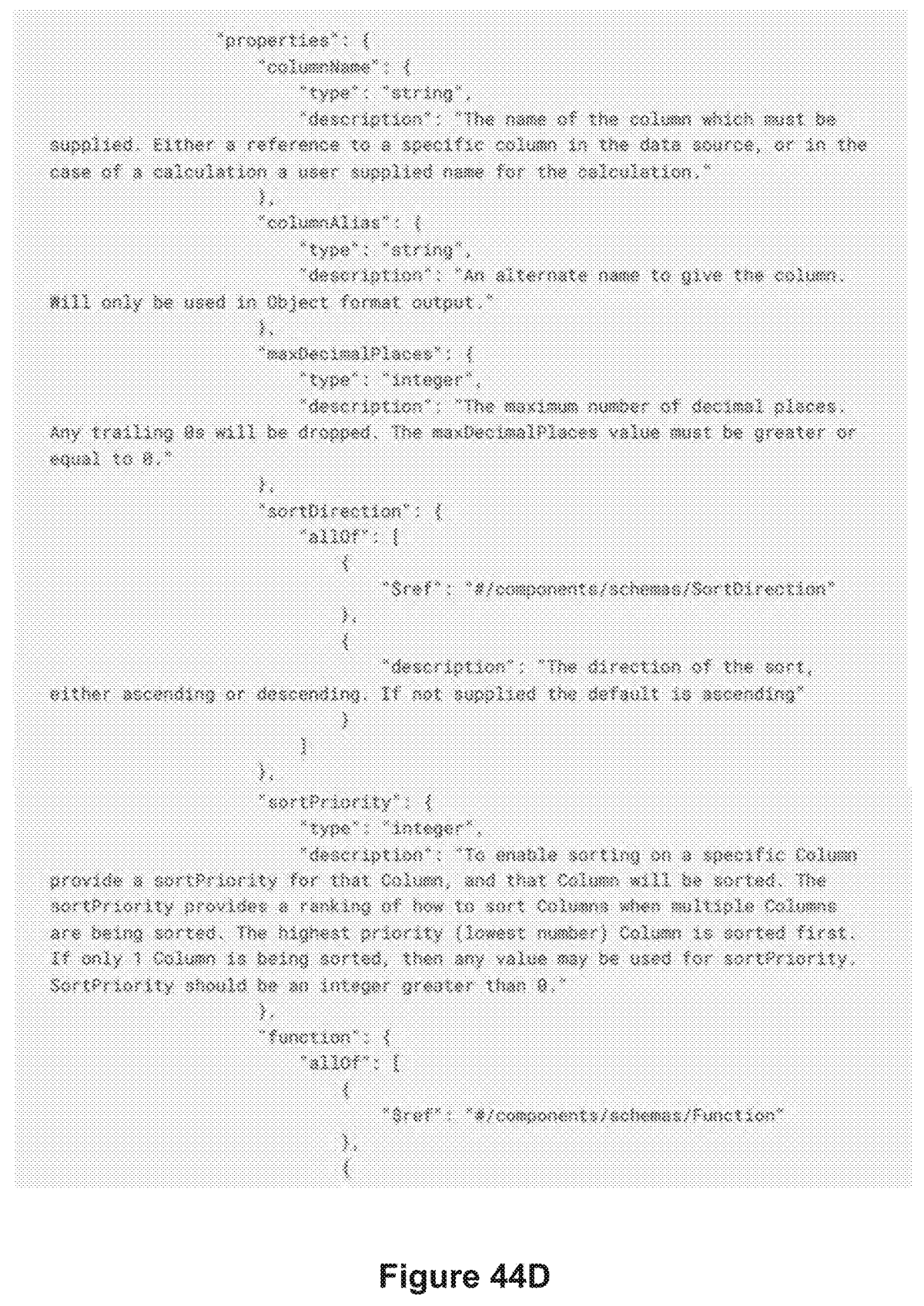

```
"properties": {
    "columnName": {
        "type": "string",
        "description": "The name of the column which must be
supplied. Either a reference to a specific column in the data source, or in the
case of a calculation a user supplied name for the calculation."
    },
    "columnAlias": {
        "type": "string",
        "description": "An alternate name to give the column.
Will only be used in Object format output."
    },
    "maxDecimalPlaces": {
        "type": "integer",
        "description": "The maximum number of decimal places.
Any trailing 0s will be dropped. The maxDecimalPlaces value must be greater or
equal to 0."
    },
    "sortDirection": {
        "allOf": [
            {
                "$ref": "#/components/schemas/SortDirection"
            },
            {
                "description": "The direction of the sort,
either ascending or descending. If not supplied the default is ascending"
            }
        ]
    },
    "sortPriority": {
        "type": "integer",
        "description": "To enable sorting on a specific Column
provide a sortPriority for that Column, and that Column will be sorted. The
sortPriority provides a ranking of how to sort Columns when multiple Columns
are being sorted. The highest priority (lowest number) Column is sorted first.
If only 1 Column is being sorted, then any value may be used for sortPriority.
SortPriority should be an integer greater than 0."
    },
    "function": {
        "allOf": [
            {
                "$ref": "#/components/schemas/Function"
            },
            {
```

Figure 44D

```
                                    "description": "Provide a Function for a Column
to generate an aggregation against that Columns' values. For example providing
the SUM Function will cause an aggregated SUM to be calculated for that
Column."
                                }
                            }
                        },
                    "calculation": {
                        "type": "string",
                        "description": "Provide a Calculation to generate a new
data Column based on that Calculation. The Calcuation should contain a string
based on the Tableau Calculated Field Syntax. Since this is a newly generated
Column, you must give it its own unique Column Name. Also a Column cannot
contain both a Function, and a Calculation."
                        }
                    }
                },
            "ColumnMetadata": {
                "type": "object",
                "description": "Describes a column in the datasource that can
be used to create queries.",
                "properties": {
                    "columnName": {
                        "type": "string"
                    },
                    "caption": {
                        "type": "string"
                    },
                    "dataType": {
                        "type": "string",
                        "enum": [
                            "UNSPECIFIED",
                            "INTEGER",
                            "REAL",
                            "STRING",
                            "DATETIME",
                            "BOOLEAN",
                            "DATE",
                            "SPATIAL",
                            "UNKNOWN",
                            "UNRECOGNIZED"
                        ]
                    },
                    "columnContainsNulls": {
```

Figure 44E

```
                "type": "boolean"
            },
            "objectGraphId": {
                "type": "string"
            }
        }
    },
    "Connection": {
        "type": "object",
        "required": ["tableauServerName", "datasource"],
        "properties": {
            "tableauServerName": {
                "type": "string"
            },
            "siteId": {
                "type": "string"
            },
            "datasource": {
                "type": "string"
            },
            "databaseUsername": {
                "type": "string"
            },
            "databasePassword": {
                "type": "string"
            }
        }
    },
    "DateObject": {
        "type": "object",
        "required": ["day", "month", "year"],
        "properties": {
            "day": {
                "type": "integer"
            },
            "month": {
                "type": "integer"
            },
            "year": {
                "type": "integer"
            }
        }
    },
    "Filter": {
```

Figure 44F

```
        "type": "object",
        "required": ["filterType"],
        "properties": {
            "columnName": {
                "type": "string"
            },
            "column": {
                "allOf": [
                    {
                        "$ref": "#/components/schemas/FilterColumn"
                    }
                ]
            },
            "filterType": {
                "type": "string",
                "enum": [
                    "QUANTITATIVE",
                    "SET",
                    "DATE",
                    "TOP"
                ]
            }
        },
        "discriminator": {
            "propertyName": "filterType",
            "mapping": {
                "QUANTITATIVE":
"#/components/schemas/QuantitativeFilter",
                "SET": "#/components/schemas/SetFilter",
                "DATE": "#/components/schemas/RelativeDateFilter",
                "TOP": "#/components/schemas/TopNFilter"
            }
        }
    },
    "FilterColumn": {
        "type": "object",
        "oneOf": [
            {
                "required": ["columnName", "function"]
            },
            {
                "required": ["calculation"]
            }
        ],
```

Figure 44G

```
"properties": {
    "columnName": {
        "type": "string"
    },
    "function": {
        "allOf": [
            {
                "$ref": "#/components/schemas/Function"
            }
        ]
    },
    "calculation": {
        "type": "string"
    }
}
},
"Function": {
    "type": "string",
    "description": "The standard set of Tableau aggregations.",
    "enum": [
        "SUM",
        "AVG",
        "MEDIAN",
        "COUNT",
        "COUNT_DIST",
        "MIN",
        "MAX",
        "STD_DEV",
        "VARIANCE",
        "CLCT",
        "DATE_YEAR",
        "DATE_QTR",
        "DATE_MONTH",
        "DATE_WEEK",
        "DATE_DAY",
        "DATE_TRUNC_YEAR",
        "DATE_TRUNC_QTR",
        "DATE_TRUNC_MONTH",
        "DATE_TRUNC_WEEK",
        "DATE_TRUNC_DAY"
    ]
},
"MetadataOutput": {
    "type": "object",
```

Figure 44H

```
            "properties": {
                "data": {
                    "type": "array",
                    "items": {
                        "$ref": "#/components/schemas/ColumnMetadata"
                    }
                }
            }
        },
        "QuantitativeFilter": {
            "allOf": [
                {
                    "$ref": "#/components/schemas/Filter"
                },
                {
                    "type": "object",
                    "required": ["quantitativeFilterType"],
                    "properties": {
                        "quantitativeFilterType": {
                            "type": "string",
                            "enum": [ "RANGE", "MIN", "MAX", "SPECIAL" ]
                        },
                        "min": {
                            "type": "number",
                            "description": "A numerical value, either
integer or floating point indicating the minimum value to filter upon. Required
for RANGE and MIN"
                        },
                        "max": {
                            "type": "number",
                            "description": "A numerical value, either
integer or floating point indicating the maximum value to filter upon. Required
for RANGE and MAX"
                        },
                        "minDate": {
                            "$ref": "#/components/schemas/DateObject"
                        },
                        "maxDate": {
                            "$ref": "#/components/schemas/DateObject"
                        },
                        "quantitativeFilterIncludedValues": {
                            "allOf": [
                                {
```

Figure 44I

```
                                          "$ref":
"#/components/schemas/QuantitativeFilterIncludedValues"
                                       }
                                    }
                                 }
                              }
                           }
                        }
                     },
                  "QuantitativeFilterIncludedValues": {
                     "type": "string",
                     "enum": [
                        "ALL",
                        "NON_NULL",
                        "NULL",
                        "IN_RANGE",
                        "IN_RANGE_OR_NULL",
                        "NONE"
                     ]
                  },
                  "Query": {
                     "description": "The Query is the fundamental interface to
Headless BI. It holds the specific semantics to perform against the Data
Source. A Query consists of an array of Columns to query against, an optional
array of filters to apply to the query, and an optional Metadata field to
modify the query behavior.",
                     "required": [
                        "columns"
                     ],
                     "type": "object",
                     "properties": {
                        "columns": {
                           "description": "An array of Columns that define the
query",
                           "type": "array",
                           "items": {
                              "$ref": "#/components/schemas/Column"
                           }
                        },
                        "filters": {
                           "description": "An optional array of Filters to apply
to the query",
                           "type": "array",
                           "items": {
```

Figure 44J

```
                              "$ref": "#/components/schemas/Filter"
                          }
                      },
                  "options": {
                      "allOf": [
                          {
                              "$ref": "#/components/schemas/QueryOptions"
                          },
                          {
                              "description": "Some optional metadata that can
be used to adjust the behavior of the query."
                          }
                      ]
                  }
              }
          },
          "QueryOptions": {
              "type": "object",
              "description": "Some optional metadata that can be used to
adjust the behavior of the query.",
              "properties": {
                  "returnFormat": {
                      "allOf": [
                          {
                              "$ref": "#/components/schemas/ReturnFormat"
                          }
                      ]
                  },
                  "disaggregate": {
                      "type": "boolean",
                      "default": false
                  }
              }
          },
          "QueryOutput": {
              "type": "object",
              "properties": {
                  "data": {
                      "type": "array",
                      "items": {
                      }
                  }
              }
          },
```

Figure 44K

```
"QueryRequest": {
    "type": "object",
    "required": [
        "connection", "query"
    ],
    "properties": {
        "connection": {
            "$ref": "#/components/schemas/Connection"
        },
        "query": {
            "$ref": "#/components/schemas/Query"
        }
    }
},
"ReadMetadataRequest": {
    "type": "object",
    "required": [
        "connection"
    ],
    "properties": {
        "connection": {
            "$ref": "#/components/schemas/Connection"
        }
    }
},
"ReturnFormat": {
    "type": "string",
    "enum": [
        "OBJECTS",
        "ARRAYS"
    ]
},
"SetFilter": {
    "allOf": [
        {
            "$ref": "#/components/schemas/Filter"
        },
        {
            "type": "object",
            "required": ["values", "exclude"],
            "properties": {
                "values": {
                    "type": "array",
                    "items": {}
```

Figure 44L

```
                        },
                        "exclude": {
                            "type": "boolean"
                        }
                    }
                }
            }
        },
        "SortDirection": {
            "type": "string",
            "description": "The direction of the sort, either ascending or
descending. If not supplied the default is ascending",
            "enum": [
                "ASC",
                "DESC"
            ]
        },
        "RelativeDateFilter": {
            "allOf": [
                {
                    "$ref": "#/components/schemas/Filter"
                },
                {
                    "type": "object",
                    "required": ["periodType"],
                    "properties": {
                        "periodType": {
                            "type": "string",
                            "enum": [
                                "DAY",
                                "WEEK",
                                "MONTH",
                                "QUARTER",
                                "YEAR"
                            ]
                        },
                        "firstPeriod": {
                            "type": "integer"
                        },
                        "lastPeriod": {
                            "type": "integer"
                        },
                        "anchor": {
                            "allOf": [
```

Figure 44M

```
                                    {
                                        "$ref":
    "#/components/schemas/DateObject"
                                    }
                                }
                            },
                            "includeNulls": {
                                "type": "boolean"
                            }
                        }
                    }
                ]
            },
            "TopNFilter": {
                "allOf": [
                    {
                        "$ref": "#/components/schemas/Filter"
                    },
                    {
                        "type": "object",
                        "required": ["direction, howMany, fieldToMeasure"],
                        "properties": {
                            "direction": {
                                "enum": [
                                    "TOP",
                                    "BOTTOM"
                                ],
                                "description": "Top (Ascending) or Bottom
    (Descending) N"
                            },
                            "howMany": {
                                "type": "integer",
                                "description": "The number of values from the
    Top or the Bottom of the given fieldToMeasure"
                            },
                            "fieldToMeasure": {
                                "allOf": [
                                    {
                                        "$ref":
    "#/components/schemas/FilterColumn"
                                    }
                                ]
                            }
                        }
                    }
                ]
```

Figure 44N

```
                )
            ]
        }
    },
    "securitySchemes": {
        "CredentialKey": {
            "type": "apiKey",
            "in": "header",
            "name": "Credential-Key"
        },
        "CredentialValue": {
            "type": "apiKey",
            "in": "header",
            "name": "Credential-Value"
        }
    },
    "headers": {},
    "responses": {},
    "parameters": {}
},
"tags": [],
"security": [
    {
        "CredentialKey": []
    },
    {
        "CredentialValue": []
    }
]
}
```

Figure 45A:
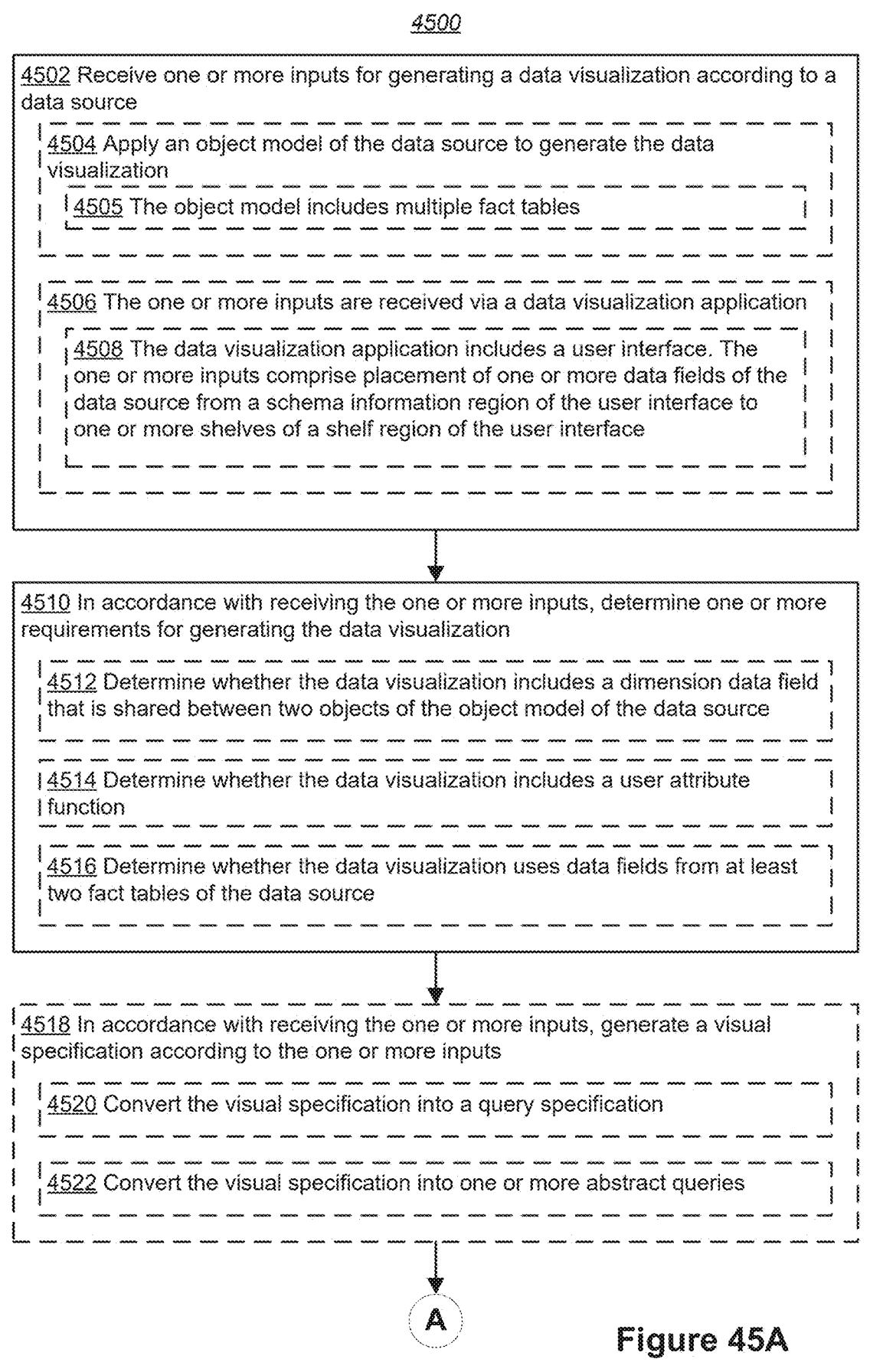

4502 Receive one or more inputs for generating a data visualization according to a data source 4504 Apply an object model of the data source to generate the data visualization 4505 The object model includes multiple fact tables 4506 The one or more inputs are received via a data visualization application 4508 The data visualization application includes a user interface. The one or more inputs comprise placement of one or more data fields of the data source from a schema information region of the user interface to one or more shelves of a shelf region of the user interface 4510 In accordance with receiving the one or more inputs, determine one or more requirements for generating the data visualization 4512 Determine whether the data visualization includes a dimension data field that is shared between two objects of the object model of the data source 4514 Determine whether the data visualization includes a user attribute function 4516 Determine whether the data visualization uses data fields from at least two fact tables of the data source 4518 In accordance with receiving the one or more inputs, generate a visual specification according to the one or more inputs 4520 Convert the visual specification into a query specification 4522 Convert the visual specification into one or more abstract queries (A)

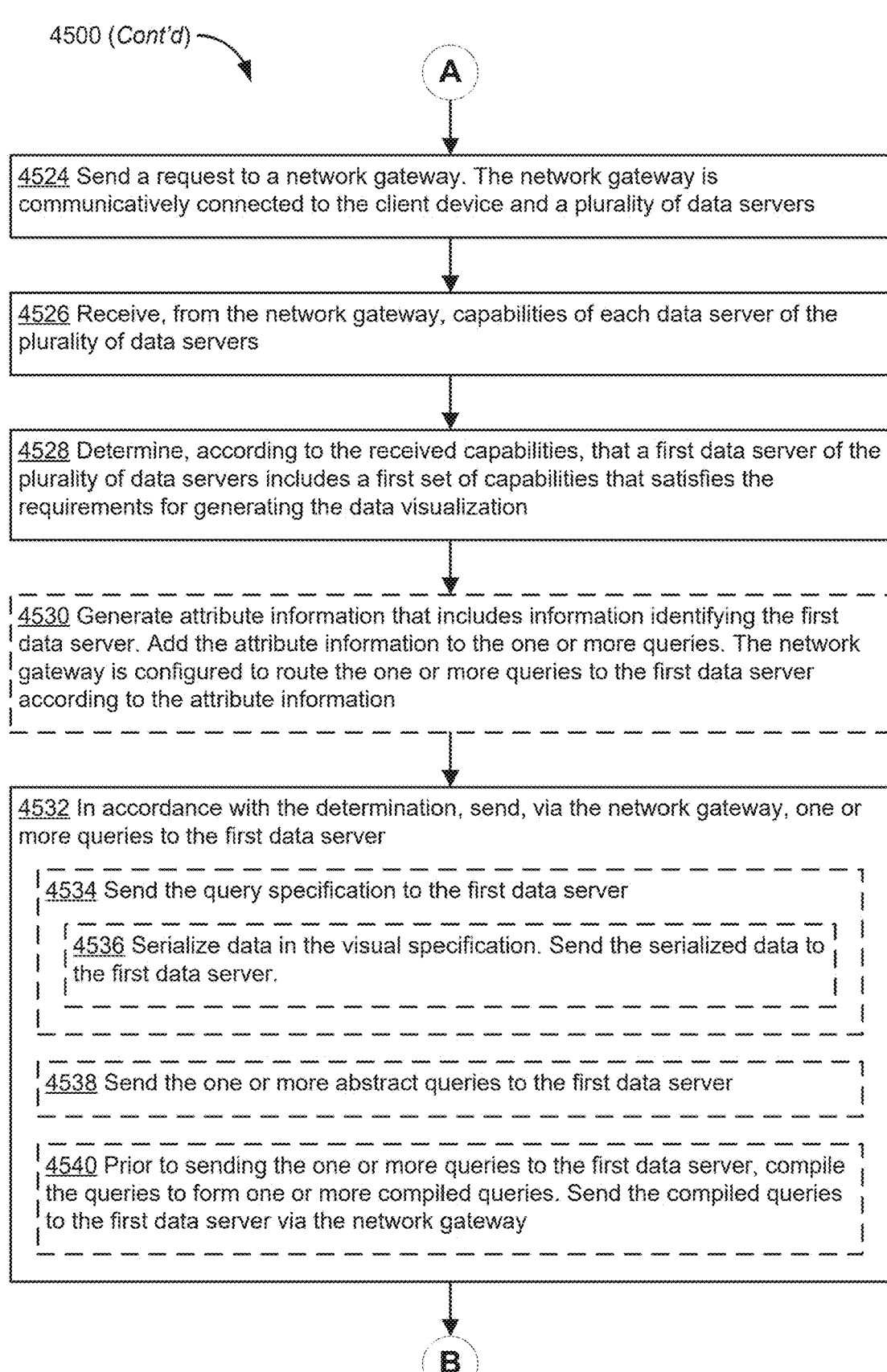

A

4524 Send a request to a network gateway. The network gateway is communicatively connected to the client device and a plurality of data servers 4526 Receive, from the network gateway, capabilities of each data server of the plurality of data servers 4528 Determine, according to the received capabilities, that a first data server of the plurality of data servers includes a first set of capabilities that satisfies the requirements for generating the data visualization 4530 Generate attribute information that includes information identifying the first data server. Add the attribute information to the one or more queries. The network gateway is configured to route the one or more queries to the first data server according to the attribute information 4532 In accordance with the determination, send, via the network gateway, one or more queries to the first data server 4534 Send the query specification to the first data server 4536 Serialize data in the visual specification. Send the serialized data to the first data server.

4538 Send the one or more abstract queries to the first data server

4540 Prior to sending the one or more queries to the first data server, compile the queries to form one or more compiled queries. Send the compiled queries to the first data server via the network gateway

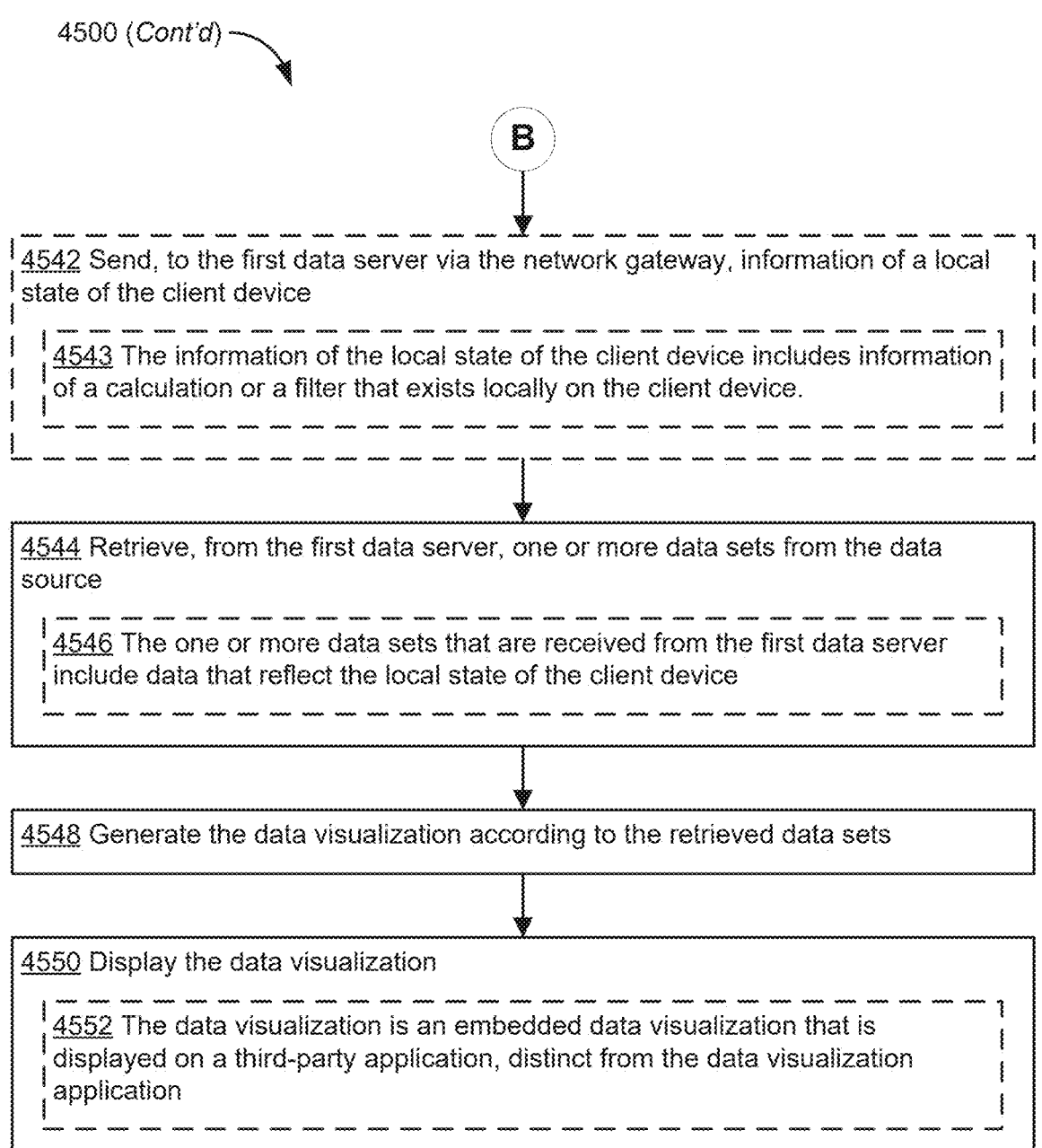

4542 Send, to the first data server via the network gateway, information of a local state of the client device 4543 The information of the local state of the client device includes information of a calculation or a filter that exists locally on the client device.

4544 Retrieve, from the first data server, one or more data sets from the data source 4546 The one or more data sets that are received from the first data server include data that reflect the local state of the client device 4548 Generate the data visualization according to the retrieved data sets 4550 Display the data visualization 4552 The data visualization is an embedded data visualization that is displayed on a third-party application, distinct from the data visualization application

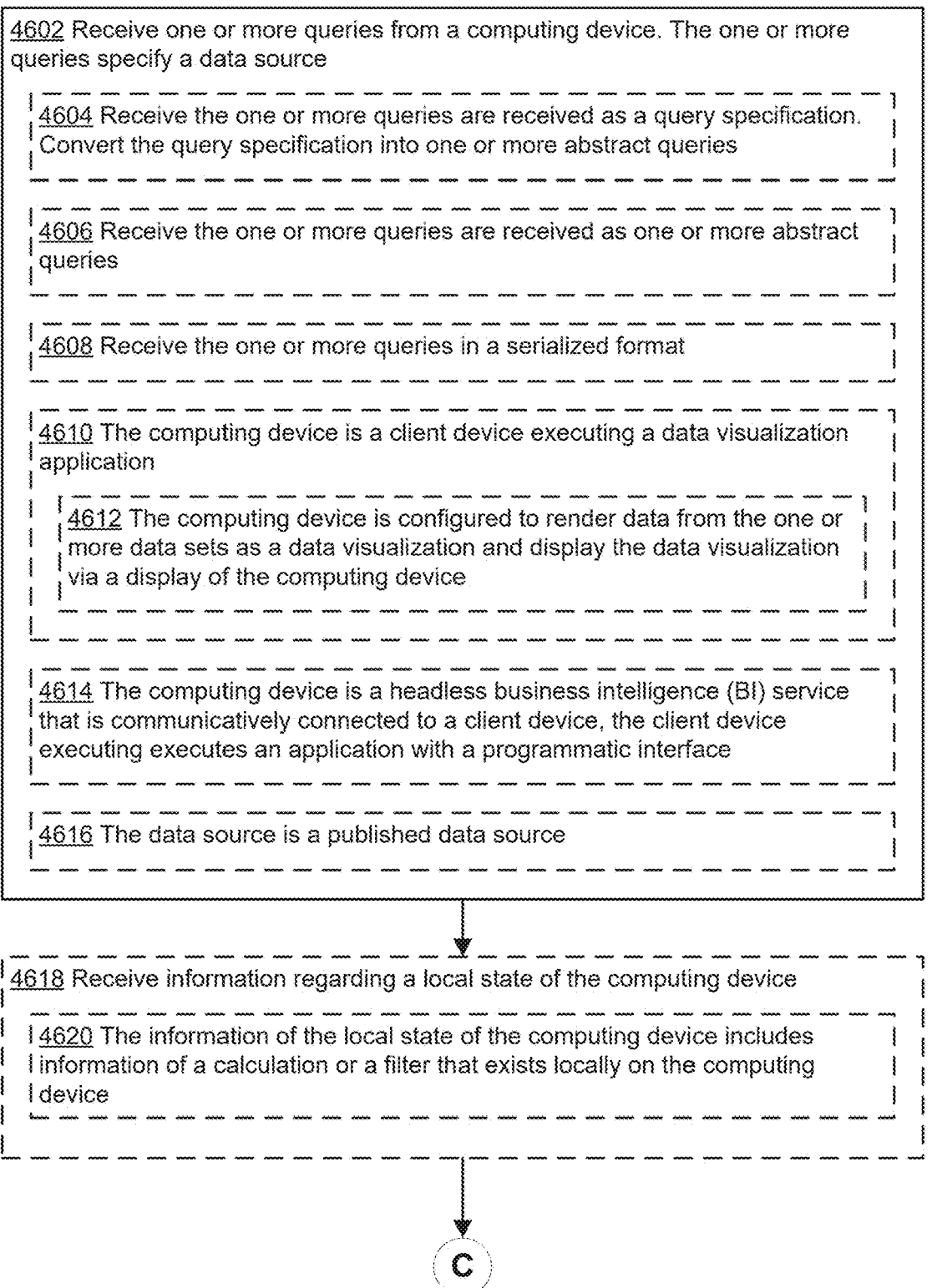

4602 Receive one or more queries from a computing device. The one or more queries specify a data source 4604 Receive the one or more queries are received as a query specification. Convert the query specification into one or more abstract queries 4606 Receive the one or more queries are received as one or more abstract queries 4608 Receive the one or more queries in a serialized format 4610 The computing device is a client device executing a data visualization application 4612 The computing device is configured to render data from the one or more data sets as a data visualization and display the data visualization via a display of the computing device 4614 The computing device is a headless business intelligence (BI) service that is communicatively connected to a client device, the client device executing executes an application with a programmatic interface 4616 The data source is a published data source 4618 Receive information regarding a local state of the computing device 4620 The information of the local state of the computing device includes information of a calculation or a filter that exists locally on the computing device

Figure 46B:
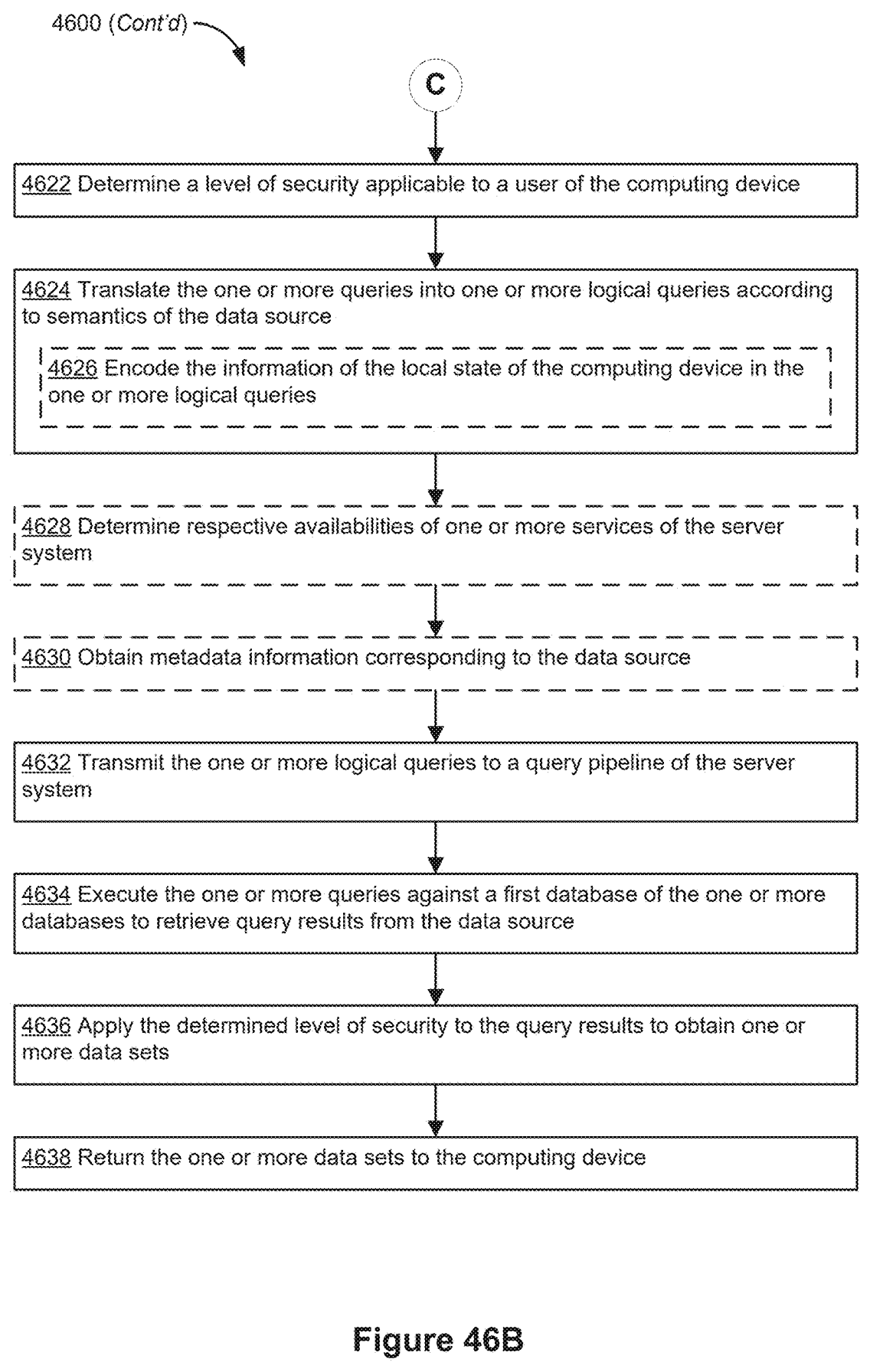

4622 Determine a level of security applicable to a user of the computing device

4624 Translate the one or more queries into one or more logical queries according to semantics of the data source 4626 Encode the information of the local state of the computing device in the one or more logical queries 4628 Determine respective availabilities of one or more services of the server system 4630 Obtain metadata information corresponding to the data source 4632 Transmit the one or more logical queries to a query pipeline of the server system 4634 Execute the one or more queries against a first database of the one or more databases to retrieve query results from the data source 4636 Apply the determined level of security to the query results to obtain one or more data sets 4638 Return the one or more data sets to the computing device

Figure 47A:
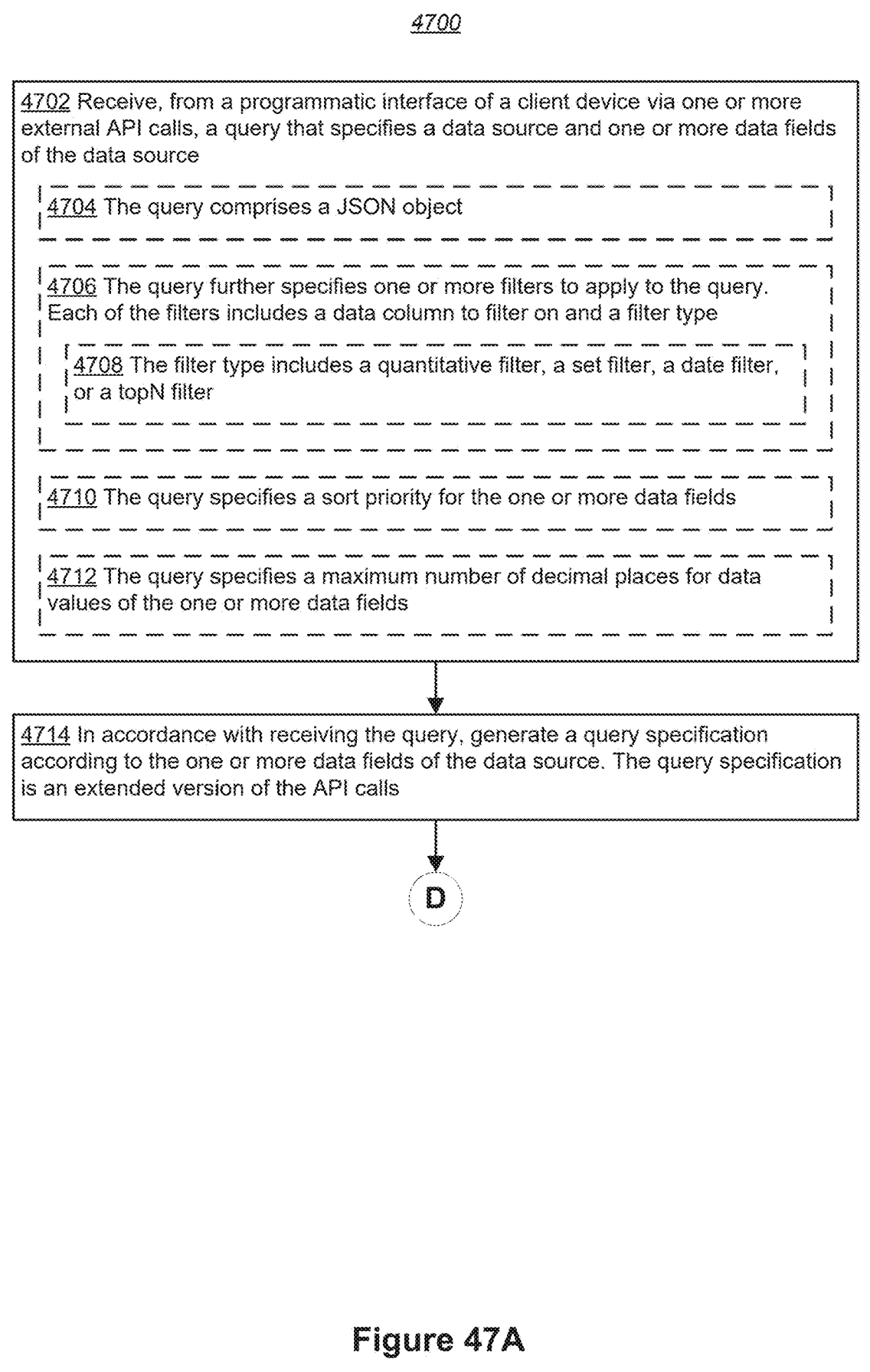

4702 Receive, from a programmatic interface of a client device via one or more external API calls, a query that specifies a data source and one or more data fields of the data source 4704 The query comprises a JSON object 4706 The query further specifies one or more filters to apply to the query. Each of the filters includes a data column to filter on and a filter type 4708 The filter type includes a quantitative filter, a set filter, a date filter, or a topN filter 4710 The query specifies a sort priority for the one or more data fields 4712 The query specifies a maximum number of decimal places for data values of the one or more data fields 4714 In accordance with receiving the query, generate a query specification according to the one or more data fields of the data source. The query specification is an extended version of the API calls

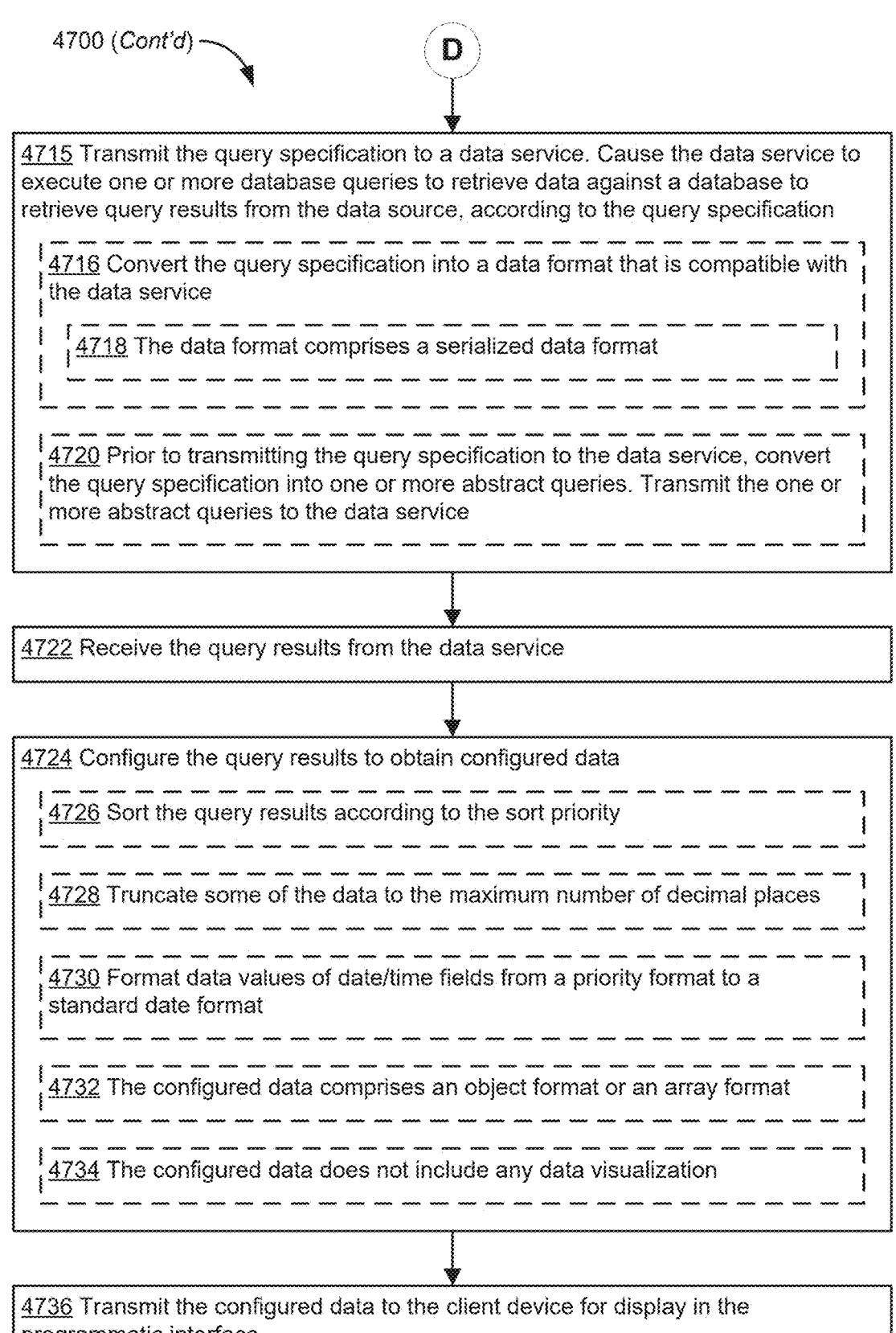

4715 Transmit the query specification to a data service. Cause the data service to execute one or more database queries to retrieve data against a database to retrieve query results from the data source, according to the query specification 4716 Convert the query specification into a data format that is compatible with the data service 4718 The data format comprises a serialized data format 4720 Prior to transmitting the query specification to the data service, convert the query specification into one or more abstract queries. Transmit the one or more abstract queries to the data service 4722 Receive the query results from the data service 4724 Configure the query results to obtain configured data 4726 Sort the query results according to the sort priority 4728 Truncate some of the data to the maximum number of decimal places 4730 Format data values of date/time fields from a priority format to a standard date format 4732 The configured data comprises an object format or an array format 4734 The configured data does not include any data visualization 4736 Transmit the configured data to the client device for display in the programmatic interface

Figure 47B

SYSTEMS AND METHODS FOR FEDERATED QUERY ABSTRACTION

RELATED APPLICATIONS

This application is a continuation of U.S. patent application Ser. No. 18/751,126, filed Jun. 21, 2024, titled "Systems, Devices and Methods for Selection of Data Services," which claims priority to: (i) U.S. Provisional Patent Application No. 63/523,011, filed Jun. 23, 2023, titled "Systems and Methods for Federated Query Abstraction"; (ii) U.S. Provisional Patent Application No. 63/639,650, filed Apr. 28, 2024, titled "VizQL Data Service-Open API for Public Access to the Tableau Query Service"; and (iii) U.S. Provisional Patent Application No. 63/639,652, filed Apr. 28, 2024, titled "VizQL Data Service and Client with Smart Selection of Service." All of the aforementioned applications are hereby incorporated by reference herein in their entireties.

This application is related to U.S. patent application Ser. No. 18/751,131, filed Jun. 21, 2024, titled "VizQL Data Service-Open APIs for Public Access to the Tableau Query Service," which is incorporated by reference herein in its entirety.

This application is related to U.S. patent application Ser. No. 18/424,505, filed Jan. 26, 2024, titled "Creation and Consumption of Data Models that Span Multiple Sets of Facts," which is incorporated by reference herein in its entirety.

TECHNICAL FIELD

The disclosed implementations relate generally to data analytics and more specifically to systems, methods, devices, and user interfaces that enable users to query data for analytics.

BACKGROUND

Tableau was built on the concept of visual query language (VizQL). VizQL is a language that provides a graphical user interface for building both complex queries of data and complex visualizations of that data. Focusing on the query aspect, one of the novelties of Tableau is that with a few simple interactions with a graphical user interface, a user can build a complex data query. If the user were to generate the same query using SQL commands, it may take the user minutes or hours to write.

The VizQL concept goes back to work done at Stanford University and is known as Polaris (see, e.g., graphics.stanford.edu/papers/polaris_extended/polaris.pdf). This work was further enhanced to build the framework for Tableau that users have leveraged since then. For example, the original ACM abstract defining VizQL can be found in dl.acm.org/doi/10.1145/1142473.1142560. The innovation of providing a simple way to build queries via a graphical user interface is still an important part of the Tableau product line.

Published data sources (PDS) and a data server (e.g., Tableau Data Server) running a Tableau data source service (TDS) are fundamental pieces of Tableau architecture and have been around for years. In the current server ecosystem, Tableau Data Server provides a SQL-like query interface on top of published data sources. A SQL-like query refers to a tree of relational operators such as tables, joins and unions. Under the existing architecture, clients must incorporate all their desired semantics into the queries they send to the Tableau Data Server. For example, a client that wants to query a FIXED LoD calculation will need to know how to express this query as a LoD expression.

SUMMARY

Data tend to be scattered across many silos, in different databases and locations. There is no easy way of federating data queries across the different databases while managing security (e.g., row-level security) within a service using one metadata asset (e.g., Tableau Published Data Source), to respond with tables of analytically correct results specifying VizQL to client endpoints.

Data ecosystems can include many data producers (e.g., different databases and different data streams) and many data consumers (e.g., business intelligence (BI) tools, data apps, AI/ML batch processors). A data consumer needs to identify, connect, and query against different data producers, combine data that are retrieved from the various producers, and then determine the collective results. Currently, there is no single, unified endpoint where data consumers can reliably connect to and query for semantically correct and analytically useful insights to enable organizations to make data-driven/informed decisions.

Some aspects of an existing data ecosystem utilize a data server (e.g., Tableau Data Server) as part of a server architecture for querying published data sources. The existing data ecosystem includes a Tableau data source service (TDS) and provides a SQL-like query interface on top of published data sources. Here, a SQL-like query refers to a tree of relational operators such as tables, joins and unions. With this architecture, clients must incorporate all their desired semantics into the queries they send to Data Server. For example, a client that wants to query a FIXED level of detail (LoD) calculation would need to know how to express this query in Logical Ops/expressions. This process can be cumbersome and time-consuming, especially if an analyst is not familiar with the semantics or LOD expressions.

Some implementations of the present disclosure describe a data ecosystem having a data server that runs a Viz Data Service (also referred to herein as VizQL Data Service, VDS, or Internal VDS). As disclosed, VDS introduces a new higher-level query interface on top of published data sources. With this VDS architecture, clients express intent through their queries and the VDS compiles the SQL-like queries that satisfy this intent. For example, a client that would like to query a FIXED LoD calculation can either query for the calculation by name or by formula. Viz Data Service then compiles the calculation to the relevant SQL-like query.

In some implementations, the advantages of VDS's higher-level query interface for published data sources include:

New analytic features: Data Server's current distributed semantic reasoning blocks Shared Dimensions and other related features from being properly queryable once published;

Shareable semantics: The Viz Data Service's query language will enable a wider variety of clients to leverage Tableau's semantics. Currently, Logical Queries require clients to embed their semantics through their query compilation process while visual specifications conflate data and layout; and More similar queries for published scenarios: The queries compiled for a published data source are often different from the queries for the same data source when it is embedded. VDS is expected to narrow this difference gap.

In some implementations, the Tableau data server and client can exist with differing versions where they may not be compatible with each other. For example, Tableau Data Server is an older version server and lacks the complete data processing capability of the latest VizQL Data Service, which the client adapts alongside with maintaining backward compatibility. Some implementations disclose a smart switching process for selecting data servers (or data services). In some implementations, the smart switching is performed by a client device executing Tableau desktop or Tableau browser. The client device is communicatively connected with a gateway (e.g., a network device or a network node). The gateway is communicatively connected to multiple data servers or multiple data services. In some implementations, the data servers include a first data server running a Tableau data source service (TDS) and a second data server (e.g., Tableau data server). When the client device receives one or more inputs for generating a data visualization, the client device discovers, negotiates, and selects the type of query that it will send to the server.

In some instances, if the client device determines it does not need to connect to a server, it processes the query locally, and connects to other external data sources without negotiation with the server. In some instances, if the client device determines it requires connection to a server, it sends a request to the gateway and receives, from the gateway, capabilities of each data server (or each data service). The client determines, according to the requirements for generating the data visualization, which data model to use and/or which server can query against a specific published data source. In some implementations, when the client device determines that the data server that can query against the published data source is the first data server (e.g., Tableau data server, or old data server), the client device would pre-compile its queries and send the pre-compiled queries to the data server. In some implementations, when the client device determines that the data server that can query against the published data source or the second data server (e.g., running VDS), the client would serialize the information in the visual specification into a data stream (e.g., protobuf format) to the VDS, which then deserializes, combines this information with additional user functions, used for applying row-level security (RLS), and federates this query to external databases.

In some implementations, the smart switching process for selecting data servers (or data services) is performed by a gateway. For example, in some implementations, in accordance with receiving a request from a client device for generating a data visualization, the gateway evaluates and determines, according to factors such as the software version running on the client device, the requirements for generating the data visualization, and the capabilities of each data server (or data service), which data server (or service) the client device should be connected to, and returns the data for generating the data visualization. For example, in some implementations, when the gateway determines that the client does not need to connect to a server, the gateway sends an indication to the client to process the query locally, and connects to other external data sources without negotiation with the server. In some implementations, when the gateway determines that the request from the client requires access to a public data source, the gateway connects to a server and determines what data model and server can query against the specific published data source. In some implementations, the gateway obtains the backend capabilities, including determining whether the remote server is a Tableau data server, or if the backend supports VDS. If the backend supports VDS, the client uses the supported VDS APIs to run queries. For example, the client can convert the visual specification (that is generated via a Tableau graphical user interface) to a query specification (e.g., a protobuf file, by serializing the information in the visual specification into a stream) and transmits the query specification to the VDS. The VDS deserializes the information from the query specification and combines this information with additional user functions, used for applying row-level security (RLS). The VDS then federates this query to external databases to retrieve data, which is returned to the client.

Some implementations of the present disclosure provide a headless business intelligence (Headless BI) service that enables users (e.g., customers) to access their data outside of a Tableau graphical user interface (GUI) environment. Consider a computing device that executes a Tableau GUI: In this example, the computing device may receive user interactions, such as user dragging a pill from a schema region and placing the pill into a row or column shelf. The computing device may create a visual specification according to the user interactions, and then queries a data source to retrieve data, which it uses to create a visualization of that data. As disclosed, unlike the computing device that executes the Tableau GUI, the headless BI enables a data customer to fetch data without the need for generating a visualization.

In some implementations, compared to the existing server architecture that utilizes TDS, the disclosed server architecture utilizing VDS solves the problem of information asymmetry. Under the existing server architecture, communications between the client and the data server (running TDS) are based on pre-compiled queries. As a consequence, the client has more information about the UI-end whereas the server running TDS has more information about the data source. With VDS, queries sent by the clients to VDS are not pre-compiled queries, meaning that VDS has more information about what is happening at the client side.

In accordance with some implementations, a method of selecting data services is performed at a client device having a display, one or more processors, and memory. The method includes receiving one or more inputs for generating a data visualization according to a data source. The method includes, in accordance with receiving one or more inputs for generating a data visualization according to a data source: determining one or more requirements for generating the data visualization; sending a request to a network gateway that is communicatively connected to the client device and a plurality of data servers; receiving, from the network gateway, capabilities of each data server of the plurality of data servers; and determining, according to the received capabilities, that a first data server of the plurality of data servers includes a first set of capabilities that satisfies the requirements for generating the data visualization. The method includes, in accordance with the determination that the first data server includes capabilities that satisfy the requirements for generating the data visualization: sending, via the network gateway, one or more queries to the first data server; receiving, from the first data server, one or more data sets from the data source; generating the data visualization according to the retrieved data sets; and displaying the data visualization.

In accordance with some implementations, a method of querying data is performed at a server system that includes one or more processors and memory. The server system is communicatively connected to a plurality of computing devices and one or more databases. The method includes receiving one or more queries from a computing device, the one or more queries specifying a data source. The method includes determining a level of security applicable to a user of the computing device. The method includes translating the one or more queries into one or more logical queries according to semantics of the data source. The method includes transmitting the one or more logical queries to a query pipeline of the server system and executing the one or more queries against a first database of the one or more databases to retrieve query results from the data source. The method includes applying the determined level of security to the query results to obtain one or more data sets. The method includes returning the one or more data sets to the computing device.

In accordance with some implementations, a method for data retrieval is performed at a computer system having one or more processors and memory storing one or more programs configured for execution by the one or more processors. The method includes receiving, from a programmatic interface of a client device via one or more external API calls, a query that specifies a data source and one or more data fields of the data source. The method includes, in accordance with receiving the query, generating a query specification according to the one or more data fields of the data source. The query specification is an extended version of the API calls. The method includes transmitting the query specification to a data service, and causing the data service to execute one or more database queries to retrieve data against a database to retrieve query results from the data source, according to the query specification. The method includes receiving the query results from the data service; configuring the query results to obtain configured data; and transmitting the configured data to the client device for display in the programmatic interface.

In accordance with some implementations, a client device includes one or more processors, and memory coupled to the one or more processors. The client device optionally includes a display. The memory stores one or more programs configured for execution by the one or more processors. The one or more programs include instructions for performing any of the methods disclosed herein.

In accordance with some implementations, a computer system includes one or more processors, and memory coupled to the one or more processors. The memory stores one or more programs configured for execution by the one or more processors. The one or more programs include instructions for performing any of the methods disclosed herein.

In accordance with some implementation, a non-transitory computer readable storage medium stores one or more programs configured for execution by a computer system having one or more processors, and memory. The one or more programs include instructions for performing any of the methods disclosed herein.

Note that the various implementations described above can be combined with any other implementations described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

FIG. 9 is a block diagram of a data visualization server, in accordance with some implementations.

FIG. 23 illustrates a data query and retrieval pipeline 2300 with Viz Data Service, in accordance with some implementations.

FIGS. 36A to 36D collectively show a VDS query object generated by the Tableau UI to return the same data as shown in FIG. 35, in accordance with some implementations.

FIG. 37 illustrates a headless BI query generated by a client device, that will generate the same data as the Tableau UI query in FIG. 35, in accordance with some implementations.

FIGS. 38A and 38B collectively illustrate a VDS query that is generated by a headless BI service, which will also return the same data as shown in FIG. 35, in accordance with some implementations.

FIGS. 39A and 39B show the output of the data as queried by a Headless BI service, in accordance with some implementations.

FIGS. 40A to 40E collectively illustrate a portion of a VDS query protobuf file, in accordance with some implementations.

FIG. 41 illustrates output data in object style, in accordance with some implementations.

FIG. 42 illustrates output data in array style, in accordance with some implementations.

FIG. 43 illustrates an example query, in accordance with some implementations.

FIGS. 44A to 44O collectively illustrate the interface of Headless BI service, in accordance with some implementations.

FIGS. 45A to 45C provide a flowchart of an example process for selecting data services, in accordance with some implementations.

FIGS. 46A and 46B provide a flowchart of an example process for querying data, in accordance with some implementations.

FIGS. 47A and 47B provide a flowchart of an example process for retrieving data, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
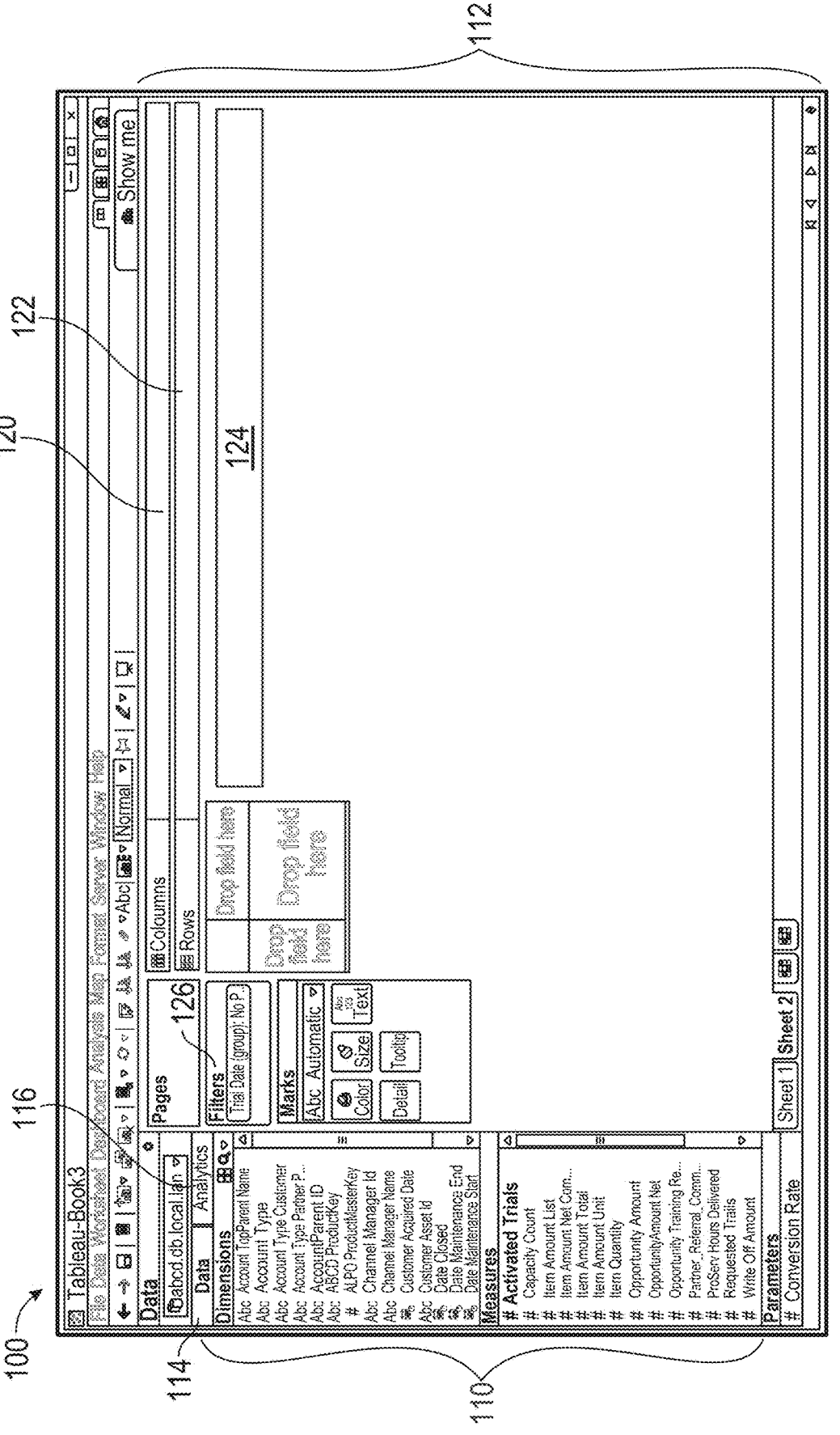
FIG. 1 illustrates a Tableau graphical user interface, in accordance with some implementations.

FIG. 1 illustrates a Tableau graphical user interface (GUI) 100 (or user interface) for interactive data analysis, in accordance with some implementations. In some implementations, the GUI 100 is a user interface of a Tableau browser application executing on a client device 202. In some implementations, the GUI 100 is a user interface of a Tableau desktop application executing on a client device 204.

The GUI 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The GUI 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the GUI 100 also includes a natural language input box 124 (also referred to as a command box) for receiving natural language commands. A user may interact with the command box to provide commands. For example, the user may provide a natural language command by typing the command in the box 124. In addition, the user may indirectly interact with the command box by speaking into a microphone to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

In some implementations, the client device 202 or the client device 204 generates a visual specification 130 according to placement of data elements on the column shelf 120 and on the row shelf 122. A visual specification 130 defines characteristics of a desired data visualization. In some implementations, a visual specification 130 is built using user interface 100 of a data visualization application. The visual specification 130 includes identified data sources (i.e., specifies what the data sources are), which provide enough information to find the data sources (e.g., a data source name or network full path name). A visual specification 130 also includes visual variables and the assigned data fields for each of the visual variables. In some implementations, a visual specification 130 has visual variables corresponding to each of the shelf regions (e.g., the columns shelf 120 and the rows shelf 122 in FIG. 1). In some implementations, the visual variables include other information such as context information about the client device, user preference information, or other data visualization features that are not implemented as shelf regions (e.g., analytic features), In some implementations, as a user adds data fields to the visual specification (e.g., indirectly by using the graphical user interface to place data fields onto shelves), the data visualization application (or web application) groups together the user-selected data fields according to the object model. Such groups are called data field sets. In many cases, all of the user-selected data fields are in a single data field set. In some instances, there are two or more data field sets. Each measure m is in exactly one data field set, but each dimension d may be in more than one data field set.

Figure 2:
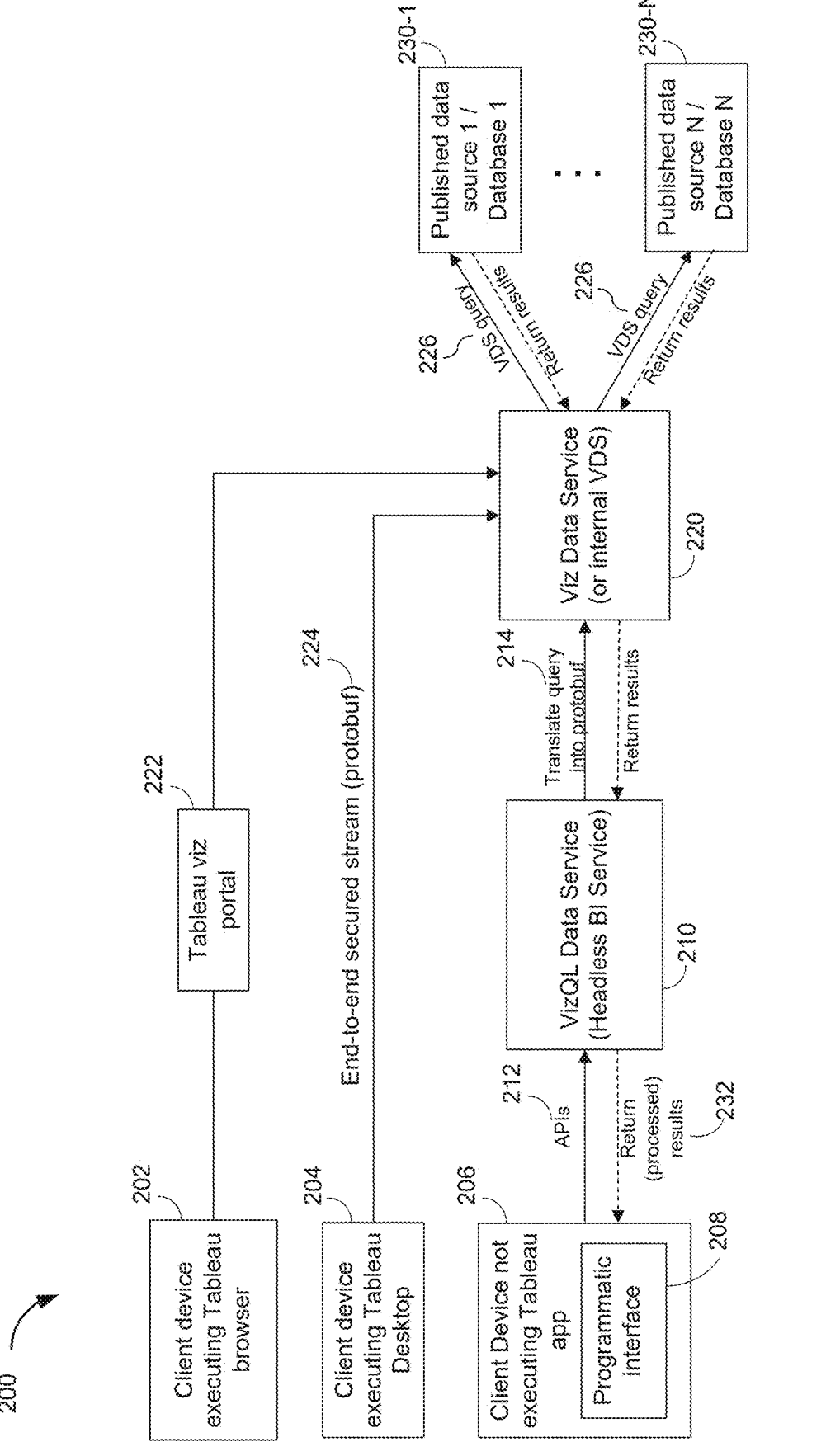
FIG. 2 illustrates an exemplary operating environment, in accordance with some implementations of the present disclosure.

FIG. 2 illustrates an exemplary operating environment 200, in accordance with some implementations of the present disclosure. The operating environment 200 includes client devices 202, 204, and 206. Client device 202 and client device 204 execute a Tableau application such as Tableau Desktop, Web Authoring (Tableau browser), and backgrounder, which includes a Tableau user interface (e.g., graphical user interface 100). Client device 206 executes a developer application that includes a programmatic interface 208. In the example of FIG. 2, client device 206 does not execute any Tableau application.

In some implementations, the headless BI service 210 is an independent service that exposes one or more APIs 212 (also referred to herein as open APIs, external APIs, or APIs for public access) to developer applications to query their Tableau published data sources. The APIs 212 enable third-party developer applications to access Tableau resources that will otherwise not be available outside the Tableau environment. In some implementations, the APIs 212 include a REST endpoint that requires authentication and association with an existing Tableau published data source.

The client device 206 sends a request (e.g., a query, a request for data) to a headless BI service 210 via APIs 212. In some implementations, the one or more APIs 212 include a metadata API 742. For example, the query from the client device 206 can specify the name of a published data source and the headless BI service 210 returns information about the fields in the data source. In some implementations, the one or more APIs 212 include a query API 744. For example, the query from the client device 206 specifies the published data source, one or more data fields, and one or more other options (e.g., filter options) and the headless BI service 210 returns data according to the specification.

The headless BI service 210 is communicatively connected to client device 206 and to a data server running Viz Data Service 220. At a high level, the headless BI service 210 is a "lightweight" application that receives API calls from the client device 206 and maps (or translates) the simplistic terms in the query to a more complicated protobuf file (214), which is in a format that is compatible with the Viz Data Service 220.

In this disclosure, headless BI service 210 is also referred to as "Headless BI" or "VizQL data service" or "external-facing VDS" or "external VDS."

In this disclosure, Viz Data Service 220 is also referred to as "Internal VDS" or "VDS."

In some implementations, Viz Data Service 220 is a part of a data server 360.

According to some implementations disclosed herein, Viz Data Service 220 is a new piece of the server architecture for querying published data sources. In some implementations, Viz Data Service 220 parses the protobuf file and matches the request specified in the protobuf with metadata of published data source(s). Viz Data Service 220 translates the request into queries, and connects to the published data source(s) to retrieve data to send back to the headless BI Service 210. In some implementations, data that is received by headless BI Service 210 is configured (e.g., reformatted) and returned to client device 206.

As explained above, Internal VDS 220 already offers a way to query data sources. At a high level, Internal VDS 220 is an API to query published data sources, such as published data source 1 230-1 and published data source N 230-N, via VDS query 226 (or query specifications). A published data source is a data source that is published to the Tableau server. In some implementations, a published data source comprises a collection of metadata. For example, a public data source can include information about tables that contain the actual data, information about credentials required to access the tables or data, and information about data models defining the relationships between fields located in different tables.

Referring to FIG. 2, in some implementations, internal VDS 220 is accessible or usable by client devices executing applications with a Tableau user interface (e.g., Tableau Desktop, Web Authoring, and backgrounder) via Tableau Viz Portal 222 (a Tableau server). In some implementations, the client device 204 executing Tableau desktop has an end-to-end secured stream (trusted connections) built in with the internal VDS 220. For these devices, Internal VDS 220 takes inputs from the Tableau user interface (e.g., GUI 100) and compiles the SQL-like queries that satisfy this intent. It then returns data from the query in the form of data visualizations.

Historically, the Tableau user interface, such as GUI 100, has been the only way that a user can query published data sources. The entire query pipeline, from the user dragging and dropping a pill in the Tableau GUI 100 all the way down to the SQL query that it turned into was one streamlined process. However, this meant that the visual way that Tableau represents a query (e.g., axes, marks, things that are only relevant for the Tableau application itself) was conflated with the semantic information (e.g., totals, raw numbers, etc.).

When VDS 220 was created, it added another entry point as an attempt to separate out UI things from data things. But given this history of the query being formed by the visual representation of everything the user was intending, instead of just the numbers, the VDS query objects tend to be large, unwieldy, and may not make any sense by themselves. In fact, the query interface was never intended to be interpreted by humans, and was designed as such.

Though a user can inspect a query object coming into VDS formed by Tableau GUI 100, depending on the circumstances of the way the query was formed, two queries that yield the same result can look drastically different. There may also be leftover fields and vestiges of UI things in the queries that are no longer in use. Furthermore, some queries expect certain fields to be filled out even though they are meaningless in the data context.

As disclosed, headless BI 210 is the solution to these large, complicated queries. In some implementations, it is another API that sits on top of VDS 220 that accepts human readable queries and turns them into the complicated, unwieldy VDS queries that actually run on published data sources. When the headless BI translates a headless BI query to a VDS query, it (1) removes unnecessary fields from the VDS query object, so the user does not have to worry about them; (2) fills in fields that are irrelevant outside of the context of the Tableau UI; and (3) fills out the necessary fields to return the correct data from the published data sources.

As disclosed, internal VDS 220 is accessible or usable by clients such as client device 206, which has a programmatic interface 208 and does not execute an application with a Tableau user interface, via Headless BI 210.

Figure 3:
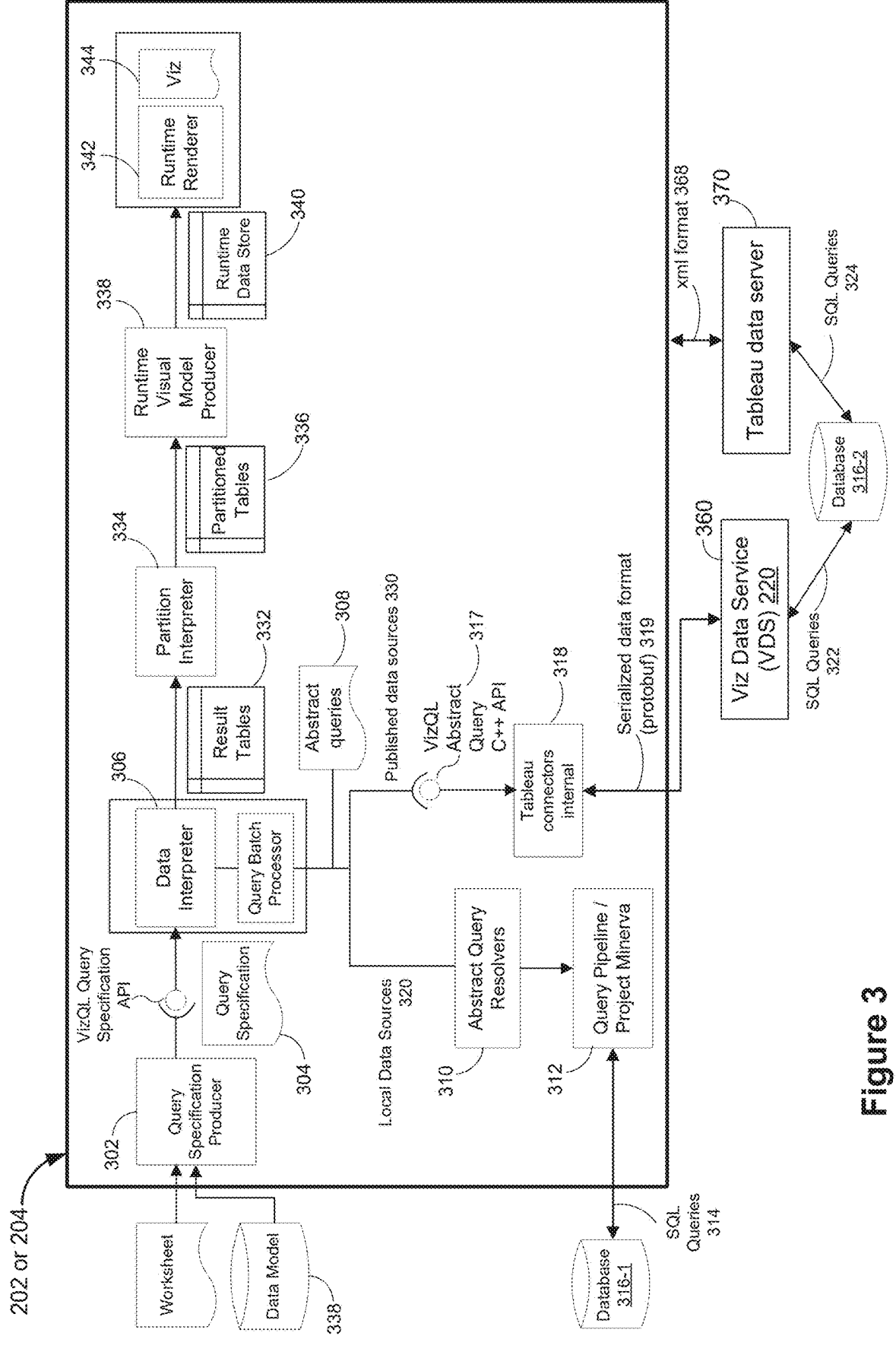
FIG. 3 illustrates a client device executing a Tableau browser application or a Tableau desktop application, in accordance with some implementations.

FIG. 3 illustrates a client device (e.g., client device 202 or client device 204) executing a Tableau browser application or a Tableau desktop application, in accordance with some implementations.

The client device 202 or 204 includes a query specification producer 302, which generates a query specification 304 from a visual specification 130. In some implementations, to better encapsulate higher-level semantics, query specifications 304 are being introduced as a new representation between the visual specification 130 and abstract queries (see also FIGS. 22 and 23). In particular, query specifications will be the interface language to the interpreter/resolver layers (the core of the semantics IP). Query specifications are designed to separate the concerns of fetching data from the visual layout (e.g., GUI 100).

Through a data interpreter 306, the visual specification 304 is converted to abstract queries 308. The abstract queries 308 contain high-level information such as output fields, group bys and filters. The data interpreter 306 reasons about computation such as whether a total can be computed using existing viz data or through a separate query. Importantly, abstract queries 308 reference fields by names but have not incorporated information such as the underlying tables or calculation formulae.

In some implementations, the VizData API includes a collection of API editions which enable clients to query Tableau data sources using different kinds of queries. In some implementations, the editions are named after the query type (e.g., Abstract Query or Query Specification) and/or the interface (e.g., C++, HTTP, or gRPC).

In some implementations, query specifications 304 or 404 (also known as VizQL query specifications) offer access to most of Tableau's analytics and data access (e.g., database) functionality. In some implementations, query specifications can only be used inside the Tableau C++ Monolith. In some implementations, a query specification 304 or 404 is a visual specification minus visual structure concepts. In some implementations, a client queries a data source using a query specification via an API (e.g., VizQL QuerySpecification API). Architecturally, this API offers access to the top of the data interpreter in the Tableau visualization pipeline.

An abstract query 308 or 408 is a lower level query than a query specification (304 or 404), but a higher level query than a SQL query. In some implementations, abstract queries offer all of Tableau's analytics and data access functionality, except for Data Interpreter analytics like forecasting, table calculations, blending, and densification.

Table 1 illustrates the features provided by an abstract query and a query specification, in accordance with some implementations.

TABLE 1

Features provided by abstract queries and query specifications.

| Feature | Abstract Query | Query Specification |
|---|---|---|
| Totals | | ✓ |
| Blending | | ✓ |
| Forecasting | | ✓ |
| Densification | | ✓ |
| Clustering | | ✓ |
| Predictive Models | | ✓ |
| Table Calculations | | ✓ |
| Measure Names/Measure Values | | ✓ |
| Geocoding | | ✓ |
| Min/Max Measures | ✓ | |
| Local Calculations (i.e., ATTR) | | ✓ |
| Level of Detail Calculations | ✓ | ✓ |
| Calculations with Single Top-Level Aggregation | ✓ | ✓ |
| Calculations with Multiple Top-Level Aggregates | ✓ (may omit unmatched nulls) | ✓ |
| Row-Level Calculations | ✓ | ✓ |
| Per-Column Fiscal Years | ✓ | ✓ |
| Per-Data source Date Settings | ✓ | ✓ |
| Sets and Combined Fields | ✓ | ✓ |
| Dimension and Measure Filters | ✓ | ✓ |
| Categorical Bins (called Groups in the UI) | ✓ | ✓ |
| Numeric Bins | ✓ | ✓ |

In some implementations, a client queries a data source using an abstract query via an API (e.g., VizQL Abstract Query API 317), which provides access to Tableau's database analytics and data.

In some implementations, a client interacts with the Abstract Query API 317 by providing (i) a data model, describing the data source settings and columns to add, and (ii) a collection of abstract queries, describing the questions to ask on that data model.

An abstract query represents a question to ask of a Tableau data source. It is a higher level query compared to a Structured Query Language SQL query. In some implementations, an abstract query is like a SQL query without the FROM clause.

The simplest query is a list of fields: output_fields=[Sum of Sales], [Region]. This query gives you the values of the Sum of Sales and Region columns, for all rows in the database.

To enable aggregation, a user can add level-of-detail fields, and set the aggregate_data setting to true. This example gives you the sum of the sales by Region, assuming you have a calculated field named [Sum of Sales] that has the formula

```
SUM([Sales]):
    output_fields = [Sum of Sales], [Region]
    level_of_detail_fields = [Region]
    aggregate_data = true
```

For sorting, add fields to the order_fields list:

```
output_fields = [Region]
order_fields = [Sum of Sales]
```

The fields do not have to be part of the output fields. Note that there is currently no way to specify a descending sort order for a field. Therefore, to sort a numeric field in descending order, one will need to create a calculated field that multiplies the numeric field by −1.

To run a Top N query, set the top_count to a positive number and the top_units to ST_RECORDS. For example, this query gives you the top two Regions by their Sum of Sales:

```
output_fields = [Region]
order_fields = [Sum of Sales]
aggregate_date = true
top_count = 2
top_units = ST_RECORDS
```

A filter can be added to a query in two steps:

1. Add a filter to the filters list in the DataModel message. The first filter you add has index number 0, the next has index number 1, and so on.

2. Use the index number somewhere in your query, depending on where you want the filter applied in Tableau's Order of Operations.

In some implementations, three kinds of filters are supported by the Filter message:

An arbitrary filter applies a Set Function to a given field, producing a collection of values to keep for that field. Set Functions are very powerful, yet easy to use for simple cases;

A quantitative filter only keeps values within a specific numeric range

A relative date filter filters date fields to a date range relative to some anchor date (such as the current date)

In some implementations, in terms of using a filter, data source filters are applied first, followed by context filters, then query filters. A context filter is a filter that is applied before any of the filters in the worksheet, such as dimension and measure filters. You can add context filters using the Context Specification. To filter an individual query, add filters to the filter_indexes property of the AbstractQuery message.

In some implementations, there are three caching behaviors that a user can set independently of each other:

No Read: Set this setting to true if you want the freshest data

No Write: Set this setting to true if you do not want a certain query's results to be cached. Common scenarios include enhancing security and working around defective cache behavior.

No Run: Set this setting to true if you only want to retrieve cached results. If the result isn't in the cache, you will just receive an empty table. This setting is useful for certain "side" features, which can usually reuse the results of a main query yet aren't important enough to require a query of their own if they can't reuse cached results.

In terms of relationships on Tableau, the object_model_semantics_specification member influences the behavior of the query when it runs on a data source that has Tableau Relationships active.

A supplementary measure is a measure that should be considered part of the query, even if the query does not include this measure in the output fields. This setting would have no effect on a query over a single table. However, measures in a query that spans multiple tables can cause extra rows containing NULL dimension values to appear.

A subtractive dimension is a dimension whose presence acts like a filter. Since Tableau inner-joins dimension values that span multiple tables, table rows that do not have matching dimension values in other tables are filtered out. This setting would have no effect on a query over a single table.

Min/max measures offer a second level of aggregation on top of one's abstract query. VizData Service runs the rest of the query for you, then computes the minimum and maximum values of the measures in the query result. This setting is useful for computing the domains of quantitative columns, such as columns containing integers, floating-point numbers, and dates.

Referring again to FIG. 3, in some implementations, in the case of local data sources 320, the abstract query resolvers 310 convert abstract queries 308 to logical queries using the semantics of the data source. For example, the abstract query resolvers 310 consult the data source to fetch the definitions of calculations, evaluate aggregates using object model semantics based on the data source's graph. The end result will be logical queries. The logical queries are then passed to the query pipeline 312, which performs tasks such as query rewriting, optimization and federation to output the final SQL queries 314 that are executed against a database 316-1. Roughly speaking, the visual specification 130 encodes both visual and semantic intent; abstract queries encode semantic intent; whereas logical Queries/SQL are relational languages (with a focus towards performance). Details of object model semantics are described in U.S. patent application Ser. No. 18/424,505, filed Jan. 26, 2024, the contents of which are incorporated by reference herein in its entirety.

In some implementations, in the case of published data sources 330, the abstract queries 308 (and/or the query specifications 304) are passed to Tableau connectors internal 318. In some implementations, Tableau connectors internal 318 communicate with a data server 360 running VDS 220, which is in turn communicatively connected with one or more databases 316-2. Details of VDS 220 are described with respect to FIG. 5. Briefly, the VDS 220 converts the abstract queries 308 to logical queries, which are then passed to a query pipeline to output SQL queries 322, which are then executed against database 316-2. In some implementations, Tableau connectors internal 318 translates (e.g., converts) the query specifications 304 or the abstract queries 308 into a serialized data format (e.g., protobuf) 319 to send to VDS 220.

In some implementations, the client device 202 or 204 is communicatively connected with Tableau data server 370, which is in turn communicatively connected with one or more databases, such as database 316-2. In some implementations, the client device 202 or 204 communicates with Tableau data server 370 via xml. In some implementations, the client device 202 or 204 sends one or more pre-compiled queries to Tableau data server 370. Tableau data server 370 converts the pre-compiled queries to logical queries, which are then passed to a query pipeline to output SQL queries 324 that are executed against database 316-2.

In some implementations, after the queries are executed against the one or more databases 316-1 and 316-2, query results are returned by the databases 316-1 and 316-2. In some implementations, the query results are returned as result tables 332. In some implementations, the result tables are passed to partition interpreter 334, which further partitions the query results according to the data elements on the GUI 100 to generate partitioned tables 336. In some implementations, the client device 202 or 204 includes a runtime visual model producer 338 that generates a runtime data store 340 for storing user and/or session data. In some implementations, the result tables 332, the partitioned tables 336, and user and/or session data from the runtime data store 340 are input into a runtime renderer 342, which generates data visualizations according to these data and and displays the data visualizations on the GUI 100 (or on a web browser).

Figure 4:
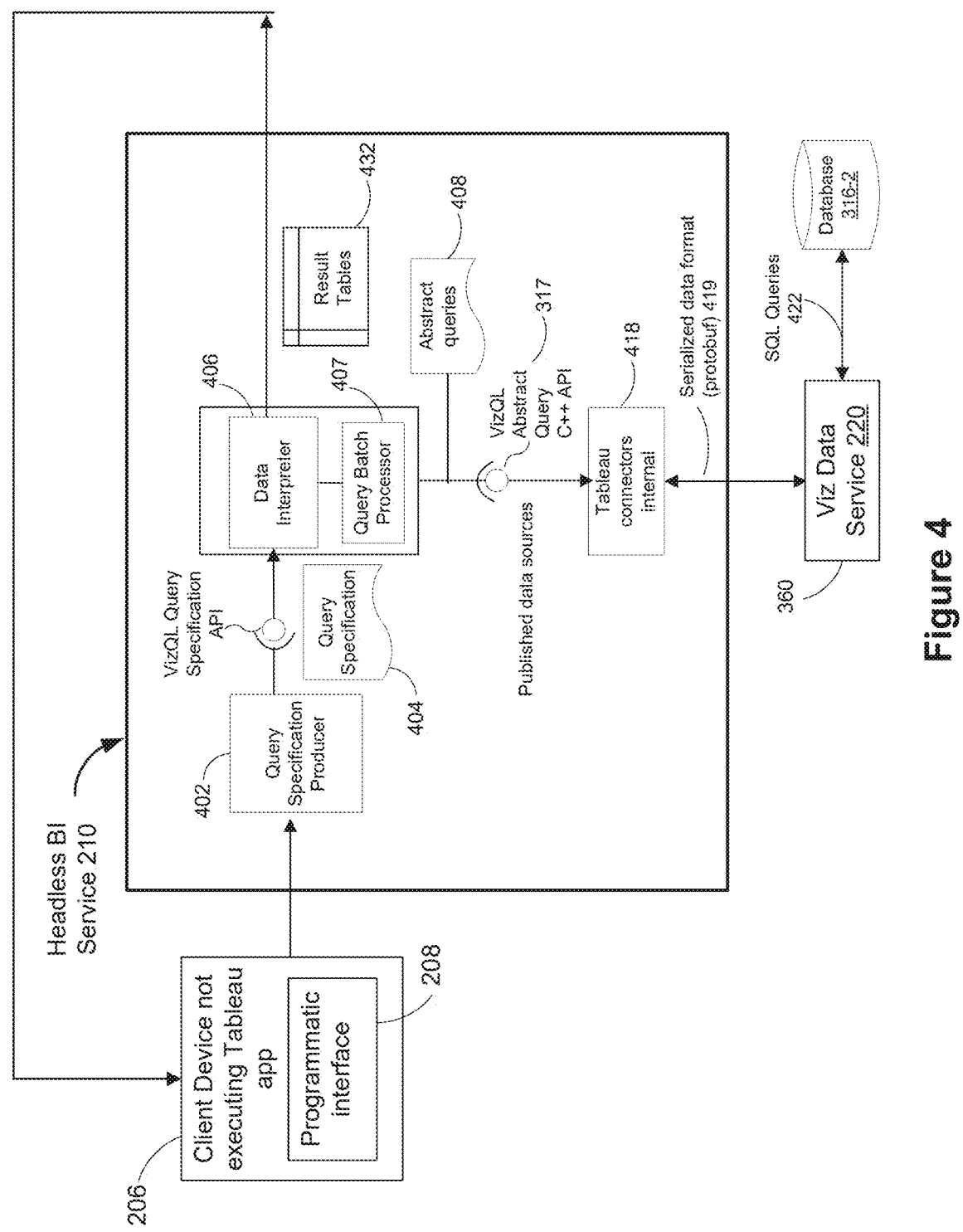
FIG. 4 illustrates a headless BI service, in accordance with some implementations.

FIG. 4 illustrates headless BI service 210, in accordance with some implementations. As discussed with respect to FIG. 2, the headless BI service 210 is communicatively connected with a client device 206 that includes a programmatic interface 208. The client device 206 does not execute a Tableau application (i.e., the client device 206 does not include GUI 100).

The headless BI service 210 accepts connections from the client device 206, and accepts headless BI queries (e.g., APIs 212) from the client device 206. In some implementations, the headless BI queries comprise JSON objects. The headless BI service 210 includes a query specification producer 402, which generates query specifications 404 from the API calls 212. In some implementations, the headless BI service 210 includes a data interpreter 406 that converts the visual specification 404 to abstract queries 408. The data interpreter 406 has the same functions as data interpreter 306 and are not repeated for the sake of brevity. In some implementations, the headless BI service 210 includes a query batch processor 407 for processing batch queries. The query specifications 404 and/or the abstract queries 408 are passed to Tableau connectors internal 418, which communicate with data server 360 running VDS 220. VDS 220 converts the query specifications 404 and/or the abstract queries 408 to logical queries, which are then passed to a query pipeline to output SQL queries 422, which are then executed against database 316-2. In some implementations, Tableau connectors internal 418 translates (e.g., converts) the query specifications 404 or the abstract queries 408 into a serialized data format (e.g., protobuf) 419 to send to VDS 220.

In some implementations, a key distinction between the headless BI service 210 and the client device 202 (or 204) is that in the case of the headless BI service 210, the query results are returned to the client device 206 as result tables 432, without partitioning or rendering.

Figure 5:
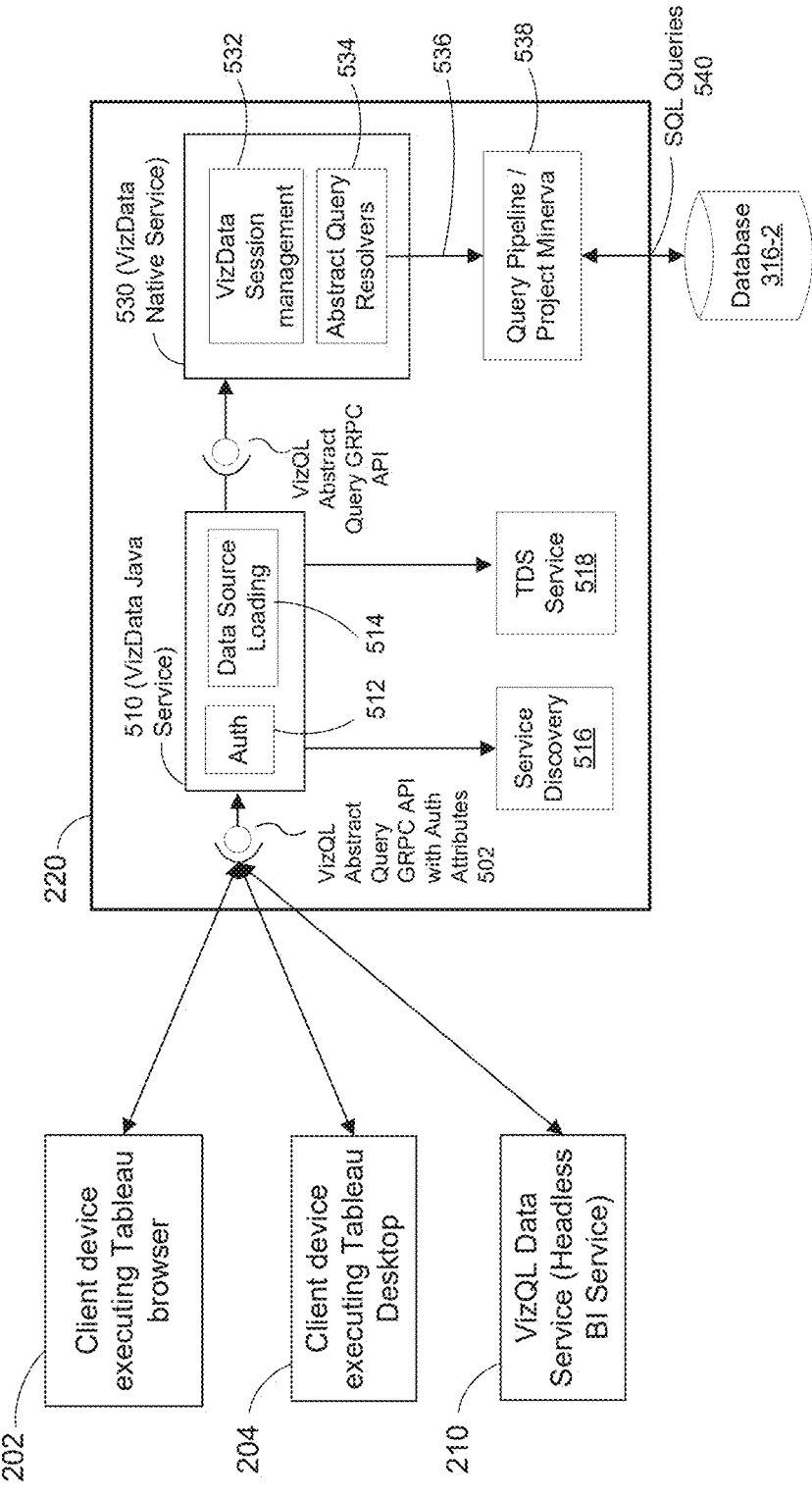
FIG. 5 illustrates a Viz Data Service, in accordance with some implementations.

FIG. 5 illustrates the Viz Data Service 220, in accordance with some implementations.

In some implementations, the client device 202, the client device 204, and the headless BI service 210 connect to VDS 220 via API 502. In some implementations, the API 502 accepts (e.g., uses) query specifications. In some implementations, the API 502 accepts (e.g., uses) abstract queries.

In some implementations, Viz Data Service 220 includes a VizData Java Service 510. The VizData Java Service 510 is a java layer that includes logic for authentications 512.

VizData Java Service 510 includes a data source loading component 514. In some implementations, and is communicatively connected with Service Discovery 516, which determines respective availabilities of one or more services, such as a smart-switching service. In some implementations, the VizData Java Service 510 is communicatively connected to a Tableau data source (TDS) service 518, which stores information (e.g., metadata) about published data sources. For example, when the VDS 220 receives a query specification or an abstract query from client device 202, client device 204, or headless BI service 210, VDS 220 communicates with TDS Service 518 to obtain metadata information about the data source(s). In some implementations, when the queries are from headless BI service 210 (e.g., via client 206), Viz Data Service 220 handles request throttling (e.g., by limiting the number of API requests the client 206 or the Headless BI can make in a certain period), for scalability, performance, and authentication. In some implementations, Viz Data Service 220 applies row-level security and may restrict data access for some users.

In some implementations, Viz Data Service 220 includes a VizData Native Service 530. The Viz Data Native Service includes abstract query resolvers 534, which convert abstract queries 308 or 408 (or query specifications 304 or 404) to logical queries using the semantics of the data source. For example, the abstract query resolvers 534 consult the data source to fetch the definitions of calculations, evaluate aggregates using object model semantics based on the data source's graph. The end result will be logical queries 536. The logical queries 536 are then passed to the query pipeline 538, which performs tasks such as query rewriting, optimization and federation to output the final SQL queries 540 that are executed against a database 316-2

In some implementations, the VizData Native Service 530 includes a VizData session management component 532 for managing sessions on VDS 220. VDS 220 can handle multiple sessions (e.g., from different clients, such as client 202, client 204, or client 206) at the same time. In some implementations, a session is defined per client per published data source. A client can have multiple sessions. For example, if a first client executes a Tableau browser application and has two browser tabs open, one for published data source A and the other for published data source B, there are two ongoing sessions for the first client.

In some implementations, for a non-Tableau client (e.g., client 206) using the headless BI service 210, it is the client 206 (instead of VDS 220) that manages the sessions.

Figure 6:
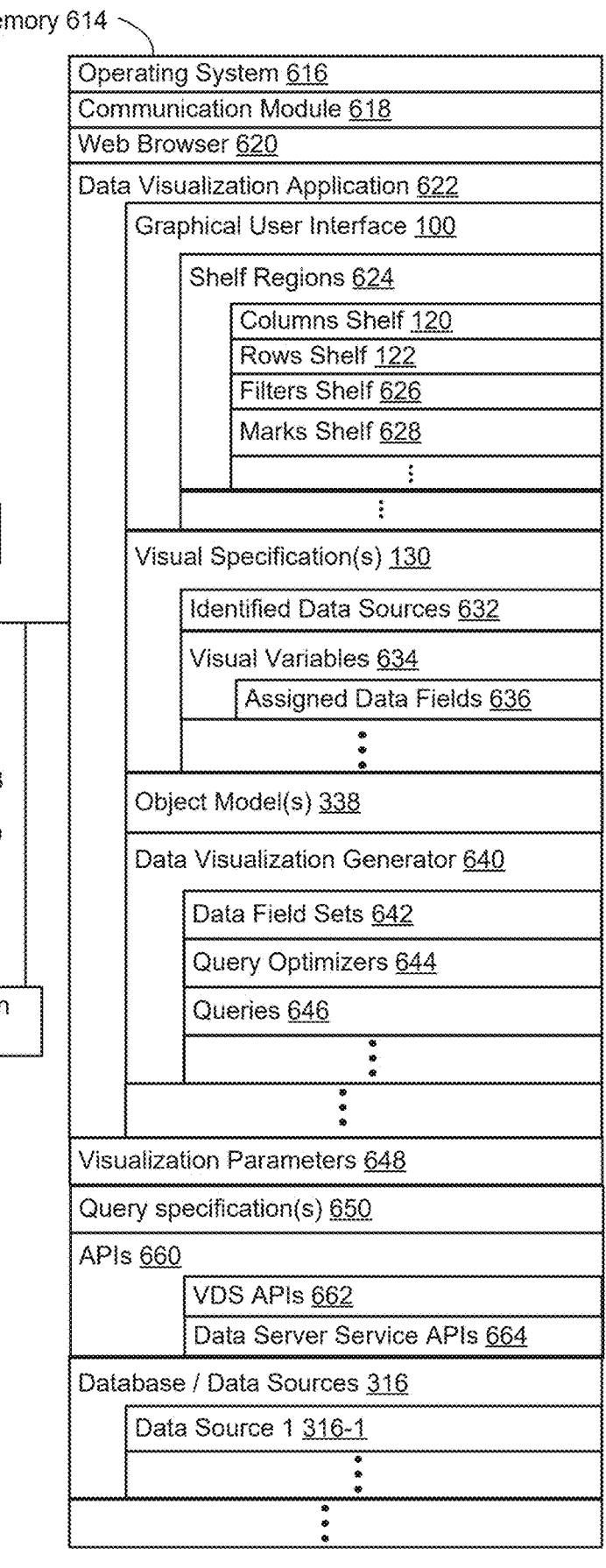
FIG. 6 is a block diagram illustrating a client device that is configured to execute a data visualization application, in accordance with some implementations.

FIG. 6 is a block diagram illustrating a client device 202 (or client device 204) that is configured to execute a data visualization application (e.g., Tableau Desktop or Tableau browser), in accordance with some implementations. Additional components of the client 202 or 204 are described with reference to FIG. 3. The client 202 (or client 204) displays a graphical user interface 100 for the data visualization application. Clients 202 or 204 can include desktop computers, laptop computers, tablet computers, and other computing devices with a display and a processor capable of running a data visualization application 622. A client device 202 (or 204) typically includes one or more processing units/cores (CPUs) 602 for executing modules, programs, and/or instructions stored in the memory 614 and thereby performing processing operations; one or more network or other communications interfaces 604; memory 614; and one or more communication buses 612 for interconnecting these components. The communication buses 612 may include circuitry that interconnects and controls communications between system components. A client device 202 (or 204)

includes a user interface 606 comprising a display 608 and one or more input devices or mechanisms 610. In some implementations, the input device/mechanism includes a keyboard. In some implementations, the input device/mechanism includes a "soft" keyboard, which is displayed as needed on the display 608, enabling a user to "press keys" that appear on the display 608. In some implementations, the display 608 and input device/mechanism 610 comprise a touch screen display (also called a touch sensitive display). In some implementations, the display is an integrated part of the client device 202 (or 204). In some implementations, the display is a separate display device.

In some implementations, the memory 614 includes high-speed random-access memory, such as DRAM, SRAM, DDR RAM or other random-access solid-state memory devices. In some implementations, the memory 614 includes non-volatile memory, such as one or more magnetic disk storage devices, optical disk storage devices, flash memory devices, or other non-volatile solid-state storage devices. In some implementations, the memory 614 includes one or more storage devices remotely located from the CPUs 602. The memory 614, or alternatively the non-volatile memory devices within the memory 614, comprises a non-transitory computer-readable storage medium. In some implementations, the memory 614, or the computer-readable storage medium of the memory 2814, stores the following programs, modules, and data structures, or a subset thereof:

- an operating system 616, which includes procedures for handling various basic system services and for performing hardware dependent tasks;
- a communication module 618, which is used for connecting the client device 202 (or 204) to other computers and devices via the one or more communication network interfaces 604 (wired or wireless) and one or more communication networks, such as the Internet, other wide area networks, local area networks, metropolitan area networks, and so on;
- a web browser 620 (or other client application), which enables a user to communicate over a network with remote computers or devices;
- a data visualization application 622, which provides a graphical user interface 100 for a user to construct visual graphics (e.g., an individual data visualization or a dashboard with a plurality of related data visualizations). In some implementations, the data visualization application 622 executes as a standalone application (e.g., a desktop application). In some implementations, the data visualization application 622 executes within the web browser 620 (e.g., as a web application);
- a graphical user interface 100, which enables a user to build a data visualization by specifying elements visually, as illustrated in FIG. 1;
- in some implementations, the user interface 100 includes a plurality of shelf regions 624, which are used to specify characteristics of a desired data visualization. In some implementations, the shelf regions 624 include a columns shelf 120 and a rows shelf 122, which are used to specify the arrangement of data in the desired data visualization. In general, fields that are placed on the columns shelf 120 are used to define the columns in the data visualization (e.g., the x-coordinates of visual marks). Similarly, the fields placed on the rows shelf 122 define the rows in the data visualization (e.g., the y-coordinates of the visual marks). In some implementations, the shelf regions 624 include a filters shelf 626, which enables a user to limit the data viewed according to a selected data field (e.g., limit the data to rows for which a certain field has a specific value or has values in a specific range). In some implementations, the shelf regions 624 include a marks shelf 628, which is used to specify various encodings of data marks. In some implementations, the marks shelf 628 includes a color encoding icon (to specify colors of data marks based on a data field), a size encoding icon (to specify the size of data marks based on a data field), a text encoding icon (to specify labels associated with data marks), and a view level detail icon (to specify or modify the level of detail for the data visualization);

- visual specifications 130, which are used to define characteristics of a desired data visualization. In some implementations, a visual specification 130 is built using the user interface 100. A visual specification includes identified data sources 632 (i.e., specifies what the data sources are), which provide enough information to find the data sources (e.g., a data source name or network full path name). A visual specification 130 also includes visual variables 634, and the assigned data fields 636 for each of the visual variables. In some implementations, a visual specification 130 has visual variables corresponding to each of the shelf regions 624. In some implementations, the visual variables include other information as well, such as context information about the computing device 600, user preference information, or other data visualization features that are not implemented as shelf regions (e.g., analytic features);
- one or more object models (e.g., data models) 338, which identify the structure of the data sources/databases 316. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;
- a data visualization generator 640, which generates and displays data visualizations according to visual specifications. Selected data fields are grouped into one or more data field sets 642. In accordance with some implementations, the data visualization generator 640 uses an object model 338 to generate queries 646 and/or optimize queries using query optimizers 644;
- visualization parameters 648, which contain information used by the data visualization application 622 other than the information provided by the visual specifications 630 and the data sources 316;
- APIs 660 for making and receiving API calls from one or more applications or services (e.g., Via Data Service and Data Server Service), translating the API calls into appropriate actions, and performing one or more actions. In some implementations, the 660 2860 include VDS APIs 662 corresponding to VDS and DS APIs corresponding to Data Server (Tableau Data Server);
- zero or more databases or data sources 316 (e.g., a first database 316-1 and a second database 316-2), which are used by the data visualization application 622, the VDS 220, or Tableau data server 370. In some implementations, the data sources are stored as spreadsheet files, CSV files, XML files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 614 stores a subset of the modules and data structures identified above. In some implementations, the memory 614 stores additional modules or data structures not described above (e.g., module(s) for machine learning and/or training models). In some embodiments, a subset of the programs, modules, and/or data stored in the memory 614 can be stored on and executed by Tableau data server 370 (e.g., a data visualization server) or a data server 360 running VDS 220.

Although FIG. 6 shows a client device 202 (or 204), FIG. 6 is intended more as functional description of the various features that may be present rather than as a structural schematic of the implementations described herein. In practice, and as recognized by those of ordinary skill in the art, items shown separately could be combined and some items could be separated.

Figure 7:
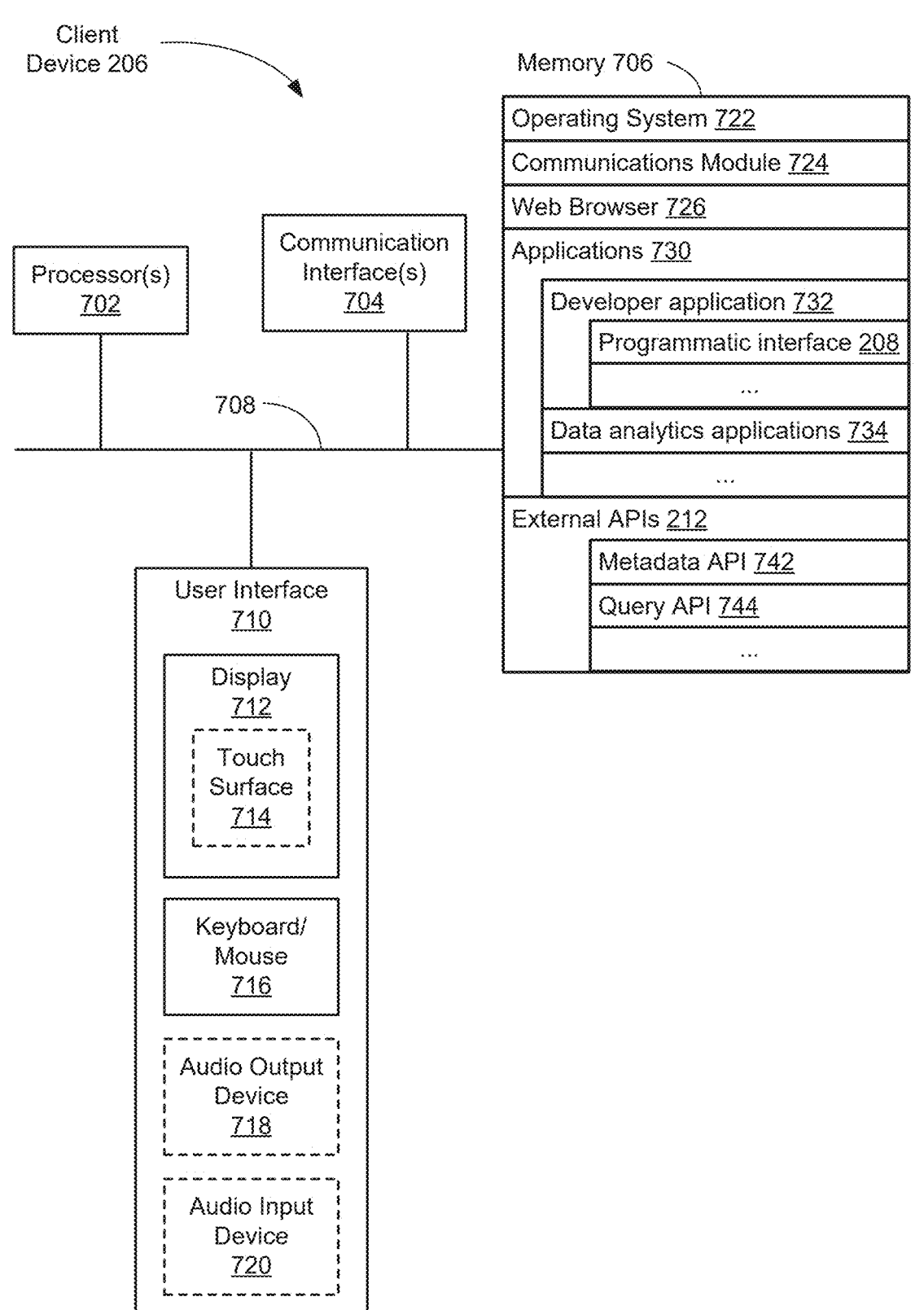
FIG. 7 is a block diagram of a client device that is configured to execute a developer application with a programmatic interface, in accordance with some implementations.

FIG. 7 is a block diagram of a client device 206 that is configured to execute a developer application with a programmatic interface (i.e., a device that does not execute a Tableau application, Headless BI client), in accordance with some implementations. Various examples of the client device 206 include a computing device, desktop computer, a laptop computer, a tablet computer, and other computing devices that have a display and a processor capable of running a developer application 732 with a programmatic interface 208. The client device 206 typically includes one or more processors 702, one or more network or other communication interfaces 704, memory 706, and one or more communication buses 708 for interconnecting these components. In some implementations, the communication buses 708 include circuitry (sometimes called a chipset) that interconnects and controls communications between system components.

The client device 206 includes a user interface 710. The user interface 710 typically includes a display device 712. In some implementations, the client device 206 includes input devices such as a keyboard, mouse, and/or other input buttons 716. Alternatively or in addition, in some implementations, the display device 712 includes a touch-sensitive surface 714, in which case the display device 712 is a touch-sensitive display 714. In some implementations, the touch-sensitive surface 714 is configured to detect various swipe gestures (e.g., continuous gestures in vertical and/or horizontal directions) and/or other gestures (e.g., single/ double tap). In computing devices that have a touch-sensitive display 714, a physical keyboard is optional (e.g., a soft keyboard may be displayed when keyboard entry is needed). The user interface 710 can also include an audio output device 718, such as speakers or an audio output connection connected to speakers, earphones, or headphones. Furthermore, some client devices 206 use an audio input device 720 such as a microphone or other voice recognition system to supplement or replace the keyboard.

In some implementations, the memory 706 includes high-speed random-access memory, such as DRAM, SRAM, DDR RAM, or other random-access solid-state memory devices. In some implementations, the memory 706 includes non-volatile memory, such as one or more magnetic disk storage devices, optical disk storage devices, flash memory devices, or other non-volatile solid-state storage devices. In some implementations, the memory 706 includes one or more storage devices remotely located from the processors 702. The memory 706, or alternatively the non-volatile memory devices within the memory 706, includes a non-transitory computer-readable storage medium. In some implementations, the memory 706, or the computer-readable storage medium of the memory 706, stores the following programs, modules, and data structures, or a subset or superset thereof:

- an operating system 722, which includes procedures for handling various basic system services and for performing hardware dependent tasks;
- a communications module 724, which is used for connecting the client device 206 to other computers (e.g., headless BI service 210) and devices via the one or more communication interfaces 704 (wired or wireless), such as the Internet, other wide area networks, local area networks, metropolitan area networks, and so on;
- a web browser 726 (or other application capable of displaying web pages), which enables a user to communicate over a network with remote computers or devices;
- one or more applications 730. In some implementations, the applications 730 include:
  - a developer application 732 having a programmatic interface 208; and
  - one or more data analytics applications 734; and
- APIs 212 for making and receiving API calls from one or more applications or services (e.g., a headless BI service 210), translating the API calls into appropriate actions, and performing one or more actions. In some implementations, the APIs 212 include:
  - a metadata API 742. For example, in some implementations, the client device 206 can issue to the headless BI service 210 a metadata API call that specifies the name of a published data source. The headless BI service 210 returns information about data fields in the published data source, such as field names of data fields, the data type (e.g., real or string) of a respective data field, alias names of the data field, and/or whether the data field contains null values; and
  - a query API 744. For example, in some implementations, the client device 206 206 can issue to the headless BI service 210 a query API call that specifies the published data source, one or more data fields, and one or more other options (e.g., filter options) and the headless BI service 210 returns data according to the specification.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 706 stores a subset of the modules and data structures identified above. Furthermore, the memory 706 may store additional modules or data structures not described above.

Although FIG. 7 shows a client device 206, FIG. 7 is intended more as a functional description of the various features that may be present rather than as a structural schematic of the implementations described herein. In practice, and as recognized by those of ordinary skill in the art, items shown separately could be combined and some items could be separated.

Figure 8:
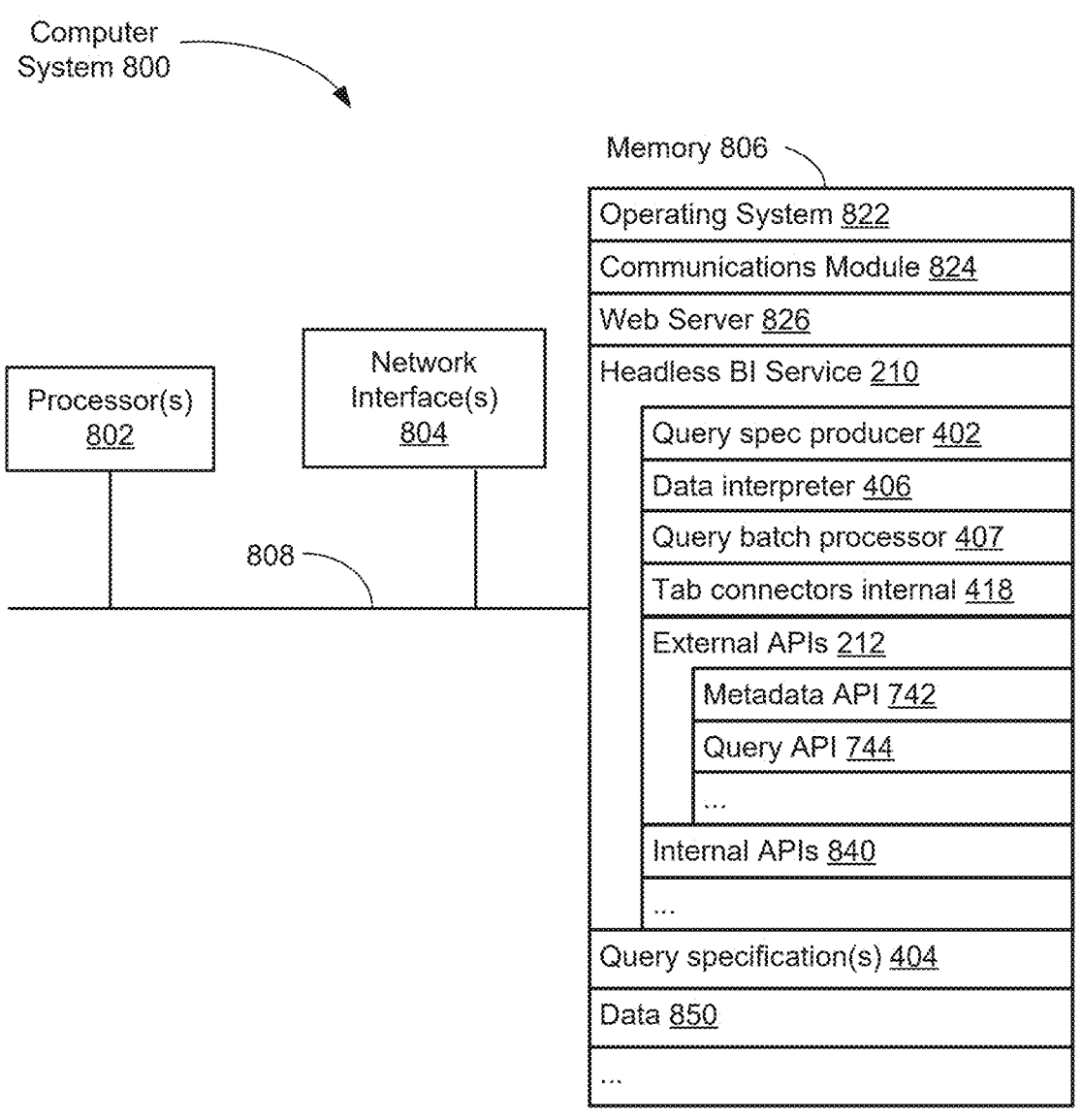
FIG. 8 is a block diagram of a computer system running a headless BI service, in accordance with some implementations.

FIG. 8 is a block diagram of a computer system 800 (e.g., a server system) running a headless BI service 210, in accordance with some implementations. Additional components of the headless BI service are described in FIG. 4.

The computer system 800 typically includes one or more processing units/cores (CPUs) 802, one or more network interfaces 804, memory 806, and one or more communication buses 808 for interconnecting these components. In some implementations, the communication buses 808 include circuitry (sometimes called a chipset) that interconnects and controls communications between system components.

In some implementations, the memory 806 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 806 includes one or more storage devices remotely located from the CPUs 802. The memory 806, or alternatively the non-volatile memory devices within the memory 806, comprises a non-transitory computer readable storage medium.

In some implementations, the memory 806 or the computer readable storage medium of the memory 806 stores the following programs, modules, and data structures, or a subset thereof:

- an operating system 822, which includes procedures for handling various basic system services and for performing hardware dependent tasks;
- a communications module 824 (e.g., network communications module), which is used for connecting the computer system 800 to other computers via the one or more communication network interfaces 804 (wired or wireless) and one or more communication networks, such as the Internet, other wide area networks, local area networks, metropolitan area networks, and so on;
- a web server 826 (such as an HTTP server), which receives web requests from client devices and responds by providing responsive web pages or other resources;
- a headless BI service 210, including:
  - a query specification producer, a data interpreter 406, a query batch processor 407, and a Tableau connectors internal 418, which are described with reference to FIG. 4;
  - external APIs 212, including a metadata API 742 and a query API 744, which are described with reference to FIGS. 2 and 7; and
  - internal APIs 840, for making and receiving API calls from an internal VDS service 220, translating the API calls into appropriate actions, and performing one or more actions;
- query specifications 404. Query specifications are basically bags of fields (as composed to Logical Queries, which are closer to self-contained SQL trees). The client (e.g., client 206) takes care that the data source knows what the field names are referring to. In some implementations, a query specification specifies Fields to query for (outputColumns); if and how to apply densification (densificationSettings); Table calculation settings (tableCalcSettings); and Filters (filterSpecification). In some implementations, the headless BI service 210 will dispatch the query specification to the VDS 220. In some implementations, the headless BI service 210 converts the query specification to abstract queries and sends the abstract queries to the VDS 220. In some implementations, the query specification or the abstract queries are sent to the VDS 220 in a serialized data format (e.g., as a protobuf). The VDS 220 handles the semantics and running the query pipeline. In some implementations, the headless BI service 210 is a new layer (e.g., a function) that packages and sends the query specification and relevant native state to the VDS 220; and data 750

Although FIG. 8 shows a computer system 800, FIG. 8 is intended more as a functional description of the various features that may be present rather than as a structural schematic of the implementations described herein. In practice, and as recognized by those of ordinary skill in the art, items shown separately could be combined and some items could be separated. One of skill in the art recognizes that FIG. 8 need not represent a single physical device. In some implementations, the server functionality is allocated across multiple physical devices in a server system. As used herein, references to a "server" include various groups, collections, or arrays of servers that provide the described functionality, and the physical servers need not be physically collocated (e.g., the individual physical devices could be spread throughout the United States or throughout the world).

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some embodiments, the memory 806 stores a subset of the modules and data structures identified above. Furthermore, the memory 806 may store additional modules or data structures not described above (e.g., module(s) for machine learning and/or training models). In some embodiments, a subset of the programs, modules, and/or data stored in the memory 806 can be stored on and executed by the server system 360 running the Viz Data Service 220 or by the Tableau data server 370.

FIG. 9 is a block diagram of a data server 370 (e.g., a data visualization server), in accordance with some implementations. Tableau data server 370 may host one or more databases 940 or may provide various executable applications or modules. Tableau data server 370 typically includes one or more processing units/cores (CPUs) 902, one or more network interfaces 904, memory 914, and one or more communication buses 912 for interconnecting these components. In some implementations, Tableau data server 370 370 includes a user interface 906, which includes a display 908 and one or more input devices 910, such as a keyboard and a mouse. In some implementations, the communication buses 912 includes circuitry (sometimes called a chipset) that interconnects and controls communications between system components.

In some implementations, the memory 914 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 914 includes one or more storage devices remotely located from the CPU(s) 902. The memory 914, or alternatively the non-volatile memory devices within the memory 914, comprises a non-transitory computer-readable storage medium.

In some implementations, the memory 914, or the computer-readable storage medium of the memory 914, stores the following programs, modules, and data structures, or a subset thereof:

- an operating system 916, which includes procedures for handling various basic system services and for performing hardware dependent tasks;
- a network communication module 918, which is used for connecting Tableau data server 370 to other computers via the one or more communication network interfaces 904 (wired or wireless) and one or more communication networks, such as the Internet, other wide area networks, local area networks, metropolitan area networks, and so on;
- a web server 920 (such as an HTTP server), which receives web requests from users and responds by providing responsive web pages or other resources;
- a data visualization web application 922, which may be downloaded and executed by a web browser 820 on a user's computing device (e.g., client device 202 or client device 204). In general, a data visualization web application 922 has the same functionality as a desktop data visualization application, but provides the flexibility of access from any device at any location with network connectivity, and does not require installation and maintenance. In some implementations, the data visualization web application 922 includes various software modules to perform certain tasks. In some implementations, the web application 922 includes a user interface module 924, which provides the user interface for all aspects of the web application 922.
- In some implementations, the user interface module 924 specifies a plurality of shelf regions 624, which are used to specify characteristics of a desired data visualization.
- In some implementations, the shelf regions 624 include a columns shelf 120 and a rows shelf 122 (see, e.g., FIG. 1), which are used to specify the arrangement of data in the desired data visualization. In general, fields that are placed on the columns shelf 120 are used to define the columns in the data visualization (e.g., the x-coordinates of visual marks). Similarly, the fields placed on the rows shelf 122 define the rows in the data visualization (e.g., the y-coordinates of the visual marks). In some implementations, the shelf regions 624 include a filters shelf 626, which enables a user to limit the data viewed according to a selected data field (e.g., limit the data to rows for which a certain field has a specific value or has values in a specific range). In some implementations, the shelf regions 624 include a marks shelf 628, which is used to specify various encodings of data marks. In some implementations, the marks shelf 628 includes a color encoding icon (to specify colors of data marks based on a data field), a size encoding icon (to specify the size of data marks based on a data field), a text encoding icon (to specify labels associated with data marks), and a view level detail icon (to specify or modify the level of detail for the data visualization).

- In some implementations, the data visualization web application 922 also stores visual specifications 130 as a user selects characteristics of the desired data visualization. Visual specifications 130 are used to define characteristics of a desired data visualization. In some implementations, a visual specification 130 is built using a user interface 100 on a client device 202 or a client device 204. A visual specification includes identified data sources 632 (i.e., specifies what the data sources are), which provide enough information to find the data sources 632 (e.g., a data source name or network full path name). A visual specification 130 also includes visual variables 634, and the assigned data fields 636 for each of the visual variables. In some implementations, a visual specification 130 has visual variables corresponding to each of the shelf regions 624. In some implementations, the visual variables include other information as well, such as context information about a computing device running Tableau desktop, user preference information, or other data visualization features that are not implemented as shelf regions (e.g., analytic features);
- one or more object models 338, which identify the structure of the data sources 942. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;
- a data visualization generator 640, which generates and displays data visualizations according to user-selected data sources and data fields, visual specifications, as well as one or more object models that describe the data sources 942. In some implementations, selected data fields are grouped into one or more data field sets. In accordance with some implementations, the data visualization generator 640 uses an object model 338 to generate queries 646 and/or optimize queries using query optimizers 644;
- in some implementations, the web application 922 includes a data retrieval module 930, which builds and executes queries to retrieve data from one or more data sources 2942. The data sources 942 may be stored locally on the server 370 or stored in an external database. In some implementations, data from two or more data sources may be blended. In some implementations, the data retrieval module 930 uses a visual specification 130 to build the queries, as described above for the client device 202 or client device 204 in FIG. 6;
- in some implementations, the memory 914 stores visualization parameters 648, which contain information used by the data visualization web application 922 other than the information provided by the visual specifications 130 and the data sources 942;

one or more databases 940, which store data used or created by the data visualization web application 922 or data visualization application 622. The databases 940 may store data sources 942, which provide the data used in the generated data visualizations. In some implementations, the data sources are stored as spreadsheet files, CSV files, XML files, flat files, JSON files, tables in a relational database, cloud databases, or statistical databases. Each data source 942 includes one or more data fields 944. In some implementations, the database 940 stores user preferences. In some implementations, the database 940 includes a data visualization history log 946. In some implementations, the history log 946 tracks each time the data visualization web application 922 renders a data visualization.

The databases 940 may store data in many different formats, and commonly include many distinct tables, each with a plurality of data fields 944. Some data sources comprise a single table. The data fields 944 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields are stored separately from the data source 944. In some implementations, the database 940 stores a set of user preferences for each user. The user preferences may be used when the data visualization web application 922 (or application 622) makes recommendations about how to view a set of data fields 944. In some implementations, the database 940 stores a data visualization history log 946, which stores information about each data visualization generated. In some implementations, the database 940 stores other information, including other information used by the data visualization web application 922. The databases 940 may be separate from the Tableau data server 370, or may be included with the Tableau data server 370 (or both).

In some implementations, the data visualization history log 946 stores the visual specifications 130 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 914 stores a subset of the modules and data structures identified above. In some implementations, the memory 914 stores additional modules or data structures not described above.

Although FIG. 9 shows a data server 370, FIG. 9 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to data server 370 may be stored or executed on client device 202, client device 204, or data server 360. In some implementations, the functionality and/or data may be allocated between a client device 202, a client device 204, one or more data servers 360, and one or more data servers 370. Furthermore, one of skill in the art recognizes that FIG. 9 need not represent a single physical device. In some implementations, the server functionality is allocated across multiple physical devices that comprise a server system. As used herein, references to a "server" or "data server" include various groups, collections, or arrays of servers that provide the described functionality, and the physical servers need not be physically collocated (e.g., the individual physical devices could be spread throughout the United States or throughout the world).

Figure 10:
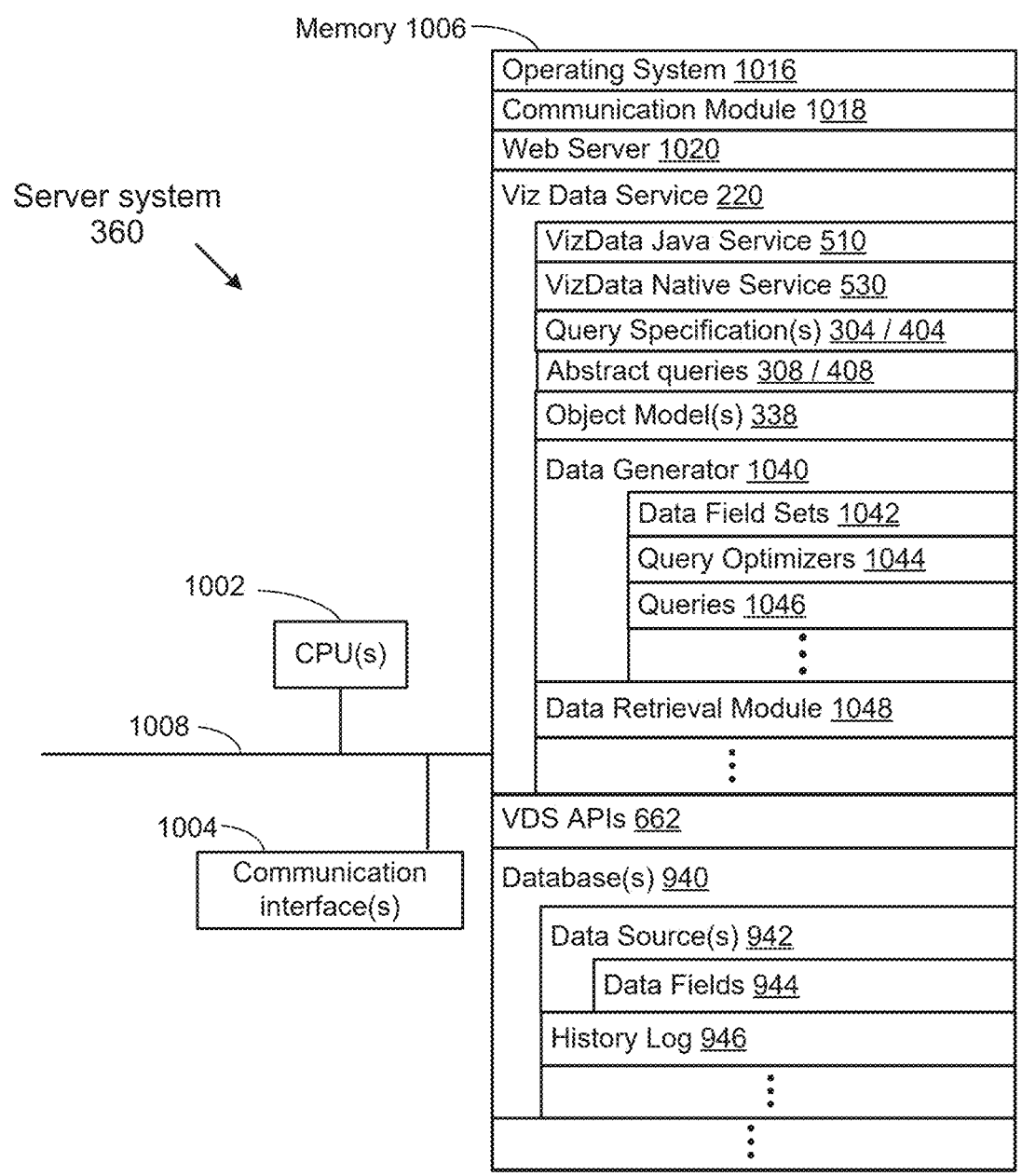
FIG. 10 illustrates a block diagram of a server system running an internal VDS service (e.g., VDS 220), in accordance with some implementations.

FIG. 10 illustrates a block diagram of a server system 360 running an internal VDS service (e.g., VDS 220), in accordance with some implementations.

Server system 360 may host one or more databases 940 or may provide various executable applications or modules. A server 360 typically includes one or more processing units/cores (CPUs) 1002, one or more network interfaces 1004, memory 1006, and one or more communication buses 1008 for interconnecting these components.

In some implementations, the memory 1006 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 1006 includes one or more storage devices remotely located from the CPU(s) 1002. The memory 1006, or alternatively the non-volatile memory devices within the memory 1006, comprises a non-transitory computer-readable storage medium.

In some implementations, the memory 1006, or the computer-readable storage medium of the memory 1006, stores the following programs, modules, and data structures, or a subset thereof:

an operating system 1016, which includes procedures for handling various basic system services and for performing hardware dependent tasks;

a network communication module 2018, which is used for connecting the server 360 to other computers via the one or more communication network interfaces 1004 (wired or wireless) and one or more communication networks, such as the Internet, other wide area networks, local area networks, metropolitan area networks, and so on;

a web server 1020 (such as an HTTP server), which receives web requests from users and responds by providing responsive web pages or other resources;

Viz Data Service (VDS) 220, which is described with reference to FIGS. 2, 3, 4, and 6. In some implementations, VDS 220 includes:

VizData Java service 510 and VizData native service 530, which are described with reference to FIG. 5;

query specifications 304/404 that are received from one or more client devices 202, client device 204, or a headless BI service 210. Query specifications are basically bags of fields (as composed to Logical Queries, which are closer to self-contained SQL trees). The client (e.g., clients 202 and 204, or headless BI service 210) takes care that the data source knows what the field names are referring to. In some implementations, a query specification 2850 specifies fields to query for (outputColumns); if and how to apply densification (densificationSettings); table calculation settings (tableCalcSettings); and filters (filterSpecification). In some implementations, a headless BI service 210 will dispatch the query specification to the VDS 220. The VDS 220 handles the semantics and running the query pipeline. In some implementations, a new layer (e.g., a function) packages and sends the query specification and relevant native state to the VDS 220;

abstract queries 308/408 that are received from one or more client devices 202, client device 204, or a headless BI service 210;

one or more object models 338 (e.g., data models), which identify the structure of the data sources 942. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;

a data generator 1040, which generates and returns data according to user-selected data sources and data fields, query specifications, abstract queries, as well as one or more object models that describe the data sources 942. In some implementations, selected data fields are grouped into one or more data field sets 1042. In accordance with some implementations, the data generator 1040 uses an object model 338 to generate queries 1046 and/or optimize queries using query optimizers 1044;

a data retrieval module 1048, which builds and executes queries to retrieve data from one or more data sources 3042. The data sources 942 may be stored locally on the server system 360 or stored in an external database. In some implementations, data from two or more data sources may be blended. In some implementations, the data retrieval module 1048 uses query specifications 304/404 or abstract queries 308/408;

VDS APIs 662 (e.g., also referred to as internal APIs);

one or more databases 940, which store data used or created by the headless BI service 210, client devices

202, 204, or 206. The databases 940 may store data sources 1042. In some implementations, the data sources are stored as spreadsheet files, CSV files, XML files, flat files, JSON files, tables in a relational database, cloud databases, or statistical databases. Each data source 942 includes one or more data fields 944. In some implementations, the database 940 stores user preferences. In some implementations, the database 940 includes a history log 946 of queries.

The databases 940 may store data in many different formats, and commonly include many distinct tables, each with a plurality of data fields 944. Some data sources comprise a single table. The data fields 944 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields are stored separately from the data source 942. In some implementations, the database 940 stores a set of user preferences for each user. In some implementations, the database 940 stores other information, including other information used by the headless BI service 210. The databases 940 may be separate from the server system 360, or may be included with the computer system 360 (or both).

In some implementations, the history log 946 stores the query specifications associated with each client device (e.g., client 202, 204, or 206) or associated with the headless BI service 210. The history log 946 may include a device identifier, a timestamp of when the query specification was generated (or received), a list of the data fields used in the query specification, the data relationships selected, and what connectors are used.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 1006 stores a subset of the modules and data structures identified above. In some implementations, the memory 1006 stores additional modules or data structures not described above.

Although FIG. 10 shows a server system 360, FIG. 10 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to server system 360 may be stored or executed on a computer system 800 running a headless BI service 210, or on Tableau data server 370, or on client devices 202, 204, or 206. In some implementations, the functionality and/or data may be allocated between one or more server systems 360 and server systems 370. Furthermore, one of skill in the art recognizes that FIG. 10 need not represent a single physical device. In some implementations, the server functionality is allocated across multiple physical devices that comprise a server system. As used herein, references to a "server" or "computer system" can include various groups, collections, or arrays of servers that provide the described functionality, and the physical servers need not be physically collocated (e.g., the individual physical devices could be spread throughout the United States or throughout the world).

Viz Data Service for Federated Query Abstraction

Data Server 370 (e.g., Tableau data server data visualization server) is the current piece of the server architecture for querying published data sources. In the current server ecosystem, Data Server 370 provides a SQL-like query interface on top of published data sources. Here, a SQL-like query refers to a tree of relational operators such as tables, joins and unions. With this architecture, clients must incorporate all their desired semantics into the queries they send to Data Server 370. For example, a client that wants to query a FIXED level of detail (LoD) calculation would need to know how to express this query in Logical Ops/expressions.

Some implementations of the present disclosure provide a Viz Data Service 220 (VDS or Internal VDS), which introduces a new higher-level query interface on top of published data sources. With this architecture, clients express intent through their queries and the VDS 220 compiles the SQL-like queries that satisfy this intent. For example, a client that wants to query a FIXED LoD calculation would either query for the calculation by name or by formula. The VDS would compile the calculation to the relevant SQL-like query. The concrete SQL-like query language used by Tableau's query pipeline is the Logical Query language.

In some implementations, the advantages of VDS's higher-level query interface for published data sources include:

New analytic features: Data Server's current distributed semantic reasoning blocks Shared Dimensions and other related features from being properly queryable once published;

Shareable semantics: The Viz Data Service's query language will enable a wider variety of clients to leverage Tableau's semantics. Currently, Logical Queries require clients to embed their semantics through their query compilation process while Visual Specifications conflate data and layout; and More similar queries for published scenarios: The queries compiled for a published data source are often different from the queries for the same data source when it is embedded. VDS is expected to narrow this difference gap.

According to some implementations of the present disclosure, the functional requirements of unblocking new analytic features such as Shared Dimensions, as well as enabling new clients to consume Tableau's semantics are met by VDS's higher-level query interface.

Today, for Data Server 370, both the client and server side of the published data source query protocol must perform semantic query compilation, in the face of information asymmetry, across a zero-trust boundary. Since the client does not have access to the server's hidden state and the server does not have the full context of the client's semantic intent, certain semantics transformations may not be possible. For example, Data Server may not be able to apply data source filters in a manner that depends on the tables present in a client's query.

A higher-level query language will enable clients to express their semantic intent while pushing all the semantic reasoning of query compilation to the VDS 220. With VDS 220, all the semantic query compilation is compiled by the server (e.g., server 360) behind the zero-trust boundary. As the VDS 220 has the full context of the client's intent (from the query) as well as hidden published data source (as it is within the zero-trust boundary), it can compile the same sets of queries as in the embedded data source case. The gap between embedded and published data source query shapes is due to the current distributed query semantic reasoning so pushing query compilation to a single place should narrow that gap.

In some implementations, integrating monolith clients (e.g., Desktop, VizQLServer) to consume the VDS ensures that the new query specification representation is at parity with existing Tableau analytic scenarios.

Embedded Versus Published Data Sources

Figure 11:
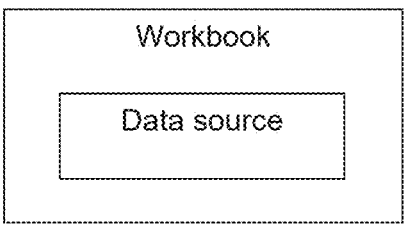
FIG. 11 illustrates an embedded data source, in accordance with some implementations.

FIG. 11 illustrates an embedded data source, in accordance with some implementations. In the case of an embedded data source, the data source belongs to the workbook. This means that the workbook "owns" the data source and has full access to information in the data source. Authors may edit the data source directly. When a workbook with an embedded data source is published, the data source remains part of the workbook—it cannot be consumed by other workbook authors. While an embedded data source has some nice properties (e.g., the queries generated in the embedded case are likely to be optimal), the data source is "private" to the outside world, and cannot be used to create new workbooks. An embedded data source also does not fit into other pieces of the server ecosystem.

By contrast, in the case of a published data source, the data source is published to the server as a separate resource. Published data sources can be used to create new workbooks. Published data sources can be accessed in a number of ways. The Tableau data source (TDS) Service 518 enables clients to read metadata (e.g., field information, table information) about published data sources. This metadata is based on the serialized data source, which means that it is performant to read but may not include the full state of an instantiated Data Source object. For instance, the serialized data source will reference columns from the underlying databases that existed at serialization time; the database may have changed in the interim.

Figure 12:
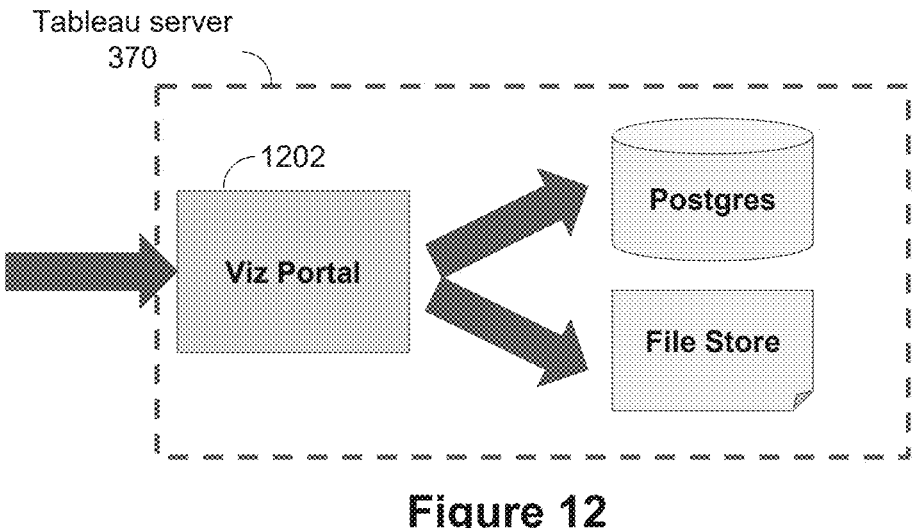
FIG. 12 illustrates publishing a data source via VizPortal, in accordance with some implementations.

FIG. 12 illustrates publishing a data source via Viz Portal 1202, in accordance with some implementations. Historically, publishing takes place through Viz Portal. Importantly, this flow does not take place through Data Server or, later, VDS. What is being published is a tdsx—the data source and its resources. Depending on what is published, different parts of the data source may be stored in different places. The most important storage zone is the Postgres database. This is where we store the TDS and some metadata about it (e.g., its name). For context, renaming publishing data source is largely about tweaking the entry in the postgres database.

Tableau Data Server 370, or simply Data Server, is the server component for querying published data sources. It is not involved in any embedded data source flows. Clients of Data Server 370 (e.g., client 202 or client 204) use Logical Queries—Tableau's SQL-like query language—to query the underlying data source. From the client perspective, published data sources are immutable. In other words, the client cannot change the underlying data model or data.

Figure 13:
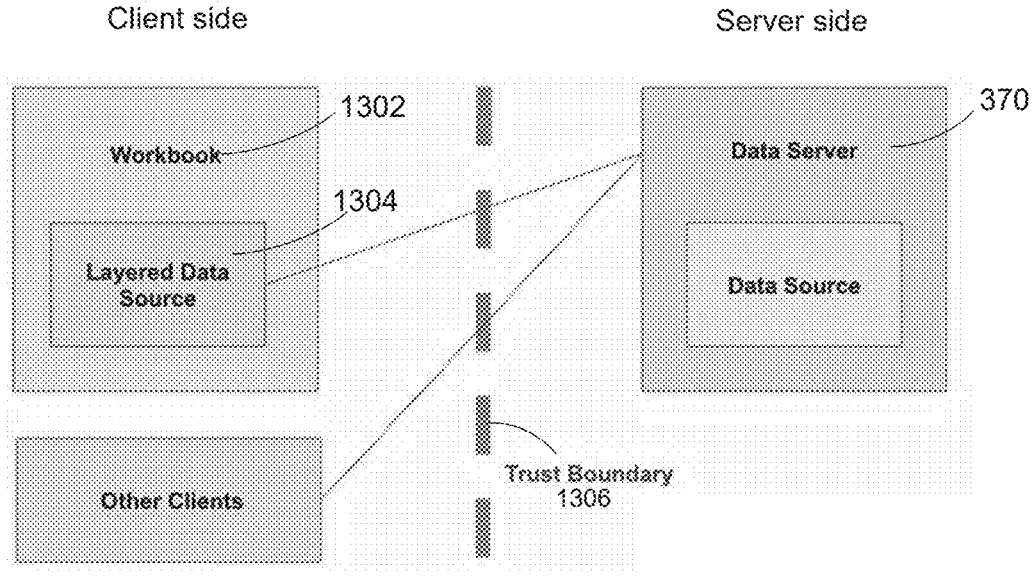
FIG. 13 illustrates a layered data source, in accordance with some implementations.

FIG. 13 illustrates a layered data source, in accordance with some implementations. A workbook client 1302 (e.g., Tableau Desktop/VizQLServer) that connects to a published data source creates a layered data source 1304. This layered data source 1304 includes a reference to the published data source as well as local state. Local state means information such as calculations and filters which exist in the layered data source but not the published data source. The current composition model can have at most one layer as layered data sources cannot be independently published themselves. For example, a client cannot edit a calculation on a published data source. Instead, a client must create a copy of the calculation-which is part of the local state within a layered data source- and edit that calculation directly.

Reading Metadata

Figure 14A:
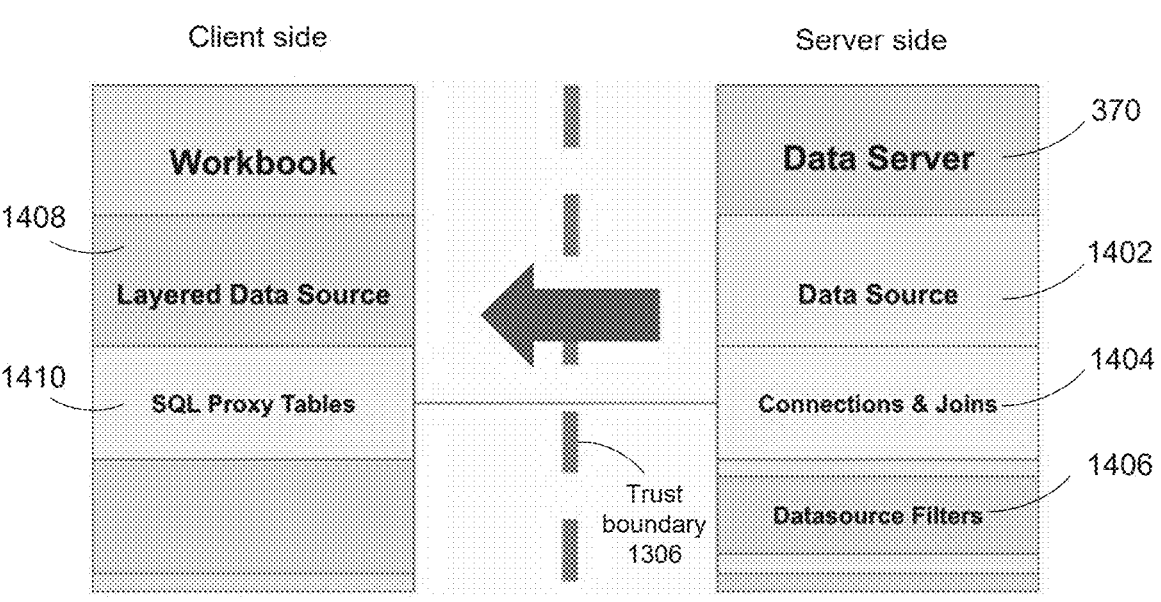
FIG. 14A illustrates a layered data source referencing a sanitized version of the data model to compile queries, in accordance with some implementations.

FIG. 14A illustrates a layered data source referencing a sanitized version of the data model to compile queries, in accordance with some implementations. In some implementations, in addition to a query interface, Data Server 370 exposes a metadata interface that includes field-level metadata and a sanitized version of the data source. The sanitized data source 1402 reflects the overall structure of the data source (e.g., the set of fields, the logical table structure) while hiding certain information such as the presence of data source filters 1406. As part of the query execution process, Data Server 370 incorporates its hidden state (e.g., data source filters 1406) into the client's queries. Layered data sources reference the sanitized version of the data model to compile queries. For example, clients do not have access to the underlying connections in the published data source and instead write queries in terms of opaque "SQL Proxy tables" 1410. The root connection of a layered data source is a Layered Connection (e.g., connections and joins 1404). A canonical check for whether a data source is layered is to check the connection type. The layered connection stack (which includes Layered Protocol & Web Channel) makes REST calls to Data Server to create sessions, read metadata and issue queries.

Figure 14B:
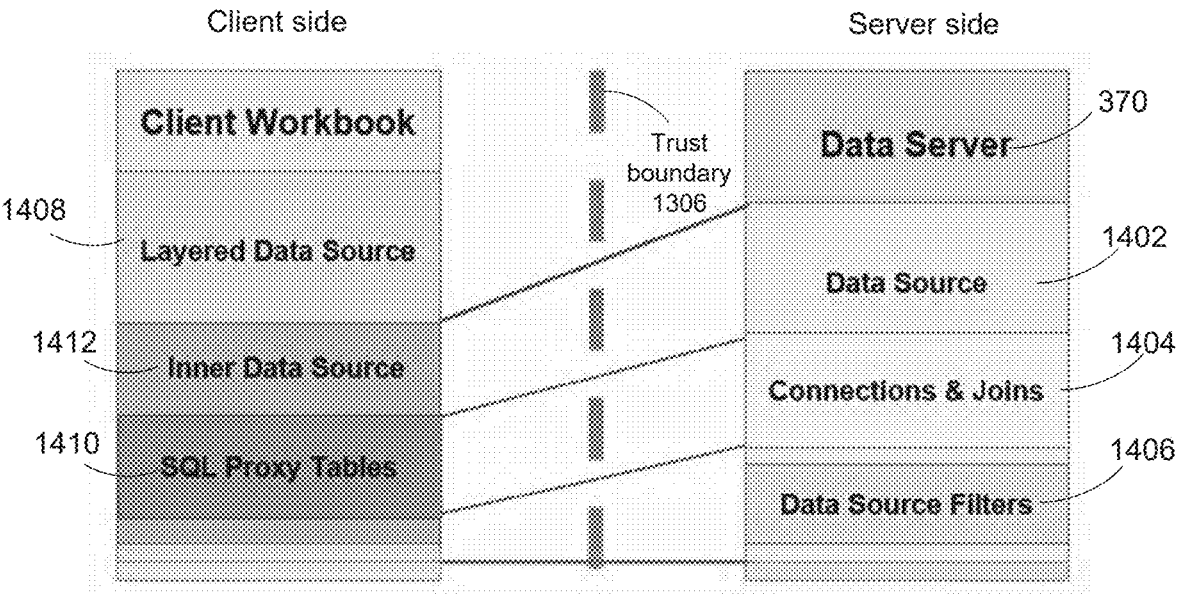
FIG. 14B illustrates another layered data source, in accordance with some implementations.

FIG. 14B illustrates another layered data source, in accordance with some implementations. Data Server 370 enforces a trust boundary 1306 around what it exposes about its underlying data source (see also FIG. 18A). Additionally, with respect to the client, the published data source is immutable. The client creates a layered data source, which represents the published data source plus a local state. Within the layered data source is an inner data source 1412. This inner data source 1412 is the client's understanding of what is in the published data source. As part of its metadata protocol, Data Server 370 exposes information columnar metadata, connection capabilities and a sanitized version of the data source. For example, Data Server 370 does not expose data source filters 1406. Additionally, it hides the physical backing of logical tables behind "SQL Proxy" dummy tables 1410. There can be other types of sanitizations going on as well. For example, Data Server 370 may wipe the formulae for calculations with user references or may hide these fields entirely.

Figure 15:
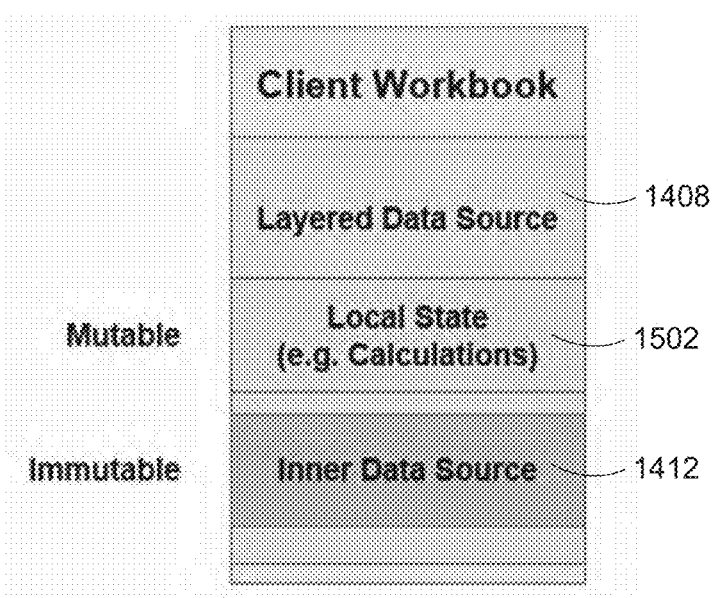
FIG. 15 illustrates adding a local state to a layered data source, in accordance with some implementations.

FIG. 15 illustrates adding a local state 1502 to a layered data source 1408, in accordance with some implementations. Calculations that are added by a user are stored "above" the inner data source 1412. They are known to the client but not the server. While this is a basic for data composition, there are several restrictions: First, these layered data sources cannot be published to the server; Second, they cannot be federated; Third, changes cannot be pushed to the data source.

These examples illustrate the problem of information asymmetry in current Tableau Data Server 370 architecture: Some of the compilation is performed at the client side and passed to Tableau Server 370, which adds more information and compiles it further. The server has no knowledge of the local state. This information asymmetry can lead to sub-optimized queries being generated and/or executed.

Query Compilation

Figure 16:
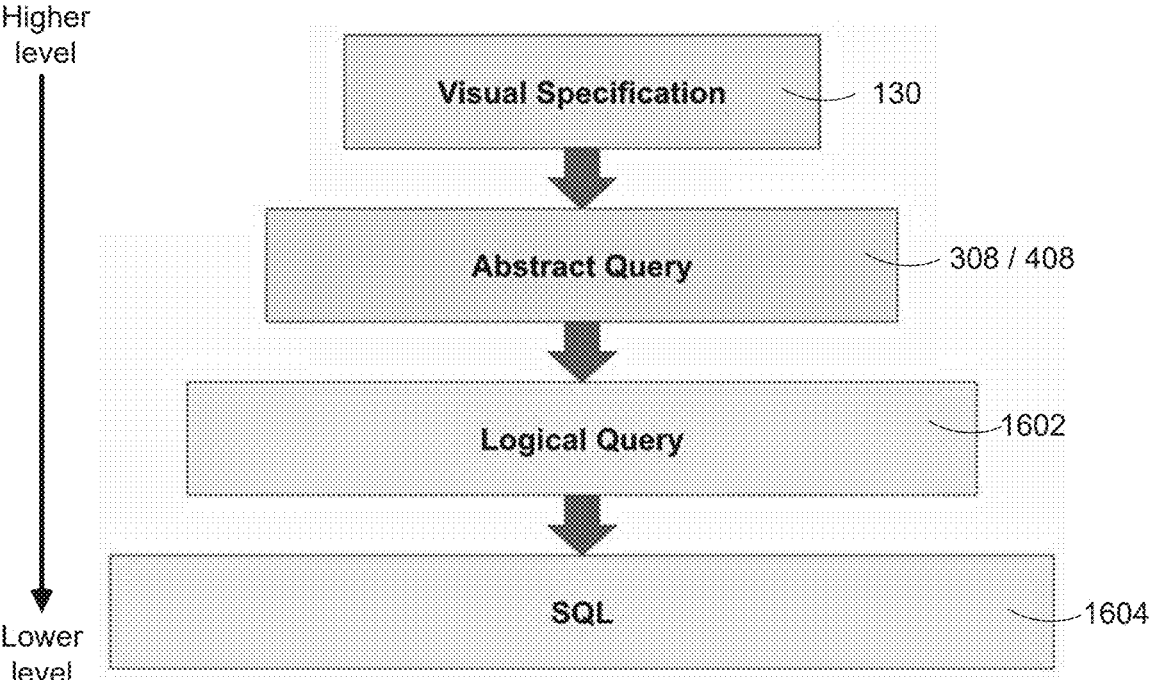
FIG. 16 illustrates Tableau's query languages, in accordance with some implementations.

FIG. 16 illustrates Tableau's query languages, in accordance with some implementations.

Tableau has a number of query languages with different levels of abstraction. The arrows in FIG. 16 represent processes of mapping from one layer to another. At the top layer, the Visual Specification 130 encodes a mix of visual layout information (e.g., axes, marks) and semantic information (e.g., totals). Tableau generates a visual specification 130 via user placement of pills into the column shelf 120 and the row shelf 122 of the Tableau GUI 100, and/or specification of filters and other encodings in the GUI 100. Through the Data Interpreters 306/406, the visual specification is converted to Abstract Queries 308/408, which contain high-level information such as output fields, group bys and filters. The Data Interpreter 306/406 reasons about computation such as whether a total can be computed using existing viz data or through a separate query. Importantly, Abstract Queries 308/408 reference fields by names but have not incorporated information such as the underlying tables or calculation formulae.

The Resolvers (e.g., abstract query resolvers 310/534) convert Abstract Queries to Logical Queries 1602 using the semantics of the Data Source (e.g., database/data sources 316, data source(s) 942). For example, the resolvers consult the data source to fetch the definitions of calculations, evaluate aggregates using Object Model semantics based on the data source's graph. The end result will be logical queries 1602.

These logical queries are then passed to the Query Pipeline (e.g., query pipeline 312 or query pipeline 538), which performs tasks such as query rewriting, optimization and federation to output the final SQL queries 1604 (e.g., SQL queries 314, 322, 324, 422, or 540).

Roughly speaking, the visual specification 130 encodes both visual and semantic intent. Abstract queries 308/4008 encode semantic intent. Logical queries 1602/SQL 1604 are relational languages (with a focus towards performance).

As previously mentioned, Data Server 370 exposes a SQL-like interface for querying published data sources. One implication of this approach is that the clients are responsible for much of the semantic heavy lifting. Tableau Desktop and VizQL Server run their own instance of the Interpreters and Resolvers to compile Logical Queries. Clients such as AskData do not have access to the Interpreter/Resolver functionality and query Data Server using a limited set of template queries.

Abstract queries 308/408 and visual specifications 130 sit at higher levels in the query compilation pipeline than logical queries 1602, so they may act as a higher-level language for clients to access Tableau semantics, but each has disadvantages. Abstract queries 308/408 as an interface would provide access into the resolvers but would not enable access to the higher-level interpreter functionalities (e.g., table calculations). Visual specifications 130 conflate layout and data information, which means that query authors must frame data-only questions in terms of a visualization (viz). Additionally, neither language was explicitly designed for ease-of-use for external clients as part of a wire protocol.

Query Processing

Figure 17:
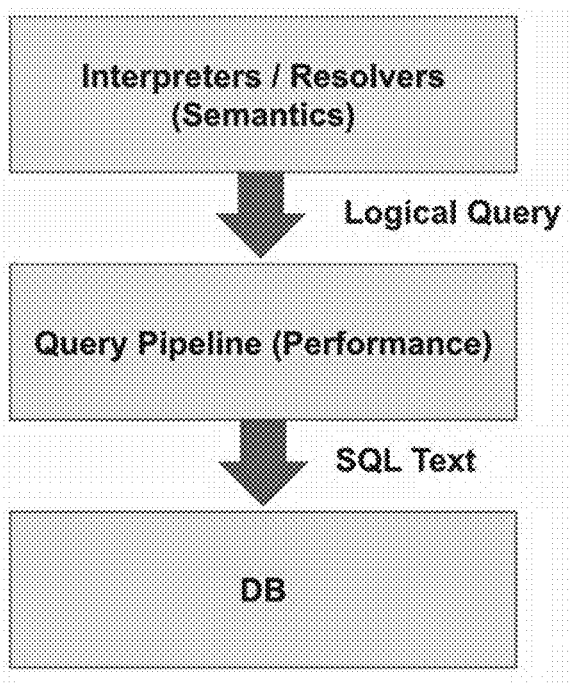
FIG. 17 illustrates query processing for an embedded data source, in accordance with some implementations.

FIG. 17 illustrates query processing for an embedded data source, in accordance with some implementations. In the embedded data source case, logical queries are compiled with full knowledge of the data source and these queries are passed to the query pipeline. Query pipeline will determine the eventual SQL text to send to the database.

Data Server Session Creation/Server Code

Figure 18A:
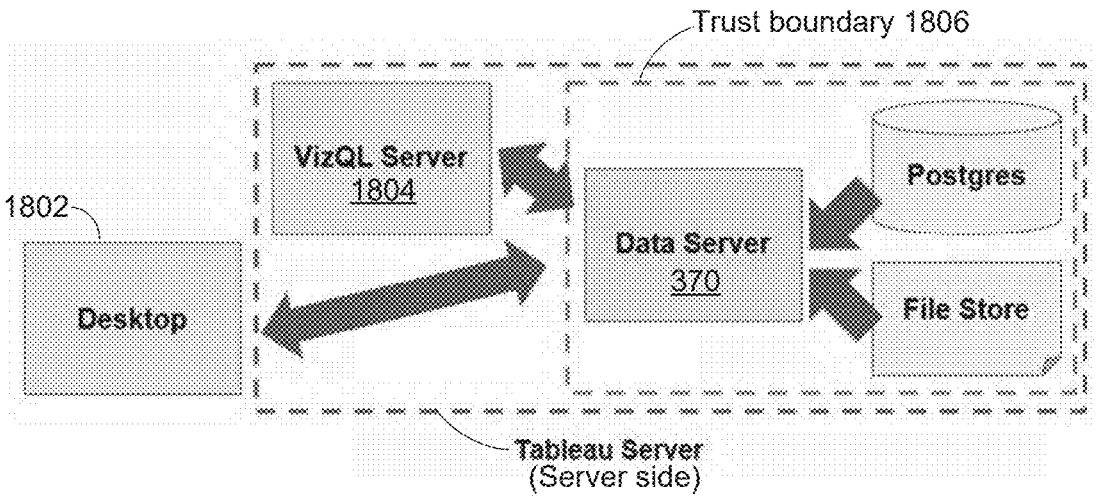
FIG. 18A illustrates session creation with Data Server, in accordance with some implementations.

FIG. 18A illustrates session creation with Data Server 370, in accordance with some implementations. A client 1802 (e.g., running Tableau desktop) connects to a published data source via Data Server 370, which serves as an abstraction for the published data source. Data Server enforces a trust boundary 1806, meaning that it hides certain details about the underlying data source from the client (e.g., data source filters for row level security).

FIG. 18A shows that the primary clients are client 1802 running Desktop (outside of server) and VizQL Server 1804 (within server). There are also other clients (e.g., data prep and Ask Data Data). First, the client will try to authenticate itself to Data Server 370 to create a session. If this succeeds, Data Server 370 grabs all the resources it needs to rehydrate a Data Source object (e.g., the TDS from Postgres files from the file store). There may be some second-level authentication depending on the credentials options. For example, a user may need to input the credentials for the underlying databases. In the case of embedded credentials, the passwords will be retrieved from a Keychain Service. Once a session is created, Data Server 370 will drive the session off its instantiated data source. The type of client does not matter from this point forward, nor do we care about Postgres/the file store going forward.

Figure 18B:
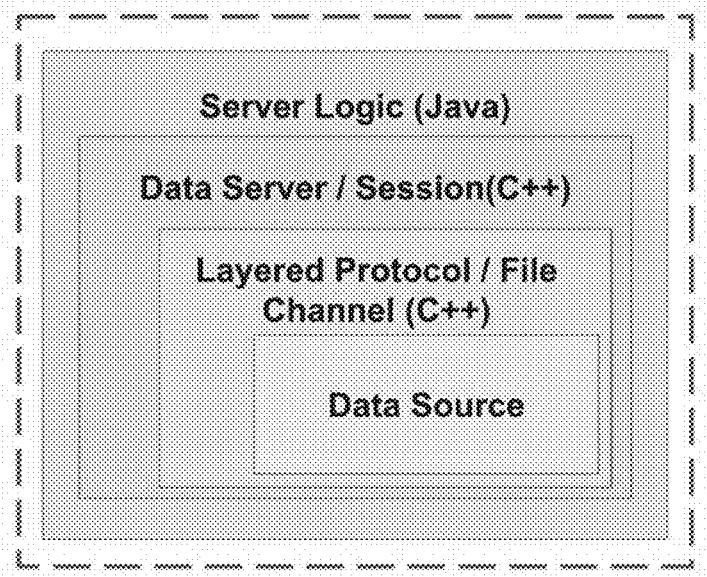
FIG. 18B illustrates establishing a session with Data Server, in accordance with some implementations.

FIG. 18B illustrates establishing a session with Data Server 370, in accordance with some implementations.

Within the Tableau Server ecosystem, Data Server is primarily called by Tableau Desktop and VizQL Server. These clients establish sessions with Data Server, which in turn, relies on Java libraries such as the keychain service and data source service to authenticate users and collect all the state necessary to instantiate a Data Source object.

The Java shell of Data Server calls into the native C++ code (Data Server/Data Session), which performs the management logic for creating sessions, exposing metadata and executing queries. This logic is powered off the Layered Protocol/File Channel layer, which keeps an instantiated Data Source object that corresponds to the published data source. For example, reading metadata for the published data source involves calling ReadMetadata on the instantiated data source object and performing post-processing.

Figure 18C:
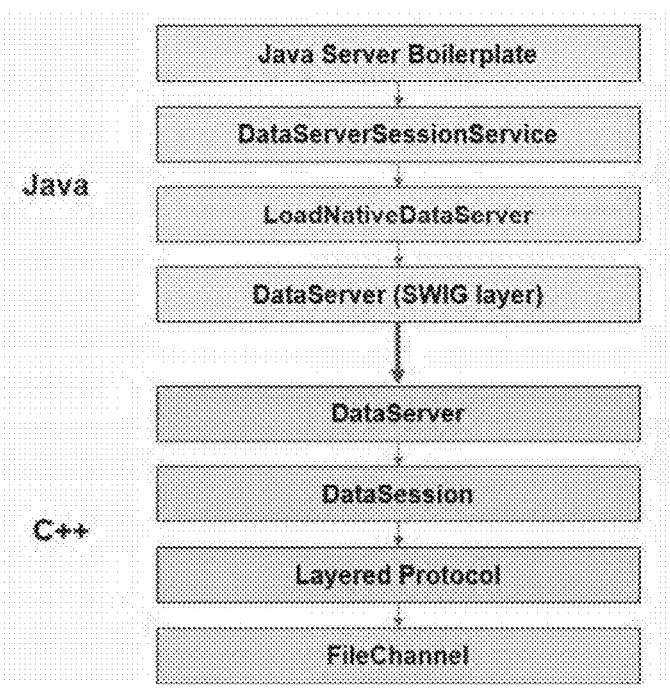
FIG. 18C shows a general code diagram of the Data Server, in accordance with some implementations.

FIG. 18C shows a general code diagram of the Data Server, in accordance with some implementations. At a high-level, the server code includes a Java component that deals with most of the "server" work and a C++ base that takes care of most of the business logic/session management. The Data Servers Session Service is the layer that deals most with authenticating users and getting the relevant state to create a data source object. These arguments are passed to C++ via SWIG. Data Server dispatches the client arguments to individual Data Server sessions. File Channel is the class that holds onto the parsed data source and performs verbs on top of it.

Figure 19:
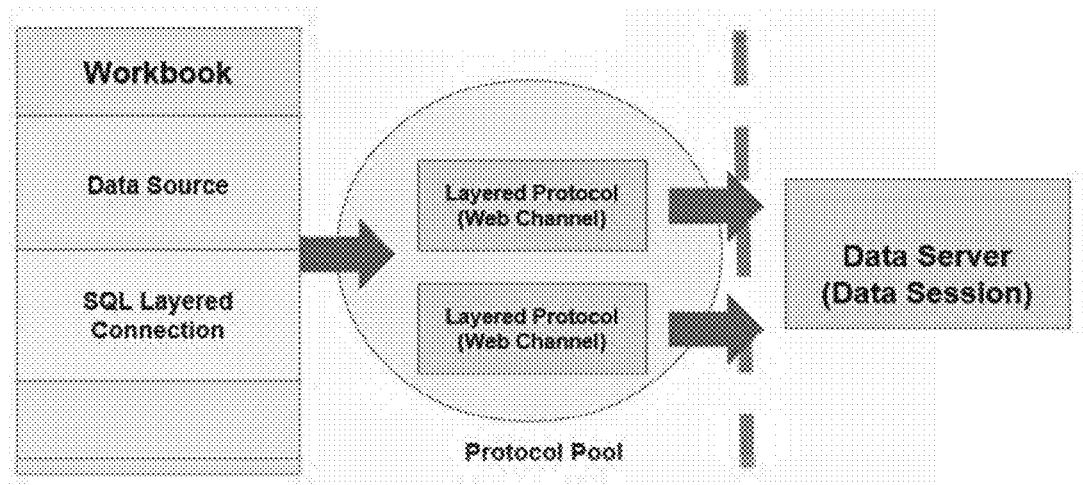
FIG. 19 illustrates connecting to published data sources, in accordance with some implementations.

FIG. 19 illustrates connecting to published data sources, in accordance with some implementations. Connections to published data sources (at Data Server side) are driven through the SQL Layered Connection. In fact, many of the semantics checks in terms of showing different UX and issuing different queries are done by checking the connection type. The Layered Connection is the layer that does most of the reasoning about the sanitized data model. The actual calls to Data Server are performed through Layered Protocol. Each Layered Protocol has a Web Channel object, which uses HTTP Requestors to talk to Data Server's REST interface (1 protocol=1 session). Generally, Layered Connections have an affinity for a given protocol instance, but multiple protocols can be opened at once to handle cases such as parallel dashboards.

FIGS. 20A to 20J illustrate the classes and protocols for an end-to-end flow, in accordance with some implementations. To recall, it includes (i) connecting to a published data source; (ii) adding a local calculation; and (iii) performing a query.

Figure 20A:
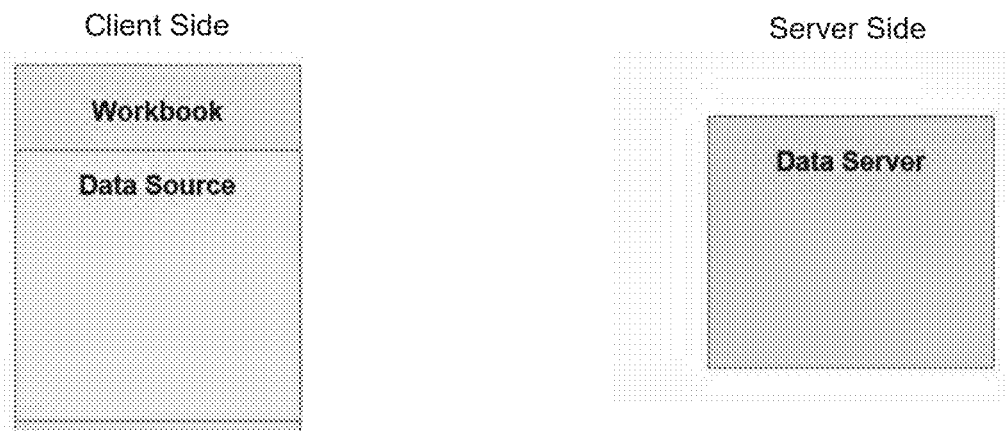
FIGS. 20A to 20J illustrate the classes and protocols for an end-to-end flow, in accordance with some implementations.

In FIG. 20A, we start with an empty workbook and an empty data source.

Figure 20B:
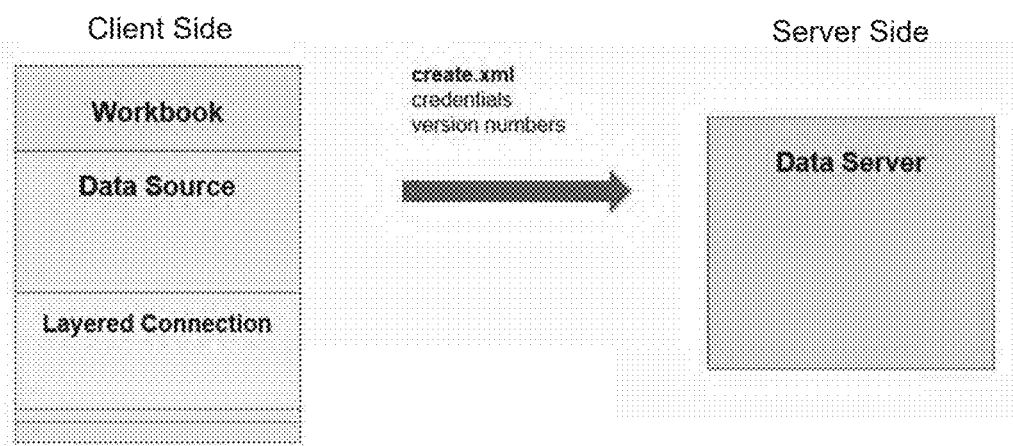

FIG. 20B shows that a Layered Connection is used to connect to Data Server. Through the Layered Protocol & Web Channel, a create session call is issued. These are REST endpoints. For historical reasons, the names of the calls sometimes have suffixes such as .xml. To set up the session, the client sends information such as its credentials and version numbers (e.g., Data Server protocol version, Logical Query version).

Figure 20C:
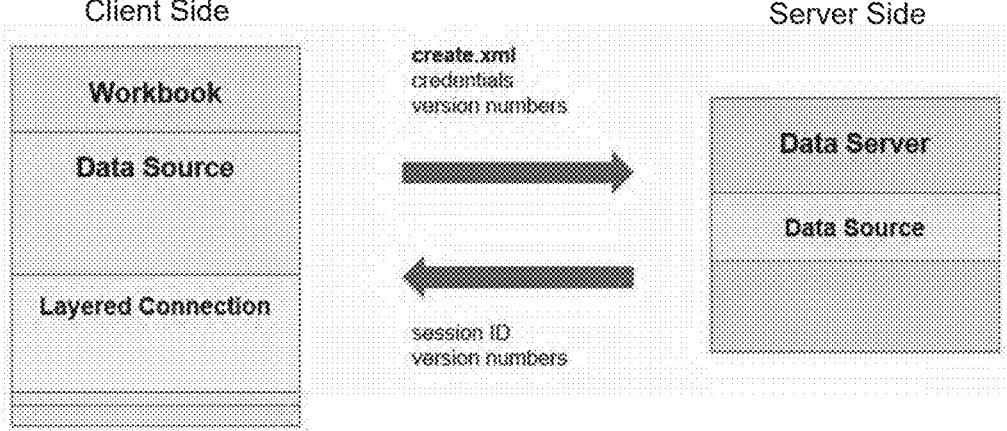

In FIG. 20C, assuming the client checks out, Data Server will create a session. The session with have an instantiated data source which will be used to drive future actions. The server sends the session ID and version numbers based on the lowest-common capabilities, amongst other information.

Figure 20D:
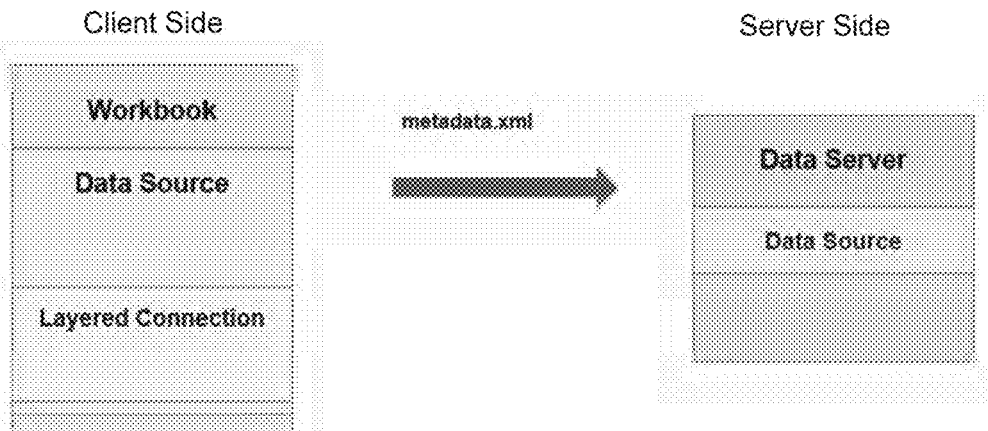
Figure 20E:
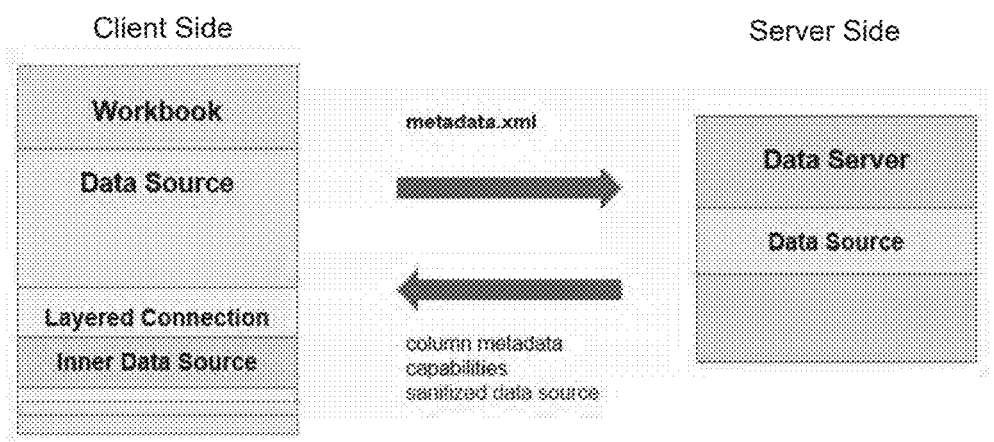
Figure 20F:
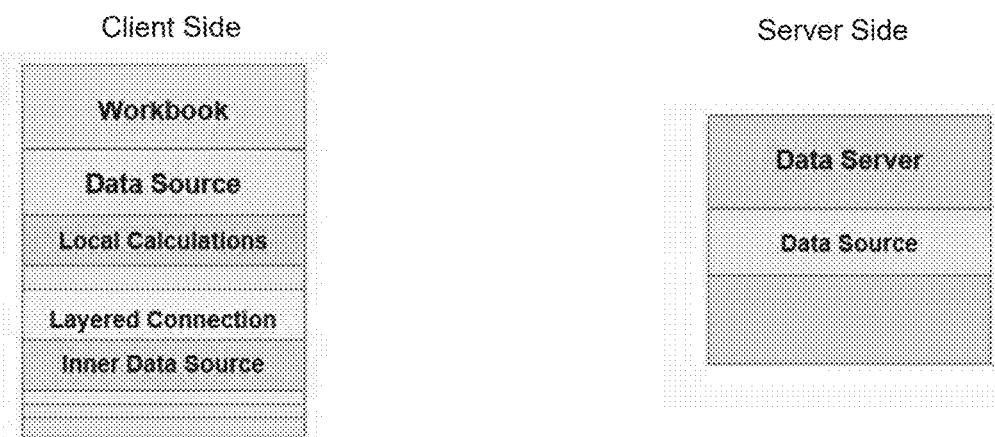

In FIG. 20D, the client asks for the metadata for Data Server via the metadata.xml path. FIG. 20E shows that Data Server will send back column metadata, capabilities (e.g., temp table support, join supports) and the sanitized data source. The client's layered connection will use this information to populate its inner data source. In FIG. 20F, the client adds its local calculations. This happens entirely within data source and therefore there is no web traffic happening for this step.

Figure 20G:
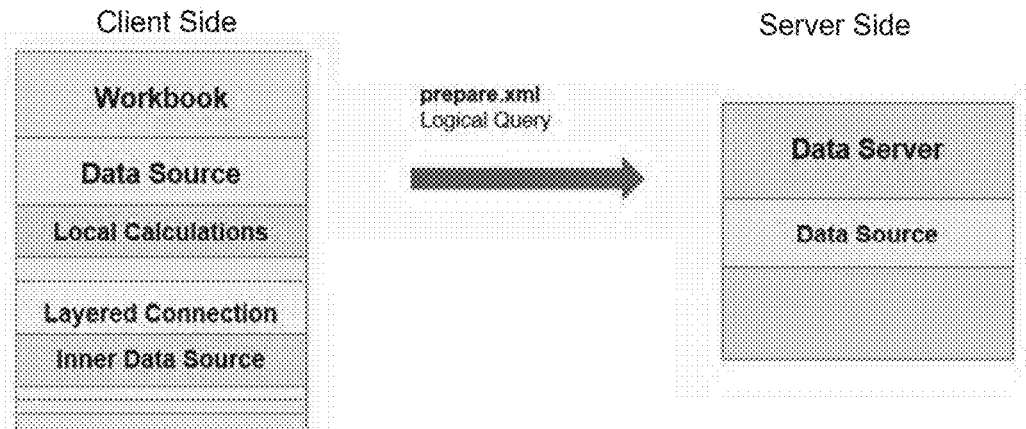

In FIG. 20G, the client will run through its semantic flow and send a Logical Query through the prepare.xml call. The client also sends some metadata alongside the query to help the query pipeline run the query. There is an executeQuery.xml path that streams results back (via some custom streaming logic) and has a slightly different query flow.

Figure 20H:
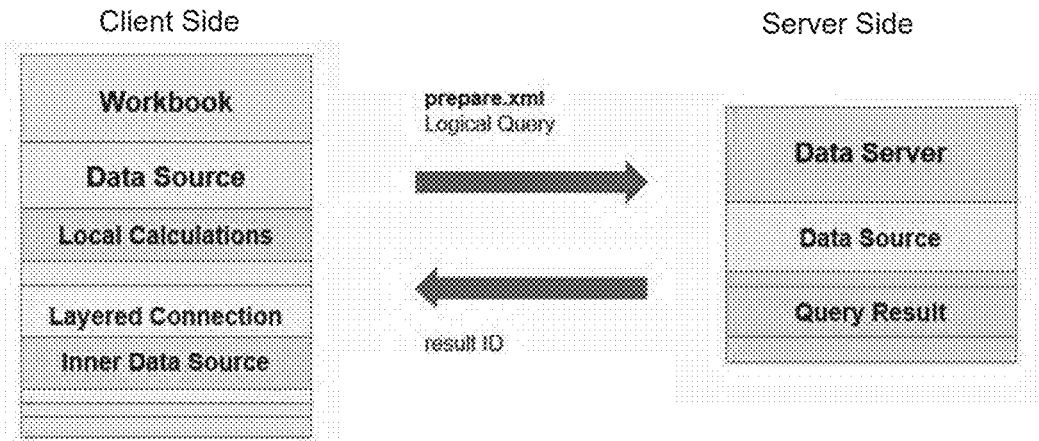

FIG. 20H illustrates that if the query succeeds, Data Server will send back a result ID for the client to fetch and store the query result in the meantime.

Figure 20I:
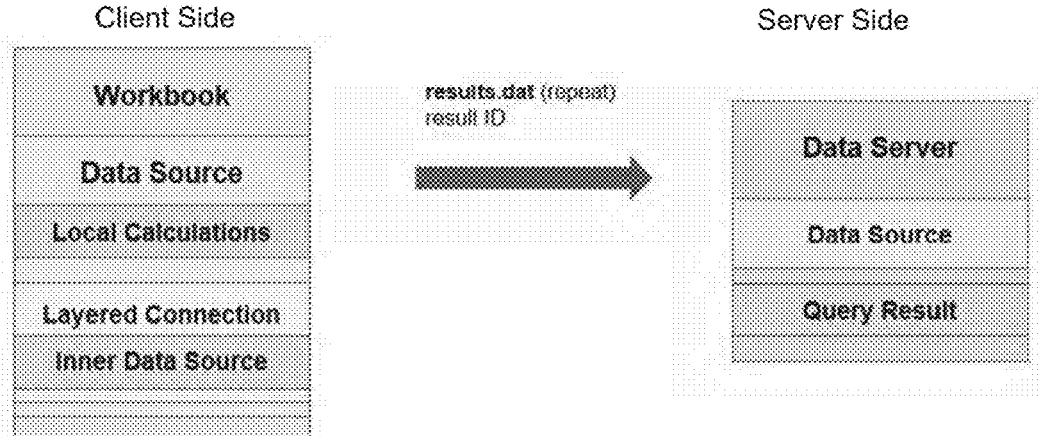
Figure 20J:
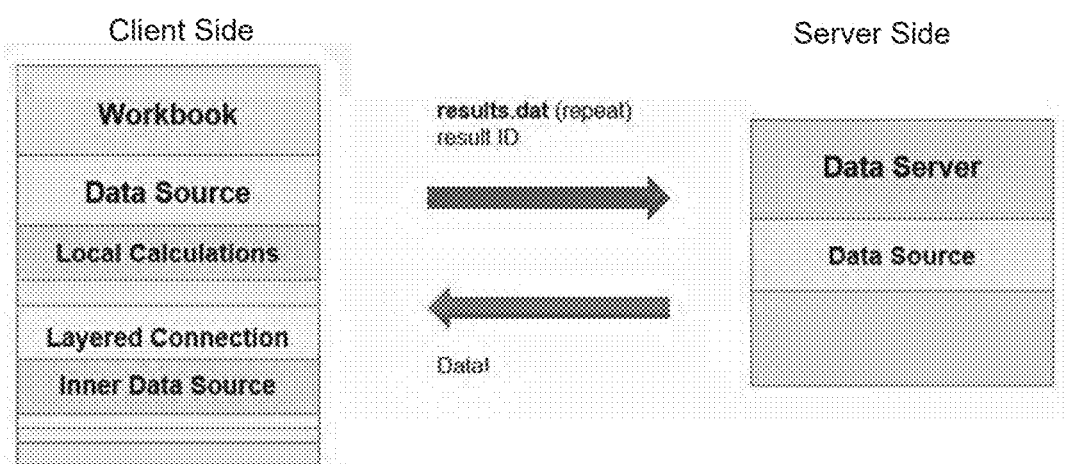

FIG. 20I shows that with results ID in hand, the client asks to get the data back from Data Server. In the non-streaming case, this can get pulled in through repeated calls. In FIG. 20J, Data Server sends the data back and clears out its query result.

As will be described in further detail later, some details will change for Viz Data Service 220. In some implementations, the overall pattern of: (i) creating sessions; (ii) reading metadata; and (iii) querying with local state in the case of Data Server 370 should hold for Viz Data Service 220.

Figure 21:
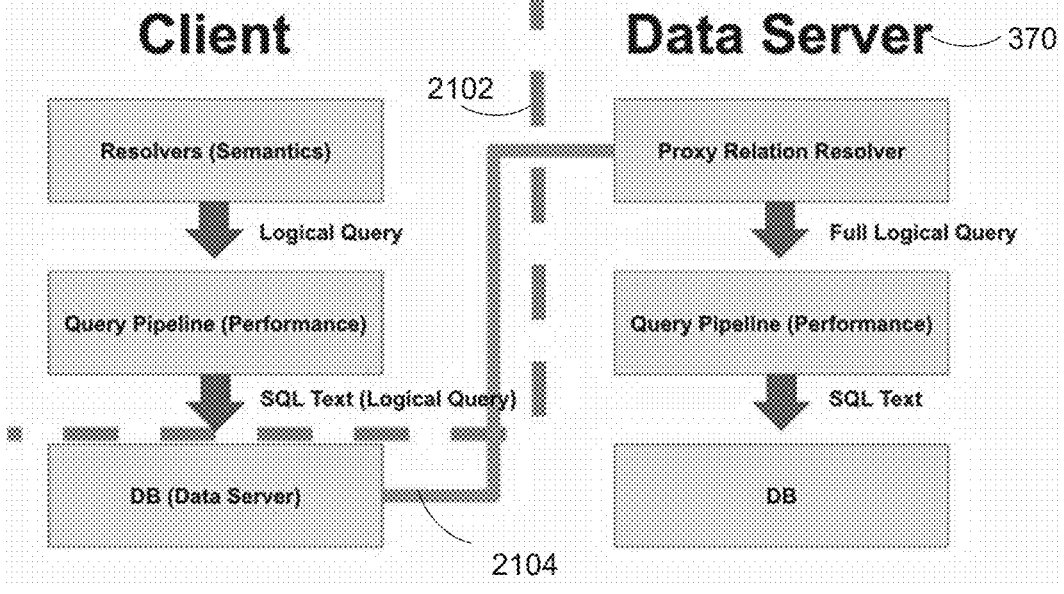
FIG. 21 illustrates query processing for a published data source, in accordance with some implementations.

FIG. 21 illustrates query processing for a published data source, in accordance with some implementations. In the published data source case, the client writes its Logical Query using its layered data source. The client logical query may include local state (e.g., client-only calculations compiled as expressions) and will reference opaque state that represent Data Server's zero-trust boundary 2102 (dashed lines) (e.g., the tables in the queries are black-box SQL Proxy tables instead of the underlying physical joins). The client's Query Pipeline performs the usual rewrites/optimizations with the caveat that the final SQL text sent to Data Server is still Logical Queries. The solid line 2104 represents abstract queries.

Data Server transforms the client's input query to incorporate published data source state through the Proxy Relation Resolver. This resolver performs operations such as applying data source filters and incorporating the underlying connection information. As the name "resolver" suggests, this component may perform semantic reasoning-such as running through Object Model code to ensure data source filters don't impact the granularity of the query result. Finally, Data Server passes this query to its local instance of the Query Pipeline.

Some major takeaways for this architecture are that the published data source flow runs through two instances of the Query Pipeline with semantics being applied in a piecemeal fashion. This query flow results in differences in query shape between published and embedded data sources-often with worse performance in the published case. Additionally, Data Server performs semantic reasoning on a query transformed by the client's Query Pipeline. As query rewrites may dramatically alter the shape of the input query, Data Server cannot necessarily recover the full original client intent.

Query Compilation Using Query Specification

Figure 22:
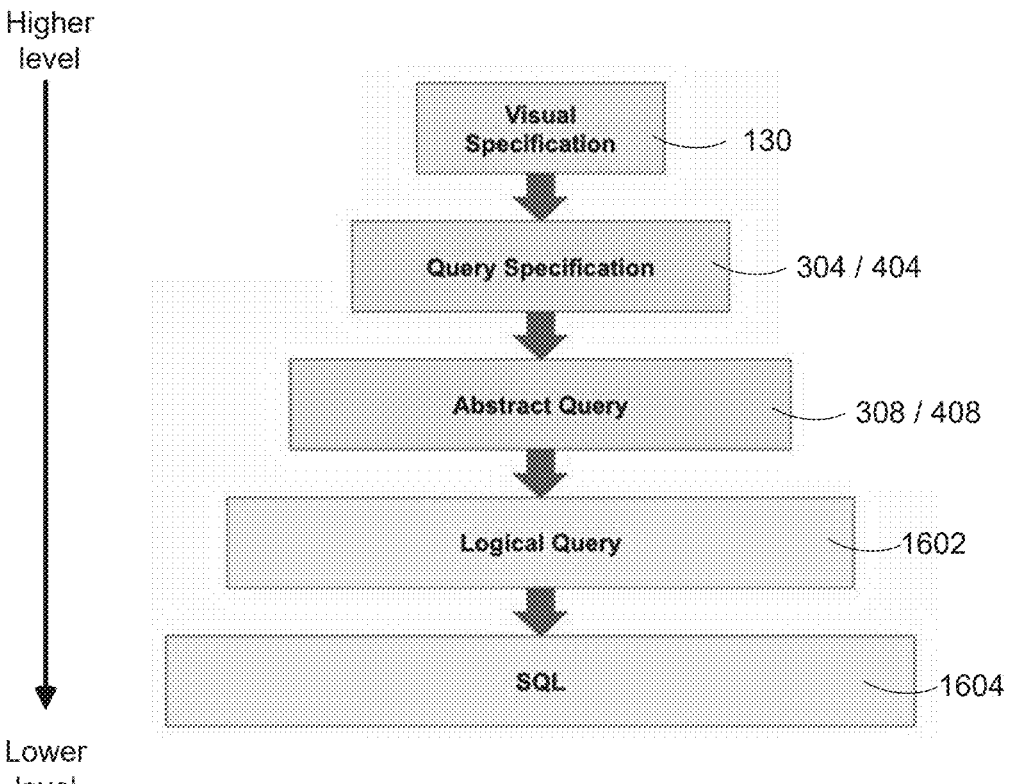
FIG. 22 illustrates a query specification layer for query compilation, in accordance with some implementations.

FIG. 22 illustrates a query specification layer for query compilation, in accordance with some implementations. According to some implementations of the present disclosure, to better encapsulate higher-level semantics, Query Specifications (e.g., query specifications 304 or query specifications 404) are being introduced as a new representation between the Visual Specification 130 and Abstract Queries 304/408. In particular, Query Specifications will be the interface language to the Interpreter/Resolver layers (the core of the semantics IP). Query Specifications 304/404 are designed to separate the concerns of fetching data from the visual layout and the visual specifications generated by interactions with Tableau GUI 100. The mapping layer between the Visual and Query Specifications is called the Query Specification Producer (e.g., query specification producer 302/402).

Query specifications are basically bags of fields (as composed to Logical Queries, which are closer to self-contained SQL trees). The client takes care that the data source knows what the field names are referring to. In some implementations, a query specification specifies:

Fields to query for (outputColumns);
    If and how to apply densification (densificationSettings);
    Query of reference line totals (referenceLineTotalsPro-
        jections);
    Table calculation settings (tableCalcSettings); and
    Filters (filterSpecification)

Figure 23:
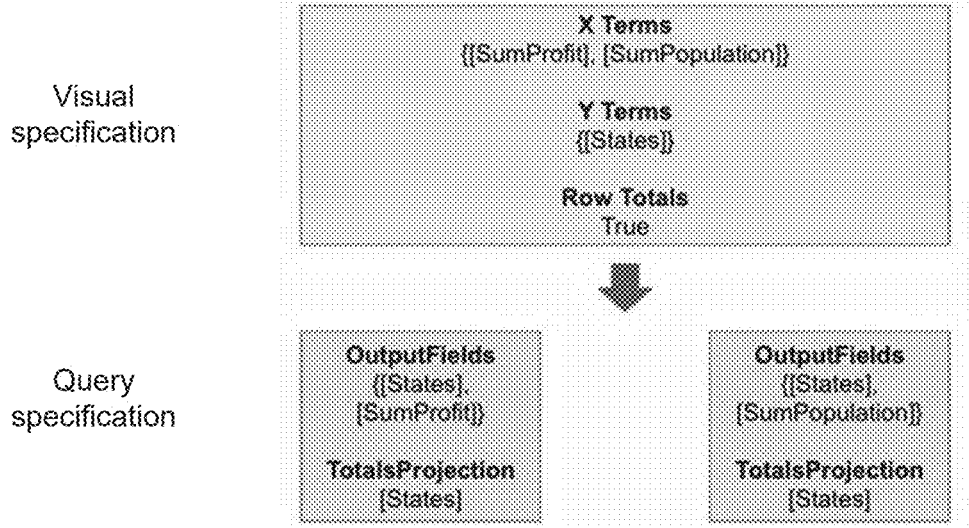
FIG. 23 illustrates differences between a visual specification and a query specification, in accordance with some implementations.

FIG. 23 illustrates differences between a visual specification and a query specification, in accordance with some implementations. The visual specification (top) contains concepts such as the X- and Y-axes and rows, while the query specification uses output fields and totals projections (roughly, the fields that that should be excluded to compute the totals). Query specifications are designed to be client-facing and will be the interface language to the VDS 220. In some implementations, the Viz Data API is the entry point to compiling queries that take query specifications. Within the monolith codebase, clients of the Query Pipeline will be migrated to consume the Viz Data API. One way of conceptualizing the VDS is a service-hosted version of the Viz Data API.

Querying Published Data Sources Using Query Specifications

Figure 24:
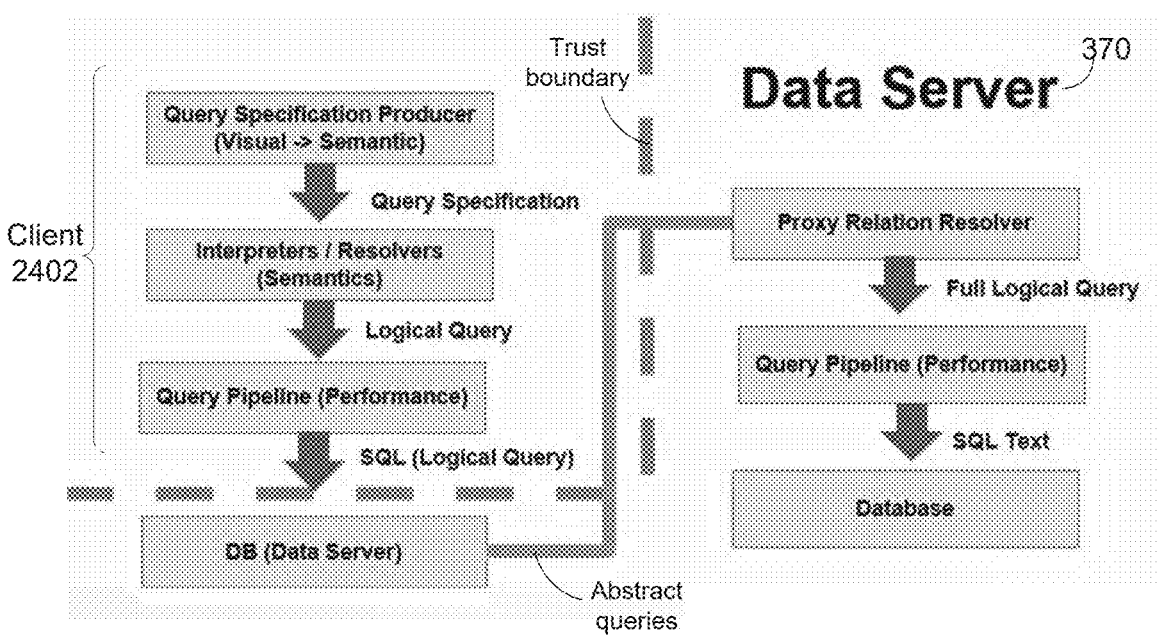
FIG. 24 illustrates a query flow for a published data source with Data Server, in accordance with some implementations.

FIG. 24 illustrates a query flow for a published data source with Data Server 370, in accordance with some implementations. The client 2402 sends its Logical Query (written using its understanding of the published data model) to its local Query Pipeline. Local state (e.g., calculations) get baked into the Logical Query during the semantics layer. The local query pipeline runs the usual rewrites/optimizations. The "native SQL" it sends to a database (DB) is actually sending the Logical Query to Data Server. Note that by the time the query is sent to Data Server, it is dealing in a relational language. Data Server 370 then incorporates its local/hidden state into the query. The component here is called the Proxy Relation Resolver, which operates on a node-by-node basis. Then, Data Server 370 sends this augmented query to its own version of the Query Pipeline. From the client's perspective, Data Server 370 is just part of the Query Pipeline. As with the usual Query Pipeline, the client 2402 encodes its full semantic intent in the query itself. No other data modeling knowledge is passed across this boundary. The architecture as is-requires two passes of the query rewrites/semantics.

With the implementation of query specifications, the most important change respect to the existing Data Server is the level of abstraction of the query representation. In the Data Server flow, the client uses Logical Queries (essentially, SQL) and runs the query pipeline twice (once on the client, and once on Data Server). There is semantic reasoning on both sides of the protocol line.

Figure 25:
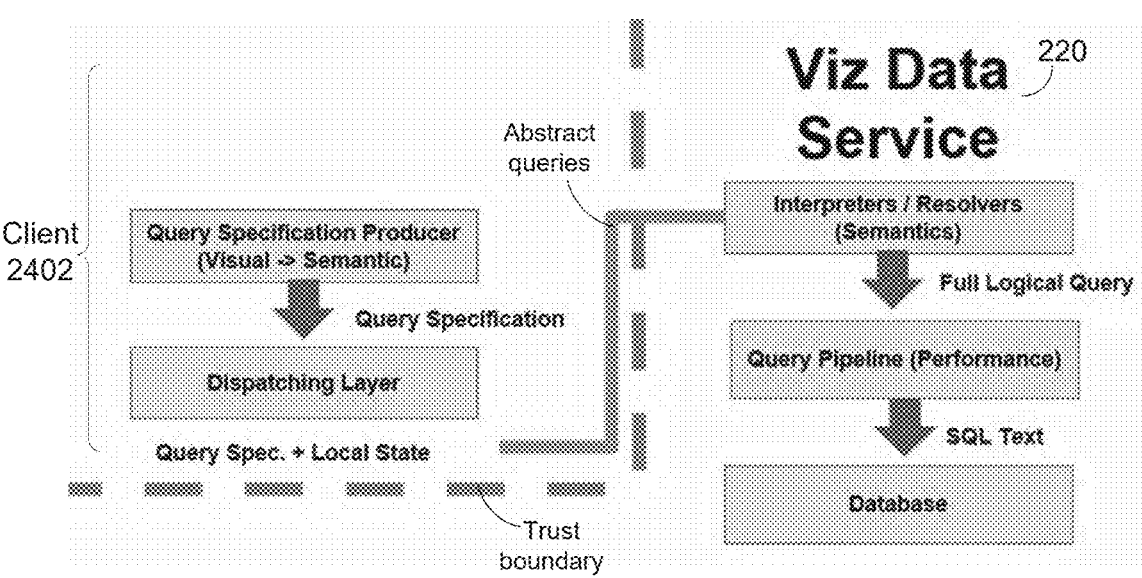
FIG. 25 illustrates a query flow for a published data source with Viz Data Service, in accordance with some implementations.

FIG. 25 illustrates a query flow for a published data source with Viz Data Service 220, in accordance with some implementations.

For the Viz Data Service 220, in some implementations, the client 2402 will largely be dispatching the query specification 304/404 to the Viz Data Service 220. The Viz Data Service 220 will take care of the semantics and running the query pipeline. In some implementations, a new layer (e.g., a function) packages and sends the query specification and relevant native state to the Viz Data Service. Recognizing local state is a bit trickier for Viz Data Service than in the Data Server case, in part due to the format of the query specification.

Figure 26:
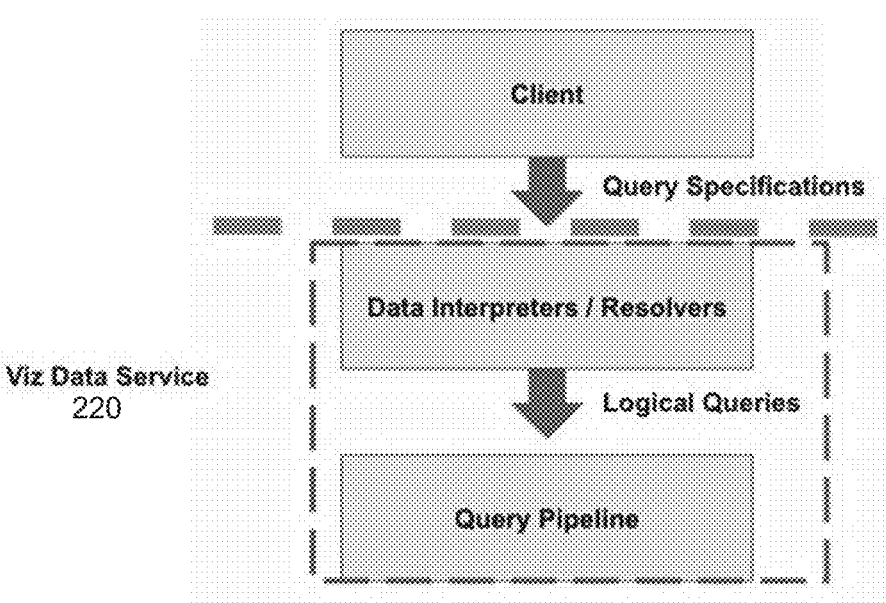
FIG. 26 illustrates querying published data sources with query specifications, in accordance with some implementations.

FIG. 26 illustrates querying published data sources with query specifications with Viz Data Service 220, in accordance with some implementations. Viz Data API clients will query published data sources using query specifications 304/404. Viz Data Service 220 will perform the semantic reasoning (e.g., interpreters/resolvers) in one place and will run the Query Pipeline once. To support clients with local state, the VDS interface will enable clients to specify state such as ad-hoc calculations which, in the Data Server implementation, are directly encoded into the Logical Query sent to Data Server.

From the customer perspective, transitioning clients from Data Server's interface to the VDS's query specification interface should be a functional no-op. However, pushing all the query semantic reasoning to the server will unlock new scenarios (by removing semantic information asymmetry) and reduce the query differences between embedded and published scenarios.

Client Data Modeling

A key design principle in the data modeling space is seamless version compatibility between Data Server aware and Viz Data Service aware clients/servers in both the live and extract case. In particular, a workbook pointing to a published data source should be queryable through both server solutions. This goal will be achieved through a few methods.

First, the metadata exposed for a published data source-including the sanitized inner data source-should be the same regardless of the service used to query the data source. As a result, the file format should remain consistent between clients of both Data Server 370 and the Viz Data Service 220.

Second, the Viz Data Service 220 and Data Server 370 should remain semantically isolated. The decision to connect to one service as opposed to the other should be driven completely by the client's reasoning about Tableau Server's capabilities. In particular, Tableau Server will expose a series of endpoints: the Data Server endpoints (as usual) and the new Viz Data Service endpoints. The two endpoints exist for backwards compatibility (for older Desktop clients) and for clients such as data prep, which treat Data Sources as flat tables.

If clients are aware of Viz Data Service 220, they will favor this endpoint. In the case of older Desktop clients, clients will connect to Data Server 370. The server-side components should not reason about the clients' knowledge of the various published data source services. For example, Data Server 370 should accept queries from authenticated clients that understand its protocol, even if they also understand Viz Data Service's protocol.

VDS Server Code

According to some implementations of the present disclosure, within the Tableau Server architecture, VDS 220 will be a new process that exists in a similar slot to Data Server and will reuse existing pieces. For example, VDS 220 will leverage existing keychain and other logic to retrieve the necessary state to instantiate a Data Source. Likewise, VDS 220 will reuse metadata sanitization logic to ensure that it enforces the same trust boundary (e.g., stripping out data source filters, physical connection details).

According to some implementations of the present disclosure, in terms of server side dependencies, the VDS will consume the TDS Service 518 instead of the Data Source Service to fetch the data source.

In some implementations, as with Data Server 370, VDS 220 will also expose a metadata API. The reason for a metadata API on this service (versus using the TDS Service) is that the VDS will have the instantiated data source in hand, which ensures the freshest metadata that incorporates the most up-to-date connection state.

Figure 27:
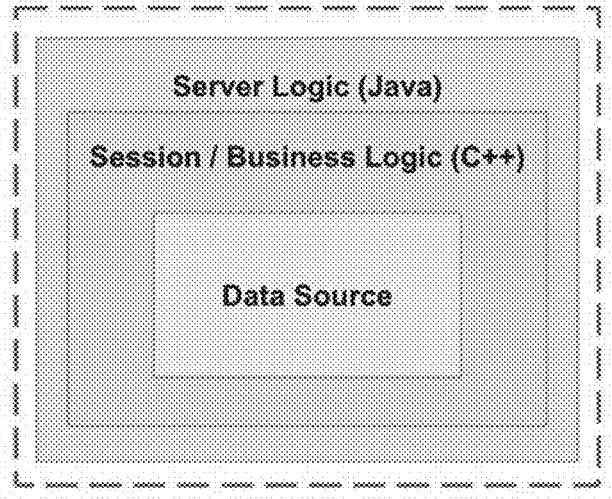
FIG. 27 illustrates the code shape of the Viz Data Server, in accordance with some implementations.

FIG. 27 illustrates the code shape of the Viz Data Server (e.g., data server 360 running VDS 220), in accordance with some implementations. In some implementations, the code shape of Viz Data Server is fairly similar to Data Server's server-side architecture. The outermost layer will be Java code, which plugs into the larger server ecosystem (e.g., keychain service) and performs tasks as authenticating users. Inside the Java code will be the C++ session management and business logic. The session management logic will largely be new code. The business logic itself will be a be a mix of new code (e.g., the query execution endpoint that takes Query Specifications) and extracted libraries (e.g., the metadata sanitization logic).

Figure 28:
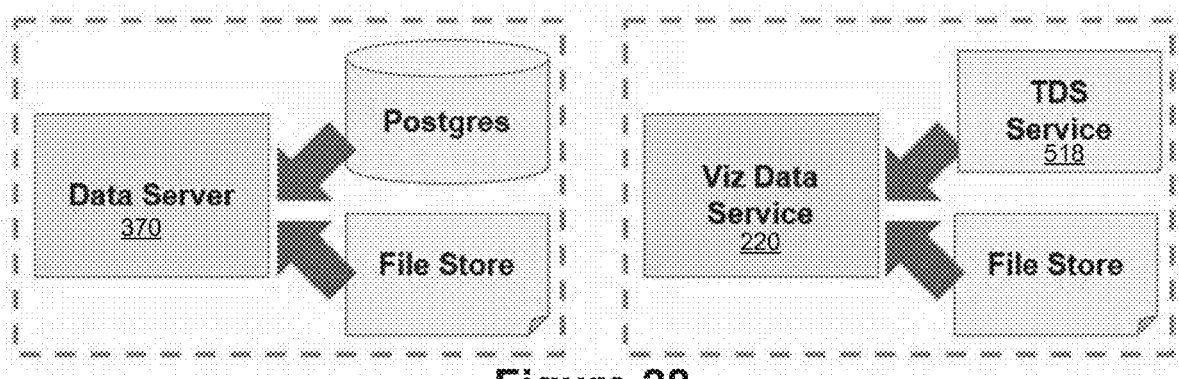
FIG. 28 illustrates accessing Tableau data server (TDS) files using Data Server and Viz Data Service, in accordance with some implementations.

FIG. 28 illustrates accessing Tableau data source service (TDS) files using Data Server 370 and Viz Data Service 220, in accordance with some implementations. When re-hydrating data sources, the Viz Data Service uses the TDS Service 518 to get TDS files instead of querying Postgres itself. To unblock implementations, the existing functionality can be used. That said, the proposed architecture is a big step forward in breaking off a notable direct call to Postgres in the server architecture.

Stateful vs. Stateless

In some implementations, the VDS is semantically stateless—it can re-compute all necessary states per request to successfully serve queries and read metadata.

In practice, parsing data sources and establishing connections can be slow. In some implementations, the VDS uses sticky sessions and preserves the following (largely immutable) state alive for the duration of a session:

Materialized data source objects

Query cache

In some implementations, this state (sticky session) is not strictly required for a successful query execution: the state can be re-computed for every request and still successfully serve queries, at the likely expense of performance.

In some implementations, this state (sticky session) is kept in memory for the first release, while delivering a design that keeps this state immutable and decoupled from the main service business logic, which will facilitate the move away from sticky sessions.

In some implementations, the state is stored into its own data store (e.g. Redis) or, depending on the performance impact, simply re-hydrate the state per request.

In some implementations, VDS is implemented (e.g., shipped) as its own independent process. In some implementations, VDS is hosted as a distinct set of interfaces on top of Data Server. Both approaches are technically feasible.

Figure 29:
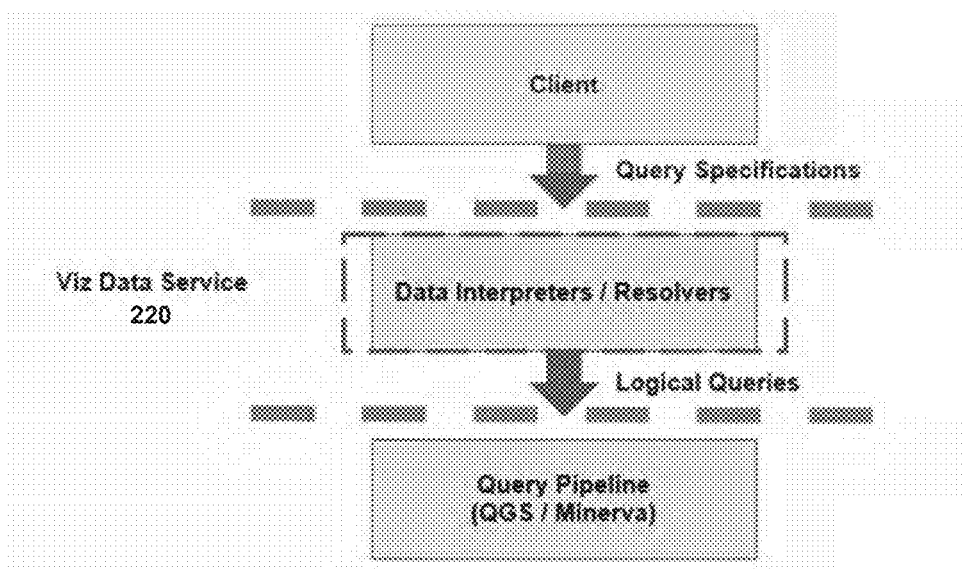
FIG. 29 illustrates the semantic layer (interpreters/resolvers) and the query pipeline in Viz Data Service, in accordance with some implementations.

FIG. 29 illustrates the semantic layer (interpreters/resolvers) and the query pipeline in Viz Data Service 220, in accordance with some implementations. In some implementations, Viz Data Service 220 comprises both the semantic layer (interpreters/resolvers) and the query pipeline. This is also illustrated in FIG. 5. In some implementations, the query pipeline is extracted out into its own service, thereby allowing Viz Data Service 220 to have its responsibilities scoped down to mapping query specifications to logical queries.

Although VDS 220 and Data Server 370 are means for querying published data sources, they are semantically different services. VDS enables clients to ask higher-level analytical questions about a published data source while Data Server's query interface enables the clients to query specific logical tables from a published data source.

Compared to the existing Data Server 370, VDS 220 introduces a new query interface on top of published data sources. In some implementations, VDS 220 has the same security requirements in terms of exposing metadata.

In some implementations, VDS adds new telemetry around key metrics including availability, latency and error codes.

Figure 30:
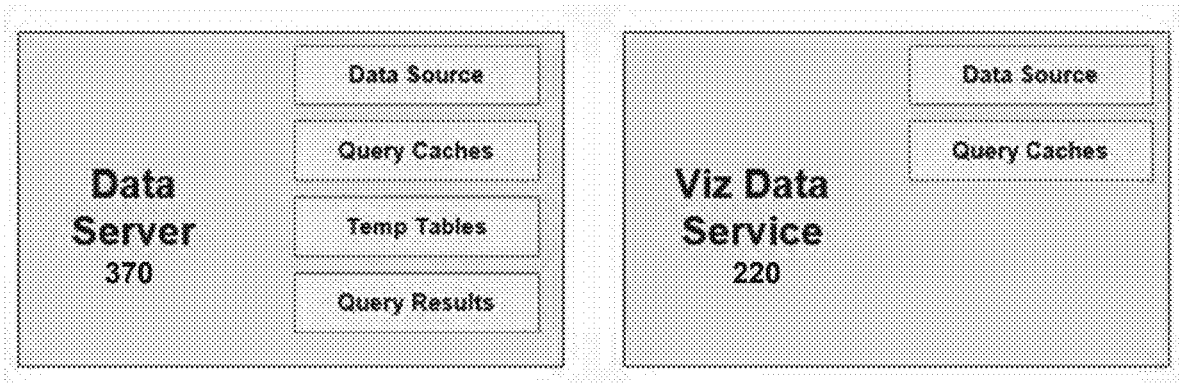
FIG. 30 compares state, streaming and sessions between Data Server and Viz Data Service, in accordance with some implementations.

FIG. 30 compares state, streaming and sessions between Data Server 370 and Viz Data Service 220, in accordance with some implementations. Data Server 370 sessions keep a parsed data source (because data sources are slow to parse) and a query cache (owned by its instance of the query pipeline). Since certain clients treat Data Server as a DB, there exists a temporary table insertion API (which must be managed). Additionally, its current query calling pattern (of prepare query+get results) means that the query results must be kept around as well. Viz Data Service 220 cuts down on this state in two ways. First, it exists at a higher level with respect to the query pipeline. As a result, it would not have a temporary table interface (it will manage temp tables with respect to its local query pipeline). Second, in some implementations, Viz Data Service 220 uses a streaming approach to have the query processing/result paging done in a single call (and thus, there is no need to keep the results around throughout the session).

Overall, Viz Data Service 220 uses some of the Data Server business logic. The majority (if not all) of Data Server's specially-created session management is not used in Viz Data Service. It's also worth taking a step back to talk about "state." Longer-term, we do want to pull out state as much as possible. That said, certain state (let's call it semantic state) is worse to lose than other state. For example, VizQL Server going down means that the client may lose some of the context of an edit. Viz Data Service going down means that a client's query may get rerouted to another server instance. That could require re-parsing a data source, which could be slower but would yield the same results.

In some implementations, VizData GRPC API and Connector API uses abstract query instead of query specification.

In the case of Tableau Live, when more users connect to Tableau Live, VDS Service or Data Server will automatically scale the backend to handle more users and/or more requests. In some implementations, scaling occurs by adding hyper virtual machines, where each hyper virtual machine is a separate machine that runs VDS Service or Data Server.

Viz Data Service Versus Data Server Compatibility

According to design principles disclosed herein, published data sources are not tied to specific services. A client may use either Viz Data Service 220 or Data Server 370 to ask questions but that is up to the client and is not inherently tied to the data source.

In some instances, Data Server 370 may not support specific features such as shared dimensions (SD). But a client should still be able to communicate with Data Server post-SD for data sources whose features are supported by Data Server 370. And, if a client tries to talk to a SD published data source through Data Server, we should get a graceful exception (a la pre-OM client talking to multi-object object model).

As disclosed, file format changes should not impact interoperability.

As disclosed, Viz Data Service and Data Server do not reason about each other. These are independent services and both of them happen to service published data source queries. Viz Data Service and Data Server do not communicate with each other or point a client to use the other service.

As disclosed, within a flow, a client talks to a single service (e.g., either Data Server Service or Viz Data Service). The client does not mix and match the services it is talking to within the context of a session to avoid unnecessarily coupling.

Figure 31:
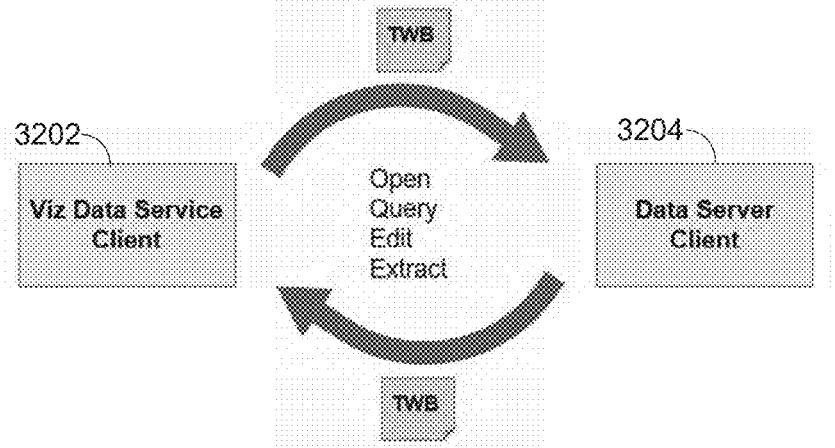
FIG. 31 illustrates full compatibility of between a client running Viz Data Service and a client running Data Server, in accordance with some implementations.

FIG. 31 illustrates full compatibility of between a client 3202 running Viz Data Service and a client 3204 running Data Server, in accordance with some implementations. As disclosed, in some implementations, a Tableau workbook (TWB) referencing a published data source can be queried, edited, or extracted by a Viz Data Service client 3202 and the TWB is also fully usable by a Data Server client 3202. In some implementations, a TWB referencing a published data source can be queried, edited, or extracted by a Data Server Service client and the TWB is also fully usable by a Viz Data Service client. This switch can happen an arbitrary number of times.

In some implementations, the interchangeability across services occurs around the outer layer of a client workbook and the layered data source. There is also compatibility between client/server with respect to the inner data source (the server's metadata version of the data source). Compatibility between client/server with respect to the inner data source part of both server protocols.

Figure 32:
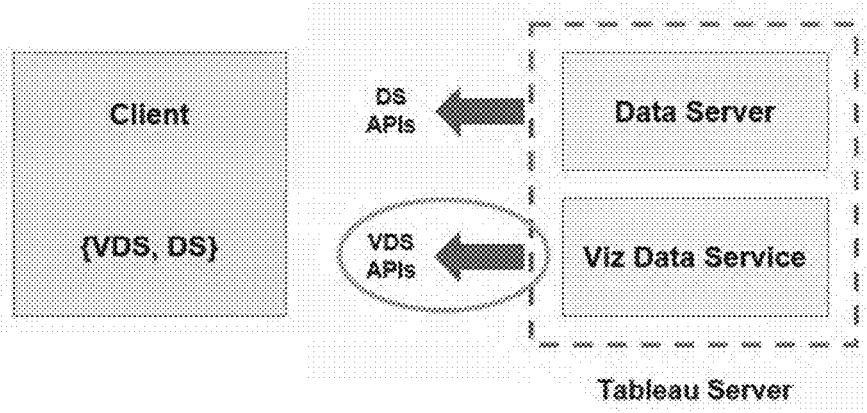
FIG. 32 illustrates a client with protocols to connect to both VDS and Data Server Service, in accordance with some implementations.

In some implementations, if the client has the protocols to connect to both VDS and Data Server Service, and the server architecture includes both VDS 220 and Data Server 370, the client will be bias toward VDS 220. This is illustrated in FIG. 32.

In some implementations, if the client has the relevant protocols to connect to both VDS 220 and Data Server 370, but only Data Server 370 is available, then the client will connect to Data Server 370.

In some implementations, if the client has the protocols for just Data Server 370, the client connects to Data Server 370 as usual.

In some implementations, the decision whether to use the Viz Data Service 220 or Data Server 370 is driven based on the capabilities of the server/service.

Figure 33:
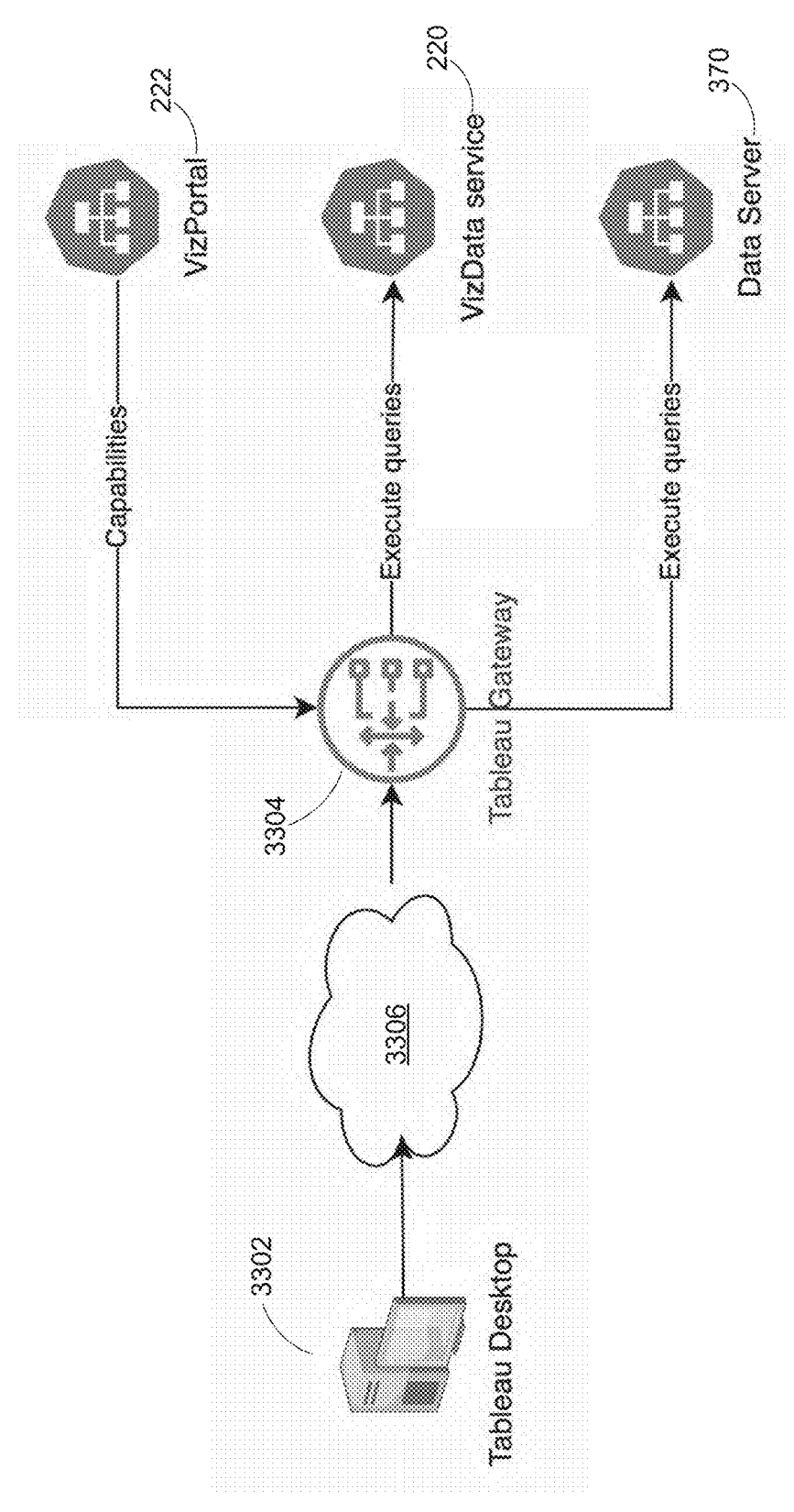
FIG. 33 illustrates a smart switching process, in accordance with some implementations.

FIG. 33 illustrates a smart switching process 3300, in accordance with some implementations. The smart switching process 3300 is performed at a client device 3302 running Tableau desktop. The client device 3302 that is communicatively connected to gateway 3304 via network 3306. In some implementations, the gateway 3304 is a gateway for all of Tableau services. The client device 3302 is fully compatible with VDS 220 and Data Server 370 (e.g., is backward compatible with the older Data Server 370). In some implementations, the client 3302 receives a request to generate a data visualization according to a data source that is published via Viz Portal 222. In response to receiving the request, the client 3302 determines one or more requirements for generating the data visualization.

The client 3302 discovers, negotiates, and selects the type of query that it will send to the server. For example, in some implementations, the client 3302 communicates with Viz Portal 222 (via gateway 3304) to obtain the capabilities of each server/service that is available on the backend. The client determines 3302, based on the capabilities, whether the backend supports VDS 220, Data Server 370, or other features that are not available on the client 3302. Based on the received capabilities, the client 3302 selects a service that has the capabilities to support the requirements for generating the data visualization, and queries the respective server. Capabilities that are supported by VDS 220 but not Data Server 370 include shared dimensions, sharable semantics, and user attribute functions.

Figure 34:
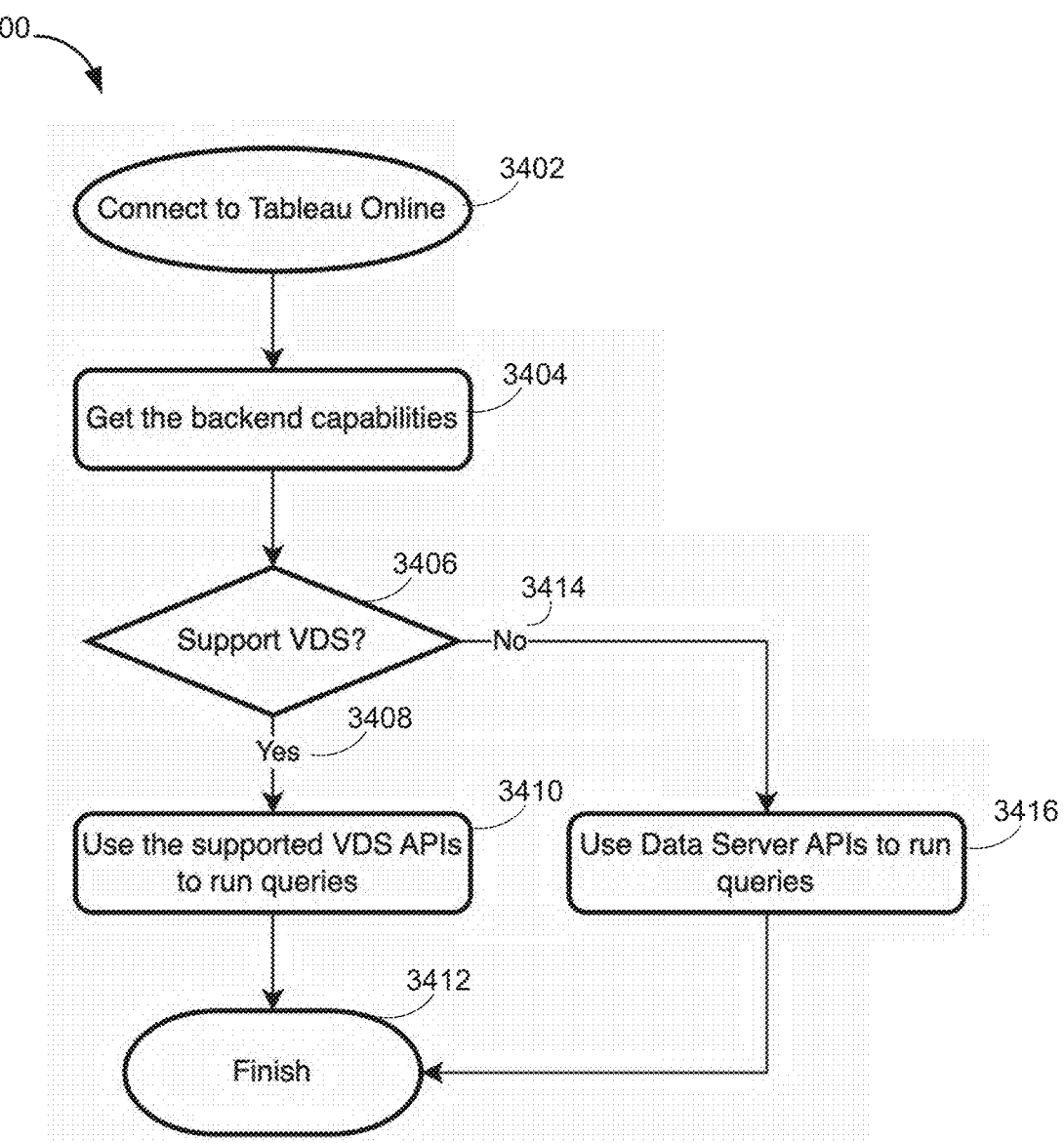
FIG. 34 illustrates a smart switching process, in accordance with some implementations.

FIG. 34 illustrates a workflow 3400 for smart switching that is performed by a client device running Tableau browser (e.g., client 202), in accordance with some implementations. The client device connects (3402) to Tableau online and obtains (3404) the backend capabilities. The client determines, according to the backend capabilities, whether the backend supports VDS (step 3406). If the backend supports VDS (step 3408), the client uses (3410) the supported VDS APIs to run queries. For example, the client can convert the visual specification to a query specification or one or more abstract queries, and sends the queries (e.g., in a serialized format) to VDS 220, which then deserializes the information from the query specification and combines this information with additional user functions, used for applying row-level security (RLS). VDS 220 then federates this query to external databases to retrieve data, which is returned to the client 2602. If the backend does not support VDS (step 3414), the client uses (3416) Data Server APIs to run queries. For example, if the remote server is a Data Server 370, the client would pre-compile its queries and send the pre-compile queries to Data Server 370.

Table 2 below compares the smart switching capabilities for an older version client and a newer version client, for Data Server 370 and VDS 220, in accordance with some implementations.

TABLE 2

| Smart Switching Capabilities | | |
| --- | --- | --- |
| | Data Server 370 | Viz Data Service 220 |
| Old client (e.g., running older version of Tableau) | Just connect Don't ask about server capability No smart switching capability | Just connect Don't ask about server capability No smart switching capability |
| New client (Compatible with both Data Server and VDS) | Ask about server capabilities Connect to Data Server if (i) Data Server is available and VDS is not available, or (ii) if queries are supported by Data Server capabilities Has smart switching capability | Ask about server capabilities Biased toward VDS 220 if both VDS 220 and Data Server 370 are available Has smart switching capability |

VizQL Data Service—Open API for Public Access to the Tableau Query Service

Customers have complex data ecosystems where there are many data producers (e.g., different databases and data streams) and many data consumers (e.g., BI tools, data apps, AI/ML batch processors). Every data consumer needs to identify, connect, and query against every data producer, combine the data, and then calculate the collective results. However, different consumers would need to repeat this same process and there isn't a single unified endpoint whereby consumers can reliably connect to and query for semantically correct and analytically useful insights to enable organizations to make data-driven/informed decisions.

Some implementations of the present disclosure are directed to an open API that enables client devices with programmatic interfaces (i.e., that are not running Tableau desktop or Tableau applications) to access the Tableau server architecture. In some implementations, the open API for public access is a new layer (e.g., a headless BI Service 210) on top of VDS 220. In some implementations, VDS 220 is limited for internal Tableau services to request for data. The open API to VDS 220 (via Headless BI Service 210) is a new REST endpoint to enable programmatic access by any tool that can authenticate, identify the Tableau Published Data Source (PDS), and specify simple JSON queries. This new endpoint translates the simple JSON queries using the PDS to provide sufficient context into VizQL where VDS can process, compile, federate queries, and return result from different data providers to the REST endpoint that any data consumers would get semantically correct and analytically useful results.

Some features of the present disclosure include: (i) REST endpoints that require authentication and association with an existing Tableau published data source; (ii) simple queries for a table of data are contextualized with metadata from published data sources to translate into VizQL that VDS can process; and (iii) analytic results from VDS is return as JSON objects that any programmatic tools can ingest.

As described above, VDS 220 offers a way to query data sources. In some implementations, at a high level, VDS 220 includes APIs to query published data sources, such as published data source 1 230-1 and published data source N 230-N, via VDS query 226, as illustrated in FIG. 2. A published data source is a data source that is published to the Tableau server. In some implementations, a published data source comprises a collection of metadata. For example, a public data source can include information about tables that contain the actual data, information about credentials required to access the tables or data, and information about data models defining the relationships between fields located in different tables.

Currently, VDS 220 is only accessible or usable by client devices executing applications with a Tableau user interface (currently Tableau Desktop, Web Authoring, and backgrounder). For example, FIG. 2 illustrates that the client device 202 executing Tableau browser can access the Internal VDS 220 via Tableau Viz Portal 222 (e.g., a Tableau server), whereas the client device 204 executing Tableau desktop has an end-to-end secured stream (trusted connections) built in with the internal VDS 220 For these devices, Internal VDS 220 takes inputs from the Tableau user interface (e.g., GUI 100) and compiles the SQL-like queries that satisfy this intent. It then returns data from the query in the form of data visualizations.

Currently, internal VDS is not accessible or usable by clients such as client device 206, which has a programmatic interface 208 and does not execute an application with a Tableau user interface.

Historically, the Tableau user interface, such as GUI 100, has been the only way that a user can query published data sources. The entire query pipeline, from the user dragging and dropping a pill in the Tableau GUI 100 all the way down to the SQL query that it turned into was one streamlined process. However, this meant that the visual way that Tableau represents a query (e.g., axes, marks, things that are only relevant for the Tableau application itself) was conflated with the semantic information (e.g., totals, raw numbers, etc.).

When VDS 220 was created, it added another entry point as an attempt to separate out UI things from data things. But given this history of the query being formed by the visual representation of everything the user was intending, instead of just the numbers, the VDS query objects tend to be large, unwieldy, and may not make any sense by themselves. In fact, the query interface was never intended to be interpreted by humans, and was designed as such.

Though a user can inspect a query object coming into VDS formed by Tableau GUI 100, depending on the circumstances of the way the query was formed, two queries that yield the same result can look drastically different. There may also be leftover fields and vestiges of UI things in the queries that are no longer in use. Furthermore, some queries expect certain fields to be filled out even though they are meaningless in the data context.

As disclosed, headless BI is the solution to these large, complicated queries. It is another API that sits on top of VDS that accepts human readable queries and turns them into the complicated, unwieldy VDS queries that actually run on published data sources.

When the headless BI service 210 translates a headless BI query to a VDS query, it (1) removes unnecessary fields from the VDS query object, so the user does not have to worry about them; (2) fills in fields that are irrelevant outside of the context of the Tableau UI; and (3) fills out the necessary fields to return the correct data from the published data sources.

The Same Query—Four Ways

This section uses an example to illustrate the way a query is distilled down. In this example, the query represented in four different ways: (i) Tableau UI, (ii) the VDS Query generated from the Tableau UI; (iii) the headless BI query; and (iv) the VDS query generated from the Headless BI query.

Figure 35:
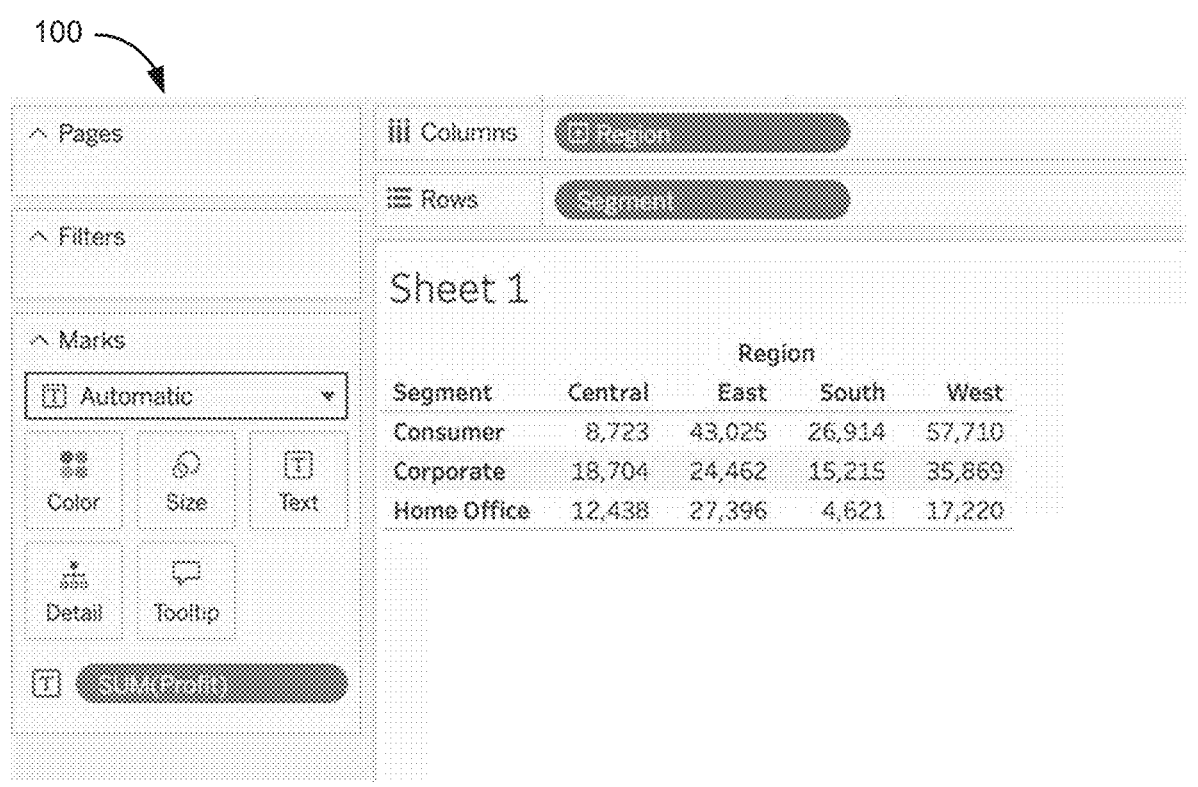
FIG. 35 illustrates a query that is represented in a Tableau user interface, in accordance with some implementations.

FIG. 35 illustrates a query that is represented in a GUI 100. This query is for sum of profits by segment (Consumer, Corporate, and Home Office), broken down into regions. To construct this query, the "Region" pill is placed onto the column shelf, the "Segment" region is placed on rows shelf, and the aggregation function SUM (Profit) is specified. the user interface returns a data visualization (e.g., a data table) that shows sum of profit for each segment, by region.

FIGS. 36A to 36D collectively show a VDS query object generated by the Tableau UI to return the same data as shown in FIG. 35, in accordance with some implementations. As illustrated in these figures, the VDS query object is largely unreadable by humans. There is a lot of extra jargon that is either unnecessary or irrelevant.

FIG. 37 illustrates a headless BI query generated by a client device (e.g., client 206), that will generate the same data as the Tableau UI query in FIG. 35, in accordance with some implementations.

FIGS. 38A and 38B collectively illustrate a VDS query (e.g., a query specification) that is generated by the headless BI service 210, which will also return the same data as shown in FIG. 35, in accordance with some implementations.

FIGS. 39A and 39B show the output of the data as queried by the Headless BI service 210, in accordance with some implementations. It is the same as the same data returned from the GUI 100 in FIG. 35, except that it is in human-readable form or in array form (i.e., not as a data visualization).

Translation Process

As discussed in FIG. 4, in some implementations, the headless BI service 210 translates API calls from client device 206 into query specifications and/or abstract queries, which are then converted into a serialized format (e.g., as a protobuf file) to send to the VDS 220. A protobuf is a binary query between services (in this case, between the headless BI service 210 and the VDS 220). Protobuf comprises a protocol for how to communicate between processes that are linked to the services. At a high level, the translation process includes the following steps:

1. Construct each data field. For each column (data field or field) that the Headless BI service 210 receives from client 206, the Headless BI service 210 constructs the appropriate Tableau query field. The query field depends on whether the data field that is specified in the query is a dimension, a measure, or a custom calculation. If the data field is a measure field, the aggregation type and the data type also influences the query field that is constructed.

2. Construct each filter field. This is similar to above, but instead it applies to all fields that will be filtered on.

3. Construct each filter specification. This process depends on the filter type. Each type of filter has its own idiosyncrasies. The filter types can include quantitative filters, set filters, relative date filters, and top N filters.

4. Construct a data model. This includes (i) adding the data source name, (ii) adding the filter specifications, and (iii) adding the fields to query.

5. Construct the query specification object. This includes (i) adding all the constructed fields, constructed filters (and their specifications), and the data model to the query specification object, and (ii) setting aggregation objects.

The Viz Data Service Query

FIGS. 40A to 40E collectively illustrate a portion of a VDS query protobuf file, in accordance with some implementations. It defines and describes the inputs to a VDS query specification. The VDS query specification can be thought of as the "class level" definition of what a query is. The lines that are marked with an asterisk (*) are the fields that are used for the Headless BI service. In some implementations, the VDS query protobuf file includes many layers of smaller, nested objects.

Figure 40E:

For example, FIG. 40A shows that the top level object is "QuerySpecificationWithDataModel." FIGS. 40B and 40C illustrate the DataModel object, which represents the data source object to query. It is passed in as part of the QuerySpecificationsWithDataModel with what Headless BI uses. FIGS. 40D and 40E illustrate the Filter object, which represents the filter to apply to the query.

Output Formatting

In some implementations, in addition to constructing the query specifications, Headless BI also formats (e.g., configures) the results returned by VDS 220 before sending them back to the client device 206 (via "Return processed results" 232" in FIG. 2).

In some implementations, the formatting can include:

Sorting: In some implementations, Headless BI allows users to specify in their query a sortPriority for each field. It will then sort based on that priority in the output.

Decimal places for numbers: In some implementations, Headless BI allows users to add maxDecimalPlaces to fields that will come out as numbers. VDS returns numbers with more precision than necessary, and Headless BI will crop it based on the decimal places specified by a user.

Simplifying field names. When the fields come back with their values from VDS, they have extra formatting for their internal names to that data source. This formatting will look different depending on how the field is being used internally. In some implementations, Headless BI removes that extra formatting. For example, "sum: Profit:qk", denoting Sum and Quantitative, becomes just "Profit". As another example, when the Internal VDS 220 returns date (or date/time) values, these values are specified in a proprietary internal Tableau format. The Headless BI service converts the values into the standard ISO 8601 date format before returning the data to the client device.

Array versus object output styles. A user can specify whether they want to output their data in OBJECT style, which is a nice human readable format, or ARRAY style, which is more simplified for development. FIG. 41 illustrates output data in object style, in accordance with some implementations. The object style enables a user to investigate their data, as it has field names included and uses JSON. FIG. 42 illustrates output data in array style, in accordance with some implementations. In the array style, there are no field names, just text and/or numbers only. The array style makes it easy to process data quickly via code.

The Headless BI Query—Query Components

The Headless BI query is a JSON object. It includes three fundamental components:

1. columns [required]—an array of columns that define the desired output of the query;

2. filters [optional]—an array of filters to apply to the query. They can include fields that are not in the columns array;

3. Options [optional]—metadata that can be used to adjust the behavior of the query. As of now, this is just whether the return format is OBJECTS or ARRAYS (objects is human readable, arrays is more compact). If it is not provided, the default value is OBJECTS.

FIG. 43 is an example query that queries the following columns (data fields): Order Date, Sum (SALES), and Ship Mode. It filters for only "First Class" ship mode values, and filters for only sales between $10 and $60. It specifies that the output should be returned in arrays.

Headless BI Documentation

This section describes how to use the headless BI interface and how to construct queries.

How to Construct a Column. A column can be constructed in one of three ways:

1. A Column from the Data Source. Use just columnName to reference a column directly from the data source:

```
{
    "columnName": "Category",
}
```

2. An aggregated Column from the Data Source. Use the column sub object and include the columnName and function to specify an aggregated column.

```
{
    "column": {
        "columnName": "Sales",
        "function": "SUM"
    }
}
```

3. A calculation

```
{
    "column": {
    "columnName": "Profit Margin"
        "calculation": "SUM([Profit])/SUM([Sales])"
    }
}
```

Columns. The following is a list of things that can be added to a column object:

columnName [required]. The name of the column which must be supplied. Either a reference to a specific column in the data source, or in the case of a calculation a user supplied name for the calculation.

columnAlias—An alternate name to give the column. Will only be used in Object format output.

function—Provide a Function for a Measure to generate an aggregation against that Column's values. For example, providing the SUM Function will cause an aggregated SUM to be calculated for that Column. A Column cannot contain both a Function and a Calculation.

calculation—Provide a Calculation to generate a new data Column based on that Calculation. The Calculation should contain a string based on the Tableau Calculated Field Syntax. Since this is a newly generated Column, you must give it its own unique Column Name. A Column cannot contain both a Function, and a Calculation.

maxDecimalPlaces—The maximum number of decimal places. Any trailing 0s will be dropped. The maxDecimalPlaces value must be greater or equal to 0.

sortDirection—The direction of the sort, either ascending or descending.

sortPriority—To enable sorting on a specific Column, provide a sortPriority for that Column, and that Column will be sorted. The sortPriority provides a ranking of how to sort Columns when multiple Columns are being sorted. The highest priority (lowest number) Column is sorted first. If only one Column is being sorted, then any value may be used for sortPriority. SortPriority should be an integer greater than 0.

Filters. A filter includes the following fields: (1) a Column; (2) a Filter Type, and (3) depending on the filter type, one or more requirements.

Specifying the Column to Filter on. A Filter always references a column of data (e.g., a single column) to filter on.

Filter Types. Filter types can include quantitative filter, set filter, relative date filter, and Top N filter.

A query can include one or more filters. For each filter, the filterType has to be specified. The filter types can include Quantitative, Set, Date, or Top.

The quantitative filter type is used for measures or dates. The quantitative filter type can be used to specify a minimum (MIN) value, a maximum (MAX) value, a range of values (RANGE), or a "special" type (SPECIAL). Some rules for this type of filter based on quantitativeFilterType include:

MIN: The "min" value must be set.

MAX: The "max" value must be set.

RANGE: Both the "min" and "max" values must be set.

SPECIAL: You must set a field for quantitativeFilterIncludedValues "'ALL", "NON_NULL", "NULL", "IN_RANGE", "IN_RANGE_OR_NULL", "NONE"

There are two different ways in which Quantitative Filters can be used:

For measures, use the "min" and "max" values to specify a MIN, MAX, or RANGE quantitative filter. These values are raw integers. For example, the following filter is of type RANGE and specifies a min and max number:

```
{
    "column": {
        "columnName": "Sales",
        "function": "SUM"
    },
    "filterType": "QUANTITATIVE",
    "quantitativeFilterType": "RANGE",
    "min": 266839,
    "max": 1149562
}
```

For Dates, use the "minDate" and "maxDate" values to specify a MIN, MAX, or RANGE quantitative filter. These values are Date objects, for which you need to specify a "day", "month", and "year". For example, the following filter is of type MIN and uses the date object type:

```
{
    "columnName": "Order Date",
    "filterType": "QUANTITATIVE",
    "quantitativeFilterType": "MIN",
    "minDate": {
        "day": 1,
```

-continued

```
            "month": 1,
            "year": 2022
        }
    }
}
```

The Set filter type is used for dimensions or dates. It can be used to either include or exclude certain values. A user must set the boolean exclude and provide a list of values to either exclude (when exclude=true) or include (when exclude=false).

The Relative Date filter type is used for setting a range of dates relative to an anchor. A user can set the anchor by passing in an object that has the numeric day (DD), the numeric month (MM), and the numeric year (YYYY). If the anchor is set to "No", today's date will be used by default. Additionally, the variables periodType, firstPeriod and lastPeriod will need to be specified. These are integers that specify the range. periodType can be one of the following values: "DAY", "WEEK", "MONTH", "QUARTER", "YEAR". firstPeriod is an integer, negative or positive, that specifies how many units of "periodType" the user would like to start AWAY from the anchor. Use 0 to start from the anchor. For example:

if your periodType is "DAY", your anchor is today, and your firstPeriod is −1, that means your lower limit is yesterday.

if your periodType is "YEAR", your anchor is Mar. 15, 2023, and your firstPeriod is −2, that means your lower limit is 2022.

if your periodType is "WEEK", your anchor is today, and your firstPeriod is 0, that means your lower limit is this week Generally, firstPeriod is probably negative and lastPeriod is probably positive, but one does not have to follow that convention. However, firstPeriod must be less than lastPeriod, or you will get 0 results.

```
    {
        "filterType": "DATE" ,
        "columnName": "Order Date",
        "periodType": "DAY",
        "firstPeriod": 0, // Start from 1/1/2021
        "lastPeriod": 5, // End at 1/5/2021
        "anchor": {
            "day": 1,
            "month": 1,
            "year": 2021
        }
    }
```

A top N filter, or filterType: "TOP" allows a user to find the top or bottom N results of a given category. The following inputs need to be specified:

column or columnName: The same as other queries, this is the column on which you want to filter.

fieldToMeasure: this is a filter column on which you are finding the top or bottom results of. See above section Specifying the Column to filter on direction: either "TOP" or "BOTTOM" to show the highest or lowest results howMany: an integer, how many results to return This is an example top N Filter to show the top 10 states by Sales:

```
    {
        "columnName": "State/Province",
        "filterType": "TOP",
        "howMany": 10,
        "fieldToMeasure": {
            "columnName": "Profit",
            "function": "SUM"
        },
        "direction": "TOP"
    }
```

FIGS. 44A to 44O collectively illustrate the interface of Headless BI service, in accordance with some implementations. Similar to the VDS Query protobuf definition, it is the source of truth for what Headless BI accepts.

Flowcharts

FIGS. 45A to 45C provide a flowchart of an example process for selecting data services, in accordance with some implementations. The method 4500 is performed at a client device (e.g., client device 3302, client device 202, or client device 204, or a computing device 600) having a display (e.g., display 608), one or more processors (e.g., CPU(s) 602), and memory (e.g., memory 614). In some implementations, the memory stores one or more programs configured for execution by the one or more processors. In some implementations, the operations shown in FIGS. 1, 2, 3, 4, 5, 11, 12, 13, 14A, 14B, 15, 16, 17, 18A-18C, 19, 20A-20J, 21, 22, 23, 24, 25, 26, 27, 28, 29, 30, 31. 32, 33, 34, 35, 36A-36D, 37, 38A, 38B, 39A, 39B, 40A-40E, 41, 42, 43, and 44A-44O correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 4500 may be combined with other operations in the method 4600 or 4700, and/or the order of some operations may be changed.

In some implementations, the one or more programs includes a data visualization application 622 (e.g., Tableaus desktop or Tableau browser). In some implementations, the client device executes a minimum version of data visualization application that enables access to the capabilities of a Viz Data Service 220.

Referring to FIG. 45A, the client device receives (4502) one or more inputs for generating a data visualization according to a data source (e.g., database/data sources 316).

In some implementations, generating the data visualization includes applying (4504) an object model of the data source (e.g., data model or object model 338).

In some implementations, the object model includes (4505) multiple fact tables (e.g., multiple root tables). Details of data models spanning multiple fact tables are described in U.S. patent application Ser. No. 18/424,505, filed Jan. 26, 2024, the contents of which are incorporated by reference herein in its entirety.

In some implementations, the one or more inputs are (4506) received via a data visualization application (e.g., data visualization application 622) that executes on the client device.

In some implementations, the data visualization application includes a user interface (e.g., GUI 100). The one or more inputs comprise (4508) placement of one or more data fields of the data source from a schema information region of the user interface to one or more shelves (e.g., columns shelf 120 or rows shelf 122) of a shelf region of the user interface.

The client device, in accordance with receiving one or more inputs for generating a data visualization according to a data source, determines (4510) one or more requirements (e.g., characteristics) for generating the data visualization.

In some implementations, determining the one or more requirements for generating the data visualization includes determining (4512) whether the data visualization includes (e.g., requires or uses) a dimension data field that is shared between two objects of the object model of the data source (e.g., a shared dimension). Details of shared dimensions are described in U.S. patent application Ser. No. 18/424,505, filed Jan. 26, 2024, the contents of which are incorporated by reference herein in its entirety. For example, in some implementations, when the data visualization uses a shared dimension, the client device selects Viz Data Service 220 and sends its queries to the Viz Data Service 220. In some implementations, when the data visualization does not use a shared dimension, the client device selects Data Server 370 and sends its queries to the Data Server 370.

In some implementations, determining the one or more requirements for generating the data visualization includes determining (4514) whether the one or more inputs includes a user attribute function. A user attribute function can be a function that identifies any facet of a user that is relevant for determining the context of embedded analytics. A user attribute function can include attributes (e.g., information) such as device type, login location, time zone, group memberships or countries. User attribute functions can facilitate data security and personalized user experiences. Data security can include row level security (RLS), which allows access to be limited to specific rows of data. For example, an organization can deploy a single dashboard that can be used by each of your data consumers by utilizing user attributes functions to pass attributes from its application or identity provider to the data server to manage which data records (e.g., rows of data) are accessible by different consumers. In some implementations, in accordance with a determination by the client device that the one or more inputs includes a user attribute function, the client device selects Viz Data Service 220 and sends its queries to the Viz Data Service 220. In some implementations, in accordance with a determination by the client device that the one or more inputs do not include a user attribute function, the client device selects Data Server 370 and sends its queries to the Data Server 370.

In some implementations, determining the one or more requirements for generating the data visualization includes determining (4516) whether the data visualization uses data fields from at least two fact tables of the data source. For example, in some implementations, in accordance with a determination that the data visualization uses data fields from at least two fact tables, the client device selects the Viz Data Service 220 and sends its queries to the Viz Data Service 220. In some implementations, in accordance with a determination that the data visualization does not use data fields from at least two fact tables (i.e., the data visualization can be generated using data fields that are all found in one fact table), the client device selects the Data Server 370 and sends its queries to the Data Server 370.

In some implementations, in accordance with receiving the one or more inputs, the client device generates (4518) a visual specification (e.g., visual specification 130) according to the one or more inputs. The visual specification encodes a mix of visual layout information (e.g., axes, marks) and semantic information (e.g., totals). A visual specification defines characteristics of a desired data visualization. In some implementations, a visual specification is built using user interface 100 of a data visualization application. The visual specification includes identified data sources (i.e., specifies what the data sources are), which provide enough information to find the data sources (e.g., a data source name or network full path name). A visual specification also includes visual variables and the assigned data fields for each of the visual variables. In some implementations, a visual specification has visual variables corresponding to each of the shelf regions (e.g., the columns shelf 120 and the rows shelf 122 in FIG. 1). In some implementations, the visual variables include other information such as context information about the client device, user preference information, or other data visualization features that are not implemented as shelf regions (e.g., analytic features), In some implementations, as a user adds data fields to the visual specification (e.g., indirectly by using the graphical user interface to place data fields onto shelves), the data visualization application (or web application) groups together the user-selected data fields according to the object model. Such groups are called data field sets. In many cases, all of the user-selected data fields are in a single data field set. In some instances, there are two or more data field sets. Each measure m is in exactly one data field set, but each dimension d may be in more than one data field set.

In some implementations, the client device converts (4520) the visual specification into a query specification (e.g., query specification 304).

In some implementations, the client device converts (4522) the visual specification into one or more abstract queries (e.g., abstract queries 308).

Referring to FIG. 45B, the client device sends (4524) a request to a network gateway (e.g., gateway 3304) (e.g., a network device or a network node) that is communicatively connected to the client device and a plurality of data servers. For example, in some implementations, the plurality of data servers includes a data server 370 and a data server 360 running VDS 220. In some implementations, the plurality of data servers includes Viz Portal 222.

In some implementations, the method 4500 includes prior to sending the request to the network gateway, establishing a network connection with the network gateway.

The client device receives (4526), from the network gateway, capabilities of each data server of the plurality of data servers.

The client device determines (4528), according to the received capabilities, that a first data server of the plurality of data servers includes a first set of (one or more) capabilities that satisfies the requirements for generating the data visualization.

In some implementations, in accordance with the determination that the first data server includes the first set of capabilities that satisfies the requirements for generating the data visualization, the client device generates (4530) attribute information (e.g., a routing key, an address information that informs the gateway which server to route the queries to) that includes information identifying the first data server. The client device adds (e.g., appends, adds to a message header) the attribute information to the one or more queries. The network gateway is configured to route the one or more queries to the first data server in accordance with the attribute information. As disclosed, the method 4500 distinguishes from traditional approaches where the negotiation and handshaking processes are performed by a server, and where the server makes the routing decisions. Here, the client device asks the servers for their capabilities, and based on the respective capabilities of each server, the client makes the decision and instructs the server where/how to route its queries.

The client device, in accordance with the determination, generates one or more queries and sends (4532), via the network gateway, one or more queries to the first data server. The first data server is configured to execute one or more database queries against one or more databases to retrieve one or more data sets from the data source.

In some implementations, sending the one or more queries to the first data server includes sending (4534) the query specification to the first data server.

In some implementations, sending the one or more queries to the first data server includes serializing (4536) data in the visual specification (e.g., into a protobuf file, a data format for serializing or deserializing structured data) and sending the serialized data to the first data server.

For example, in some implementations, if the first data server is the Viz Data Service 220, the client device would serialize the visual specification information (or the abstract queries) into a stream (e.g., in a serialized data format (protobuf) 319) to the VDS 220, which then deserialize, combine this information with additional user functions, used for applying row-level security (RLS), and federate this query to external databases.

In some implementations, sending the one or more queries to the first data server includes sending (4538) the one or more abstract queries to the first data server.

In some implementations, prior to sending the one or more queries to the first data server, the client device compiles (4540) (e.g., pre-compiles) the queries to form one or more compiled queries, and sends the compiled queries to the first data server via the network gateway.

For example, in some implementations, if the first data server is Data Server 370, the client would pre-compile its queries and send the pre-compile queries to the Data Server 370.

With continued reference to FIG. 45C, in some implementations, the method 4500 includes, in accordance with the determination: sending (4542), to the first data server via the network gateway, information of a local state of the client device.

In some implementations, the information of the local state of the client device includes (4543) information of a calculation or a filter that exists locally on the client device.

The client device retrieves (4544) (e.g., receives), from the first data server, one or more data sets from the data source.

In some implementations, the one or more data sets that are received from the first data server include (4546) data that reflect the local state of the client device.

The client device generates (4548) the data visualization according to the retrieved data sets.

The client device displays (4550) the data visualization.

In some implementations, the data visualization is (4552) an embedded data visualization that is displayed on a third-party (e.g., external) application, distinct from the data visualization application.

FIGS. 46A and 46B provide a flowchart of an example process for querying data, in accordance with some implementations. The method 4600 is performed at a server system (e.g., server system 360 running a Viz Data Service 220) that includes one or more processors (e.g., CPU(s)

1002) and memory (e.g., memory 1006). The server system is communicatively connected to a plurality of computing devices (e.g., client device 202, client device 204, headless BI service 210) and one or more databases (e.g., databases 940, database/data sources 316). In some implementations, the memory stores one or more programs configured for execution by the one or more processors. In some implementations, the operations shown in FIGS. 1, 2, 3, 4, 5, 11, 12, 13, 14A, 14B, 15, 16, 17, 18A-18C, 19, 20A-20J, 21, 22, 23, 24, 25, 26, 27, 28, 29, 30, 31. 32, 33, 34, 35, 36A-36D, 37, 38A, 38B, 39A, 39B, 40A-40E, 41, 42, 43, and 44A-44O correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 4500 may be combined with other operations in the method 4500 or 4700, and/or the order of some operations may be changed.

The server system receives (4602) one or more queries from a computing device. The one or more queries specify a data source (e.g., data source 316) (e.g., a published data source). In some implementations, the one or more queries that are received from the computing device are high level queries (e.g., in a higher-level query language, such as a visual specification 130, a query specification 304/404, or an abstract query 308/408, as illustrated in FIG. 16 and FIG. 22.

In some implementations, the one or more queries are received (4604) as a query specification. The server system converts the query specification into one or more abstract queries.

In some implementations, the one or more queries are received (4606) as an abstract query. For example, in some implementations, the computing device encapsulates the one or more queries into a query specification and converts the query specification into an abstract specification, which it then sends to the server system. ISE, the server system receives the one or more queries in the form of a query specification and converts the query specification to an abstract specification.

In some implementations, the one or more queries are received (4608) in a serialized data format.

In some implementations, the computing device is (4610) a client device (e.g., client device 202, client device 204, or client device 3302) executing a data visualization application (e.g., data visualization 622, such as Tableau desktop app or Tableau browser).

In some implementations, the computing device is (4612) configured to render data from the one or more data sets as a data visualization and display the data visualization via a display of the computing device.

In some implementations, the computing device is (4614) a headless business intelligence (BI) service (e.g., headless BI service 210) that is communicatively connected to a client device (e.g., client device 206), the client device executing an application (e.g., developer application 732) with a programmatic interface (e.g., programmatic interface 208).

In some implementations, the data source is (4616) a published data source. That is to say, the data source is published to the server system, as a separate resource. The data source is not an embedded data source that only exists locally on the computing device.

In some implementations, the server system receives (4618) (e.g., obtains or determines) (e.g., concurrently with the one or more queries) information regarding a local state of the computing device. For example, in some implementations, to support clients with local state, the Viz Data Service 220 enables clients to specify state such as ad-hoc calculations. Compared to prior systems (e.g., Data Server 370), where queries are pre-compiled and prevent certain optimizations, here, optimizations are enabled by view of the fact that higher level queries are sent to the server system.

In some implementations, the information of the local state of the computing device includes (4620) information of a calculation or a filter that exists locally on the computing device (e.g., and not on the data source).

Referring to FIG. 46B, the server system determines (4622) (e.g., via VizData Java Service 510, authentication component 512) a level of security applicable to a user of the computing device.

The server system translates (4624) the one or more queries into one or more logical queries (e.g., lower level query, lower-level expressions that can be used at the physical level of the file) according to semantics of the data source.

In some implementations, translating the one or more queries into the one or more logical queries includes encoding (4626) the information of the local state of the computing device in the one or more logical queries.

In some implementations, the server system determines (4628) (e.g., via Service Discovery 516) respective availabilities of one or more services of the server system. In some implementations, the one or more services include a service that enables smart negotiation and switching of servers by a client device, as described with respect to FIGS. 33, 34, and 45A to 45C. In some implementations, the server system (e.g., via Service Discovery 516) includes a catalog of services that are available to the computing devices. The server system dynamically tracks any changes within the services and provides, in real-time, respective statuses of the services.

In some implementations, the server system obtains (4630) (e.g., determines) (e.g., via TDS Service 518) metadata information (e.g., data field information, table information) corresponding to the data source.

The server system transmits (4632) the one or more logical queries to a query pipeline (e.g., query pipeline 538) of the server system. In some implementations, the query pipeline performs tasks such as query rewriting, optimization and federation to output the final SQL queries. The query pipeline determines the eventual SQL text to send to the database. In accordance with some implementations of the present disclosure, all the semantic query compilation is compiled by the server system (e.g., behind a zero-trust boundary). Because the server system has the full context of the client's intent (from the query) as well as hidden published data source (as it is within the zero-trust boundary), it can compile the same sets of queries as in the embedded data source case. In some implementations, compared to the data server flow, the method 4600 of querying data as disclosed in FIGS. 46A and 46B is more efficient as the query pipeline needs to be run just once, by the server system. Clients can express their semantic intent while pushing all the semantic reasoning of query compilation to the VDS 220, thus eliminating the issue of information asymmetry that exists on prior system (e.g., Data Server).

The server system executes (4634) the one or more queries against a first database of the one or more databases to retrieve query results from the data source.

The server system applies (4636) the determined level of security to the query results to obtain one or more data sets. In some implementations, the server system applies row-level security (RLS), which allows access to be limited to specific rows of data in a database. In some implementations, the server system applies table-level security, which allows access to be limited to entire table(s) of a database. In some implementations, the server system applies database-level security, which controls access to entire database(s).

The server system returns (4638) the one or more data sets to the computing device.

FIGS. 47A and 47B provide a flowchart of an example process for data retrieval, in accordance with some implementations. The method 4700 is performed at a computer system (e.g., computer system 800) having one or more processors (e.g., processors(s) 802 and memory (e.g., memory 806). The memory stores one or more programs configured for execution by the one or more processors. In some implementations, the one or more programs include a headless BI service 210. In some implementations, the operations shown in FIGS. 1, 2, 3, 4, 5, 11, 12, 13, 14A, 14B, 15, 16, 17, 18A-18C, 19, 20A-20J, 21, 22, 23, 24, 25, 26, 27, 28, 29, 30, 31. 32, 33, 34, 35, 36A-36D, 37, 38A, 38B, 39A, 39B, 40A-40E, 41, 42, 43, and 44A-44O correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 4700 may be combined with other operations in the method 4500 or 4600, and/or the order of some operations may be changed.

The computer system receives (4702), from a programmatic interface (e.g., programmatic interface 208) of a client device (e.g., client device 206) via one or more external API calls (e.g., external APIs 212), a query that specifies a data source and one or more data fields of the data source.

In some implementations, the query comprises (4704) a JSON object.

In some implementations, the query further specifies (4706) one or more filters to apply to the query. Each of the one or more filters including a data column to filter on and a filter type.

In some implementations, the filter type includes (4708) a quantitative filter, a set filter, a date filter, or a topN filter.

In some implementations, the query specifies (4710) a sort priority for the one or more data fields.

In some implementations, the query specifies (4712) a maximum number of decimal places for data values of the one or more data fields.

The computer system, in accordance with receiving the query, generates (4714) a query specification (e.g., query specification 404) according to the one or more data fields of the data source, wherein the query specification is an extended version of the API calls.

The computer system transmits (4715) the query specification to a data service (e.g., Viz Data Service 220, or a server system 360 executing the Viz Data Service 220), and causes the data service to execute one or more database queries to retrieve data against a database to retrieve query results from the data source, according to the query specification.

In some implementations, transmitting the query specification to the data service includes converting (4716) the query specification into a data format that is compatible with the data service.

In some implementations, the data format comprises (4718) a serialized data format (e.g., serialized data format (protobuf) 419).

In some implementations, the method 4700 includes, prior to transmitting the query specification to the data service, converting (4720) the query specification into one or more abstract queries (e.g., abstract queries 408) and transmitting the one or more abstract queries to the data service.

The computer system receives (4722) the query results from the data service.

The computer system configures (4724) the query results to obtain configured data.

In some implementations, configuring the query results to obtain configured data includes sorting (4726) the query results according to the sort priority.

In some implementations, configuring the data includes truncating (4728) some of the data to the maximum number of decimal places.

In some implementations, configuring the query results to obtain the configured data includes formatting (4730) data values of date/time fields from a priority format to a standard date format.

In some implementations, the configured data comprises (4732) an object format or an array format.

In some implementations, the configured data does not (4734) include any data visualization.

The computer system transmits (4736) the configured data to the client device for display in the programmatic interface.

Turning on to some example implementations:

(A1) In accordance with some implementations, a method of selecting data services is performed at a client device having a display, one or more processors, and memory. The method includes receiving one or more inputs for generating a data visualization according to a data source. The method includes, in accordance with receiving one or more inputs for generating a data visualization according to a data source: (i) determining one or more requirements for generating the data visualization; (ii) sending a request to a network gateway that is communicatively connected to the client device and a plurality of data servers; (iii) receiving, from the network gateway, capabilities of each data server of the plurality of data servers; and (iv) determining, according to the received capabilities, that a first data server of the plurality of data servers includes a first set of capabilities that satisfies the requirements for generating the data visualization. The method includes, in accordance with the determination: (v) sending, via the network gateway, one or more queries to the first data server; (vi) receiving, from the first data server, one or more data sets from the data source; (vii) generating the data visualization according to the retrieved data sets; and (viii) displaying the data visualization.

(A2) In some implementations of A1, the method includes, in accordance with the determination that the first data server includes the first set of capabilities that satisfies the requirements for generating the data visualization: generating attribute information (e.g., a routing key, an address information that informs the gateway which server to route the queries to) that includes identifier information that identifies the first data server and adding (e.g., appending, adding to a message header) the attribute information to the one or more queries. The network gateway is configured to route the one or more queries to the first data server in accordance with the attribute information.

(A3) In some implementations of A1 or A2, the method includes: in accordance with receiving the one or more inputs: generating a visual specification according to the one or more inputs; and converting the visual specification into a query specification. Sending the one or more queries to the first data server includes sending the query specification to the first data server.

(A4) In some implementations of A3, sending the one or more queries to the first data server includes: serializing data in the visual specification; and sending the serialized data to the first data server.

(A5) In some implementations of any of A1-A4, the method includes: in accordance with receiving the one or more inputs: generating a visual specification according to the one or more inputs; and converting the visual specification into one or more abstract queries, wherein sending the one or more queries to the first data server includes sending the one or more abstract queries to the first data server.

(A6) In some implementations of any of A1-A5, the method includes, prior to sending the one or more queries to the first data server: compiling the queries to form one or more compiled queries; and sending the compiled queries to the first data server via the network gateway.

(A7) In some implementations of any of A1-A6, generating the data visualization includes applying an object model of the data source; and determining the one or more requirements for generating the data visualization includes determining whether the data visualization includes a dimension data field that is shared between two objects of the object model of the data source.

(A8) In some implementations of any of A1-A7, determining the one or more requirements for generating the data visualization includes determining whether the one or more inputs includes a user attribute function.

(A9) In some implementations of A8, the one or more inputs are received via a data visualization application. The data visualization is an embedded data visualization that is displayed on a third-party application, distinct from the data visualization application.

(A10) In some implementations of any of A1-A9, generating the data visualization includes applying an object model of the data source. The object model includes multiple fact tables. Determining the one or more requirements for generating the data visualization includes determining whether the data visualization uses data fields from at least two fact tables of the data source.

(A11) In some implementations of any of A1-A10, the method includes, in accordance with the determination that the first data server includes a first set of capabilities that satisfies the requirements for generating the data visualization: sending, to the first data server via the network gateway, information of a local state of the client device. The one or more data sets that are received from the first data server include data that reflect the local state of the client device.

(A12) In some implementations of A11, the information of the local state of the client device includes information of a calculation or a filter that exists locally on the client device.

(A13) In some implementations of any of A1-A12, the client device executes a data visualization application that includes a user interface. The one or more inputs comprise placement of one or more data fields of the data source from a schema information region of the user interface to one or more shelves of a shelf region of the user interface.

(B1) In accordance with some implementations, a client device comprises a display, one or more processors, and memory coupled to the one or more processors. The memory stores one or more programs configured for execution by the one or more processors, the one or more programs include instructions for performing the method of any of A1-A12.

(C1) In accordance with some implementations, a non-transitory computer-readable medium stores one or more programs configured for execution by one or more processors of a client device. The one or more programs comprising instructions for performing the method of any of A1-A12.

(D1) In accordance with some implementations, a method of querying data is performed at a server system that includes one or more processors and memory. The server system is communicatively connected to a plurality of computing devices and one or more databases. The method includes receiving one or more queries from a computing device, the one or more queries specifying a data source. The method includes determining a level of security applicable to a user of the computing device. The method includes translating the one or more queries into one or more logical queries according to semantics of the data source. The method includes transmitting the one or more logical queries to a query pipeline of the server system and executing the one or more queries against a first database of the one or more databases to retrieve query results from the data source. The method includes applying the determined level of security to the query results to obtain one or more data sets. The method includes returning the one or more data sets to the computing device.

(D2) In some implementations of D1, the method includes receiving information regarding a local state of the computing device. Translating the one or more queries into the one or more logical queries includes encoding the information of the local state of the computing device in the one or more logical queries.

(D3) In some implementations of D2, the information of the local state of the computing device includes information of a calculation or a filter that exists locally on the computing device.

(D4) In some implementations of any of D1-D3, the one or more queries are received as a query specification. The method includes converting the query specification into one or more abstract queries.

(D5) In some implementations of any of D1-D4, the one or more queries are received as one or more abstract queries.

(D6) In some implementations of any of D1-D5, the one or more queries are received in a serialized data format.

(D7) In some implementations of any of D1-D6, the computing device is a client device executing a data visualization application.

(D8) In some implementations of D7, the computing device is configured to render data from the one or more data sets as a data visualization and display the data visualization via a display of the computing device.

(D9) In some implementations of any of D1-D6, the computing device is a headless business intelligence (BI) service that is communicatively connected to a client device, the client device executing an application with a programmatic interface.

(D10) In some implementations of any of D1-D9, the data source is a published data source.

(D11) In some implementations of any of D1-D10, the method includes determining respective availabilities of one or more services of the server system.

(D12) In some implementations of any of D1-D11, the method includes obtaining metadata information corresponding to the data source.

(E1) In accordance with some implementations, a server system comprises one or more processors and memory coupled to the one or more processors. The memory storing one or more programs configured for execution by the one or more processors. The one or more programs including instructions for performing the method of any of D1-D12.

(F1) In accordance with some implementations, a non-transitory computer-readable medium stores one or more programs configured for execution by one or more processors of a server system. The one or more programs include instructions for performing the method of any of D1-D12.

(G1) In accordance with some implementations, a method for data retrieval is performed at a computer system having one or more processors and memory storing one or more programs configured for execution by the one or more processors. The method includes receiving, from a programmatic interface of a client device via one or more external API calls, a query that specifies a data source and one or more data fields of the data source. The method includes, in accordance with receiving the query, generating a query specification according to the one or more data fields of the data source. The query specification is an extended version of the API calls. The method includes transmitting the query specification to a data service, and causing the data service to execute one or more database queries to retrieve data against a database to retrieve query results from the data source, according to the query specification. The method includes receiving the query results from the data service; configuring the query results to obtain configured data; and transmitting the configured data to the client device for display in the programmatic interface.

(G2) In some implementations of G1, the query comprises a JSON object.

(G3) In some implementations of G1 or G2, the query further specifies one or more filters to apply to the query. Each of the one or more filters includes a data column to filter on and a filter type.

(G4) In some implementations of G3, the filter type includes: a quantitative filter, a set filter, a date filter, or a topN filter.

(G5) In some implementations of any of G1-G4, transmitting the query specification to the data service includes converting the query specification into a data format that is compatible with the data service.

(G6) In some implementations of G5, the data format comprises a serialized data format.

(G7) In some implementations of any of G1-G6, the method further comprises: prior to transmitting the query specification to the data service: converting the query specification into one or more abstract queries; and transmitting the one or more abstract queries to the data service.

(G8) In some implementations of any of G1-G7, the query specifies a sort priority for the one or more data fields. Configuring the query results to obtain configured data includes sorting the query results according to the sort priority.

(G9) In some implementations of any of G1-G8, the query specifies a maximum number of decimal places for data values of the one or more data fields. Configuring the data includes truncating some of the data to the maximum number of decimal places.

(G10) In some implementations of any of G1-G9, configuring the query results to obtain the configured data includes formatting data values of date/time fields from a priority format to a standard date format.

(G11) In some implementations of any of G1-G10, the configured data comprises an object format or an array format.

(G12) In some implementations of any of G1-G1, the configured data does not include any data visualization.

(H1) In accordance with some embodiments, a computer system for data retrieval comprises one or more processors and memory. The memory stores one or more programs configured for execution by the one or more processors. The one or more programs include instructions for performing the method of any of G1-G12.

(I1) In accordance with some embodiments, a non-transitory computer readable storage medium stores one or more programs configured for execution by a computer system having one or more processors, and memory. The one or more programs include instructions for performing the method of any of G1-G12.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of querying data, performed at a server system that includes one or more processors and memory, the server system communicatively connected to a plurality of computing devices and one or more databases, the method comprising:

receiving one or more queries from a first computing device of the plurality of computing devices, the one or more queries having a serialized data format and specifying one or more data fields of a data source;

in accordance with receiving the one or more queries:

deserializing the one or more queries into one or more deserialized queries;

combining the one or more deserialized queries with one or more user functions;

determining a level of security applicable to a user of the first computing device according to the one or more user functions;

translating the one or more deserialized queries with the one or more user functions into one or more logical queries according to semantics of the data source;

transmitting the one or more logical queries to a query pipeline of the server system;

executing the one or more queries against a first database of the one or more databases to retrieve query results comprising a plurality of data rows, from the data source;

applying the determined level of security to the query results, including determining a subset of data rows, less than all of the plurality of data rows, according to the determined level of security applicable to the user, to obtain one or more data sets; and returning the one or more data sets to the first computing device.

2. The method of claim 1, further comprising:

receiving information regarding a local state of the first computing device, wherein translating the one or more deserialized queries with the one or more user functions into the one or more logical queries includes encoding the information of the local state of the first computing device in the one or more logical queries.

3. The method of claim 2, wherein the information of the local state of the first computing device includes information of a calculation or a filter that exists locally on the first computing device.

4. The method of claim 1, wherein the first computing device is a client device executing a data visualization application.

5. The method of claim 4, wherein the first computing device is configured to render data from the one or more data sets as a data visualization and display the data visualization via a display of the first computing device.

6. The method of claim 1, wherein:
the plurality of computing devices includes a second computing device executing a data service, the data service being communicatively connected with a client device executing an application with a programmatic interface; and
the method further comprises:
receiving, via the second computing device, a query from the programmatic interface of the client device via an API call, wherein the second computing device is configured to generate a query specification from the received query.

7. The method of claim 1, wherein the data source is a published data source.

8. The method of claim 1, further comprising:
determining respective availabilities of one or more services of the server system.

9. The method of claim 1, further comprising:
obtaining metadata information corresponding to the data source.

10. A computer system that is communicatively connected to a plurality of computing devices and one or more databases, the computer system comprising:
one or more processors; and
memory coupled to the one or more processors, the memory storing one or more programs configured for execution by the one or more processors, the one or more programs including instructions for:
receiving one or more queries from a first computing device of the plurality of computing devices, the one or more queries having a serialized data format and specifying one or more data fields of a data source;
in accordance with receiving the one or more queries:
deserializing the one or more queries into one or more deserialized queries;
combining the one or more deserialized queries with one or more user functions;
determining a level of security applicable to a user of the first computing device according to the one or more user functions;
translating the one or more deserialized queries with the one or more user functions into one or more logical queries according to semantics of the data source;
transmitting the one or more logical queries to a query pipeline of the computer system;
executing the one or more queries against a first database of the one or more databases to retrieve query results comprising a plurality of data rows, from the data source;
applying the determined level of security to the query results, including determining a subset of data rows, less than all of the plurality of data rows, according to the determined level of security applicable to the user, to obtain one or more data sets; and
returning the one or more data sets to the first computing device.

11. The computer system of claim 10, the one or more programs further including instructions for:
receiving information regarding a local state of the first computing device,
wherein the instructions for translating the one or more deserialized queries with the one or more user functions into the one or more logical queries include instructions for encoding the information of the local state of the first computing device in the one or more logical queries.

12. The computer system of claim 11, wherein the information of the local state of the first computing device includes information of a calculation or a filter that exists locally on the first computing device.

13. The computer system of claim 10, wherein;
the plurality of computing device includes a second computing device executing a data service, the data service being communicatively connected with a client device executing an application with a programmatic interface; and
the one or more programs further include instructions for:
receiving, via the second computing device, a query from the programmatic interface of the client device via an API call, wherein the second computing device is configured to generate a query specification from the received query.

14. A non-transitory computer-readable storage medium storing one or more programs configured for execution by one or more processors of a server system that is communicatively connected to a plurality of computing devices and one or more databases, the one or more programs comprising instructions for:
receiving one or more queries from a first computing device of the plurality of computing devices, the one or more queries having a serialized data format and specifying one or more data fields of a data source;
in accordance with receiving the one or more queries:
deserializing the one or more queries into one or more deserialized queries;
combining the one or more deserialized queries with one or more user functions;
determining a level of security applicable to a user of the first computing device according to the one or more user functions;
translating the one or more deserialized queries with the one or more user functions into one or more logical queries according to semantics of the data source;
transmitting the one or more logical queries to a query pipeline of the server system;
executing the one or more queries against a first database of the one or more databases to retrieve query results comprising a plurality of data rows, from the data source;
applying the determined level of security to the query results, including determining a subset of data rows, less than all of the plurality of data rows, according to the determined level of security applicable to the user, to obtain one or more data sets; and
returning the one or more data sets to the first computing device.

15. The non-transitory computer-readable storage medium of claim 14, the one or more programs comprising instructions for:
determining respective availabilities of one or more services of the server system.

16. The non-transitory computer-readable storage medium of claim 14, the one or more programs comprising instructions for:
obtaining metadata information corresponding to the data source.

17. The method of claim 1, wherein returning the one or more data sets to the first computing device includes causing the one or more data sets to be rendered as a data visualization.

18. The method of claim 1, wherein returning the one or more data sets to the first computing device includes returning the one or more data sets as one or more result tables.

19. The computer system of claim 13, wherein:

the one or more queries from the first computing device comprises a first session;

the query from the programmatic interface of the client device comprises a second session; and the one or more programs include instructions for simultaneously handling the first session and the second session.

20. The non-transitory computer-readable storage medium of claim 14, wherein:

the plurality of computing device includes a second computing device executing a data service, the data service being communicatively connected with a client device executing an application with a programmatic interface; and the one or more programs further include instructions for:

receiving, via the second computing device, a query from the programmatic interface of the client device via an API call, wherein the second computing device is configured to generate a query specification from the received query.

\*    \*    \*    \*    \*